United States Patent
Kang et al.

(10) Patent No.: US 10,949,637 B2
(45) Date of Patent: Mar. 16, 2021

(54) ELECTRONIC DEVICE COMPRISING SENSOR AND METHOD FOR OPERATING SAME

(71) Applicant: Samsung Electronics Co., Ltd., Gyeonggi-do (KR)

(72) Inventors: Ho Kyung Kang, Daegu (KR); Young Tae Jeong, Gyeonggi-do (KR); Han Vit Kang, Gyeonggi-do (KR); Byeong Cheol Kim, Gyeonggi-do (KR); Jung Won Kim, Gyeonggi-do (KR); Jeong Sik Jeong, Gyeonggi-do (KR); Kwang Tai Kim, Gyeonggi-do (KR); Hyung Sup Byeon, Gyeonggi-do (KR); Hyun Ju Hong, Gyeonggi-do (KR)

(73) Assignee: Samsung Electronics Co., Ltd., Suwon (JP)

( * ) Notice: Subject to any disclaimer, the term of this patent is extended or adjusted under 35 U.S.C. 154(b) by 0 days.

(21) Appl. No.: 16/309,189

(22) PCT Filed: Jan. 11, 2017

(86) PCT No.: PCT/KR2017/000367
§ 371 (c)(1),
(2) Date: Dec. 12, 2018

(87) PCT Pub. No.: WO2018/008820
PCT Pub. Date: Jan. 11, 2018

(65) Prior Publication Data
US 2019/0311172 A1    Oct. 10, 2019

(30) Foreign Application Priority Data

Jul. 7, 2016 (KR) .................. 10-2016-0085987

(51) Int. Cl.
*G06K 9/00* (2006.01)
*G06F 3/01* (2006.01)
(Continued)

(52) U.S. Cl.
CPC .......... *G06K 9/0002* (2013.01); *G06F 3/016* (2013.01); *G06F 3/041* (2013.01); *G06F 21/32* (2013.01); *G06K 9/00* (2013.01); *G06K 9/00053* (2013.01)

(58) Field of Classification Search
CPC .... G06K 9/0002; G06K 9/00; G06K 9/00053; G06F 3/016; G06F 3/041; G06F 21/32
See application file for complete search history.

(56) References Cited

U.S. PATENT DOCUMENTS 7,013,031 B2    3/2006    Kim et al.
8,604,905 B2    12/2013    Setlak et al.
(Continued)

FOREIGN PATENT DOCUMENTS

| KR | 2002-0086971 A | 11/2002 |
| KR | 10-2015-0120043 A | 10/2015 |
| KR | 10-2016-0033330 A | 3/2016 |

OTHER PUBLICATIONS

European Search Report dated Apr. 29, 2019.

*Primary Examiner* — Stephen G Sherman
(74) *Attorney, Agent, or Firm* — Cha & Reiter, LLC.

(57) ABSTRACT

Disclosed is an electronic device including a housing including a transparent cover including a first region and a second region adjacent to the first region, a touchscreen display interposed between the first region and a second surface of the housing and exposed through the first region, an opaque layer interposed between the second region of the transparent cover and the second surface and exposed through the second region, a fingerprint sensor interposed between the opaque layer and the second surface, and a pressure sensor interposed between the fingerprint sensor and the second surface and sensing a pressure of an external object against the opaque layer. The pressure sensor includes a first electrode substantially in parallel with the opaque layer, a second electrode spaced from the first electrode layer and extending substantially in parallel in the second direction, and a (Continued)

US 10,949,637 B2

Page 2 dielectric layer interposed between the first electrode and the second electrode.

9 Claims, 36 Drawing Sheets

(51) Int. Cl.
*G06F 3/041* (2006.01)
*G06F 21/32* (2013.01)

(56) References Cited

U.S. PATENT DOCUMENTS

| | | | |
|---|---|---|---|
| 8,618,910 B2 | 12/2013 | Setlak et al. | |
| 9,092,653 B2 | 7/2015 | Setlak et al. | |
| 9,218,472 B2 | 12/2015 | Alameh et al. | |
| 9,891,738 B2 | 2/2018 | Huppi et al. | |
| 2002/0191820 A1 | 12/2002 | Kim et al. | |
| 2005/0213799 A1 | 9/2005 | Sawano | |
| 2011/0032077 A1 | 2/2011 | Setlak et al. | |
| 2011/0090049 A1 | 4/2011 | Setlak et al. | |
| 2014/0105469 A1 | 4/2014 | Setlak et al. | |
| 2014/0176332 A1 | 6/2014 | Alameh et al. | |
| 2014/0210675 A1* | 7/2014 | Hwang | H01Q 13/10 343/702 |
| 2015/0071509 A1 | 3/2015 | Myers | |
| 2015/0296607 A1 | 10/2015 | Yang et al. | |
| 2015/0296622 A1 | 10/2015 | Jiang et al. | |
| 2016/0033342 A1 | 2/2016 | Lyon et al. | |
| 2016/0062530 A1 | 3/2016 | Huppi et al. | |
| 2016/0314334 A1* | 10/2016 | He | G06K 9/0012 |
| 2017/0300736 A1* | 10/2017 | Song | G06K 9/00033 |
| 2018/0025202 A1* | 1/2018 | Ryshtun | G06K 9/00087 382/124 |
| 2018/0121006 A1 | 5/2018 | Huppi et al. | |

* cited by examiner

ELECTRONIC DEVICE COMPRISING SENSOR AND METHOD FOR OPERATING SAME

CLAIM OF PRIORITY

This application is a National Phase Entry of PCT International Application No. PCT/KR2017/000367, which was filed on Jan. 11, 2017 and claims a priority to Korean Patent Application No. 10-2016-0085987, which was filed on Jul. 7, 2016, the contents of which are incorporated herein by reference.

TECHNICAL FIELD

Various embodiments relate to integration of sensors and an electronic device using the same.

BACKGROUND ART

Nowadays, various sensors are being applied to an electronic device. For example, the electronic device may include a fingerprint sensor performing fingerprint recognition and may provide a function of authenticating a fingerprint of a user based on the fingerprint sensor. Also, the electronic device may include a pressure sensor as an input means.

DISCLOSURE

Technical Problem

As the above-described electronic device includes various sensors, the layout of the sensors may become complicated, and a thickness of the electronic device may increase due to the sensors.

Various embodiments of the present disclosure provide an electronic device including a sensor and an operation method thereof.

Technical Solution

An electronic device according to an embodiment of the present disclosure may include a housing that includes a first surface facing in a first direction and a second surface facing in a second direction opposite to the first direction, wherein the housing includes a transparent cover forming substantially the whole of the first surface and including a first region and a second region adjacent to the first region, a touchscreen display that is interposed between the first region of the transparent cover and the second surface of the housing and is exposed through the first region of the transparent cover, an opaque layer that is interposed between the second region of the transparent cover and the second surface of the housing and is exposed through the second region of the transparent cover, a fingerprint sensor that is interposed between the opaque layer and the second surface of the housing, and a pressure sensor that is interposed between the fingerprint sensor and the second surface of the housing and senses a pressure of an external object against the opaque layer. The pressure sensor may include a first electrode that extends substantially in parallel with the opaque layer, a second electrode that is spaced from the first electrode in the second direction and extends substantially in parallel with the first electrode, and a dielectric layer that is interposed between the first electrode and the second electrode.

An electronic device according to an embodiment of the present disclosure may include a housing that includes a first surface facing in a first direction and a second surface facing in a second direction opposite to the first direction, a user interface that is interposed between the first surface and the second surface of the housing, a fingerprint sensor that is interposed between the first surface and the second surface of the housing, a pressure sensor that is interposed between the first surface and the second surface of the housing, at least one processor that is electrically connected with the user interface, the fingerprint sensor, and the pressure sensor, and at least one memory that is electrically connected with the at least one processor and stores reference fingerprint information. The at least one memory may store instructions, which cause the at least one processor to sense a pressure of a finger of a user against the first surface of the housing by using the pressure sensor, to obtain fingerprint information of the finger using the fingerprint sensor, based at least partially on determination that the sensed pressure is not smaller than a first threshold, to perform authentication by using the fingerprint information of the finger obtained while the sensed pressure is smaller than a second threshold smaller than the first threshold, based at least partially on determination that the sensed pressure is smaller than the second threshold.

An electronic device according to an embodiment of the present disclosure may include a housing that has a bottom surface and is opened upwardly, a main printed circuit board that is seated inside the housing, a bracket that is placed on the main printed circuit board, a display panel that is positioned in a first region of an upper surface of the bracket, an integrated sensor that is positioned in a second region of the upper surface of the bracket, an outer cover that is positioned to cover the display panel and the integrated sensor. The integrated sensor may include a fingerprint sensor that performs fingerprint recognition on an object contacting a surface of the outer cover, a pressure sensor that senses a pressure of an object contacting the surface of the outer cover, an auxiliary printed circuit board in which the fingerprint sensor and the pressure sensor are seated at different locations, and a driving IC that is positioned on the auxiliary printed circuit board and drives the fingerprint sensor and the pressure sensor.

Advantageous Effects

Various embodiments of the present disclosure may allow an electronic device to be manufactured to be relatively slim in thickness and may provide various input functions.

MODE FOR INVENTION

Figure 1:
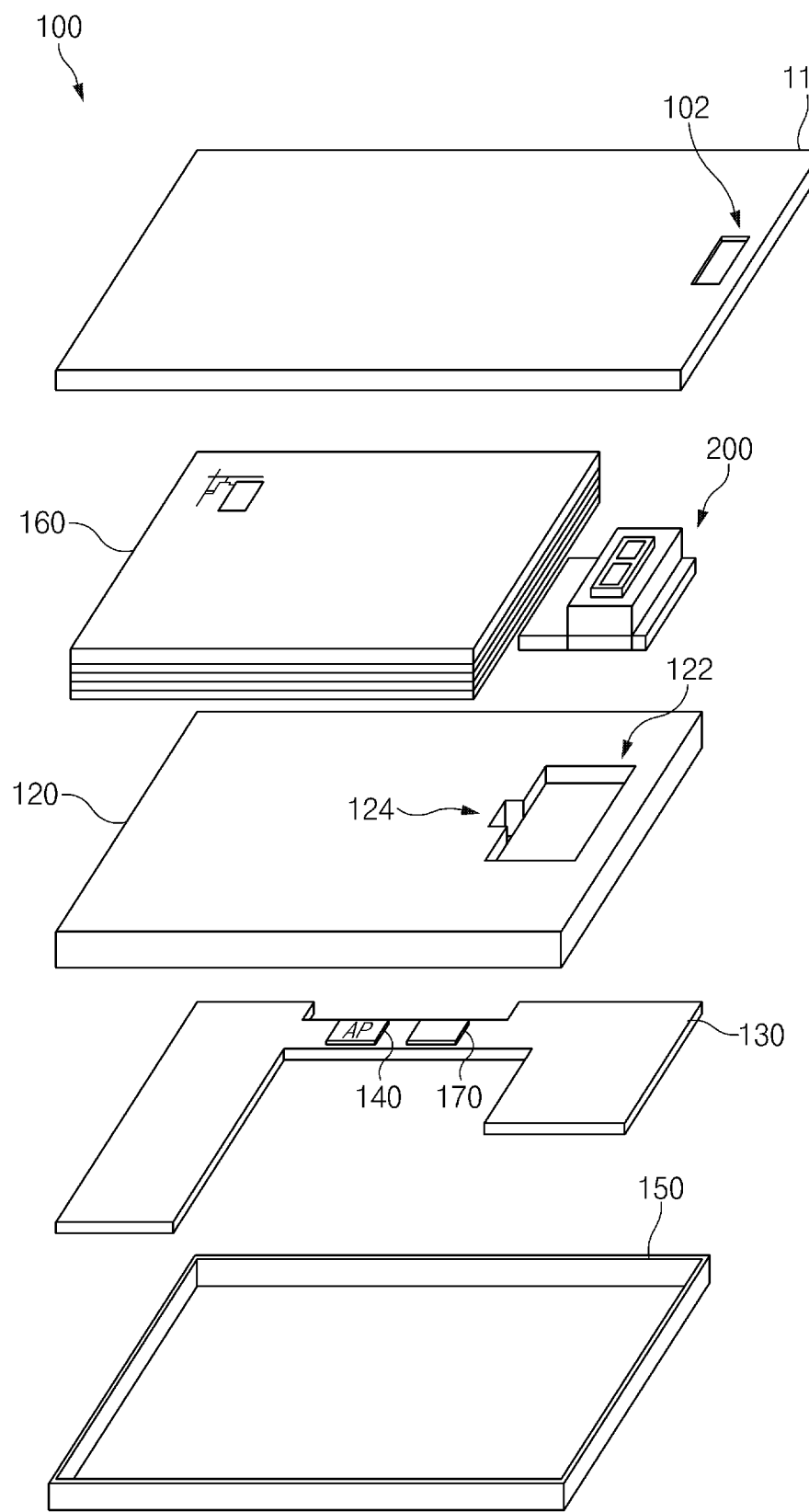
FIG. 1 is a view illustrating a structure of an electronic device according to an embodiment of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the various embodiments may be used to refer to various components regardless of the order and/or the priority and may not limit the corresponding components. The terms may be used to distinguish the relevant components from other components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a commonly used dictionary, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMD), electronic apparels, electronic bracelets, electronic necklaces, electronic appcessories, electronic tattoos, smart mirrors, or smart watches).

According to various embodiments, the electronic device may be a smart home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Positioning System Receiver (GPS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a view illustrating a structure of an electronic device according to an embodiment of the present disclosure.

Referring to FIG. 1, an electronic device 100 according to an embodiment of the present disclosure may include an outer cover 110 (e.g., a cover glass), a display panel 160, an integrated sensor 200, a bracket 120, a main printed circuit board 130, and a housing 150. In addition, the electronic device 100 may further include an adhesive layer which is interposed between the outer cover 110 and the display panel 160 and fixes the outer cover 110 on the display panel 160. The electronic device 100 may further include an impact absorption layer (e.g., an embossing layer) which is positioned under the display panel 160, and a heat sink which performs a heat radiation function and functions as a ground of the display panel 160. According to various embodiments, the outer cover 110 may be included as a part of a configuration of the housing 150.

According to an embodiment of the present disclosure, the electronic device 100 may optimize a layout space of sensors by vertically stacking two sensors or positioning the sensors to be adjacent to each other while using, in common, a specified component (e.g., an auxiliary printed circuit board) of a fingerprint sensor supporting a fingerprint recognition function and a pressure sensor supporting pressure sensing. Also, the electronic device 100 may provide various ways to operate sensors by using sensors which are positioned adjacent to each other or share at least some components.

According to an embodiment of the present disclosure, the outer cover 110 may be positioned, for example, on the display panel 160. At least a portion of a side surface of the outer cover 110 may be seated inside the housing 150. The outer cover 110 may be provided to be transparent (or to have not lower than specified transparency) with regard to visibility of the display panel 160. According to an embodiment, the outer cover 110 may be formed of transparent plastic or glass.

According to various embodiments, a guard recess 102 of a given depth may be positioned on one side (e.g., a given region of a location where the integrated sensor 200 is vertically aligned) of the outer cover 110. According to an embodiment, the guard recess 102 may be formed at a location where a home button was positioned, and may have the area of a given size (i.e., the size of a fingerprint sensor in the integrated sensor 200). As the guard recess 102 is formed, a thickness of the outer cover 110 where the guard recess 102 is provided may be thinner than a thickness of a surrounding portion. According to the above description, since light radiation and receipt of the fingerprint sensor through the guard recess 102 is better than the surrounding region, the electronic device 100 may improve a fingerprint recognition rate. Also, as the guard recess 102 is positioned, the user may find a location of the integrated sensor 200 intuitively and tactilely while contacting a surface of the outer cover 110.

According to an embodiment of the present disclosure, the display panel 160 may be positioned under the outer cover 110, and may output a specified screen under control of a processor 140 positioned on the main printed circuit board 130. The display panel 160 may be formed to be smaller than the whole size of the outer cover 110. For example, the display panel 160 may be formed to be similar or identical to the whole size of the outer cover 110, and may be provided with the size except for the location where the integrated sensor 200 is positioned. The display panel 160 is illustrated as being provided in a rectangular shape and with the size except for the region where the integrated sensor 200 is positioned, but the present disclosure is not limited thereto. For example, the display panel 160 may have the size corresponding to the whole size of the outer cover 110, and a portion of the display panel 160 may be cut such that the integrated sensor 200 is positioned. In addition, the display panel 160 may further include a panel driving driver (e.g., a driver integrated circuit (IC), a display driving integrated circuit (DDI), or the like) for driving a panel. The panel driving driver may be electrically connected to the processor 140 of the main printed circuit board 130.

According to an embodiment of the present disclosure, the integrated sensor 200 may be positioned parallel to a layer or a surface where the display panel 160 is positioned. The integrated sensor 200 may include, for example, a fingerprint sensor and a pressure sensor. Alternatively, the integrated sensor 200 may include a proximity sensor and a pressure sensor. Alternatively, as described above, the integrated sensor 200 may include a plurality of sensors which may sense an external input based on different kinds of signal processing. Below, a description will be given with reference to a main example in which the integrated sensor 200 includes a fingerprint sensor and a pressure sensor. The integrated sensor 200 may further include a fingerprint sensor driving IC associated with driving the fingerprint sensor and a pressure sensor driving IC associated with driving the pressure sensor. The integrated sensor 200 may include an auxiliary printed circuit board on which the fingerprint sensor driving IC and the pressure sensor driving IC are mounted. At least a portion of the auxiliary printed circuit board may be used as a part of electrode plates of the pressure sensor. At least a portion of the auxiliary printed circuit board may perform a role of supporting the fingerprint sensor.

According to an embodiment of the present disclosure, the bracket 120 may be positioned under the display panel 160. At least a portion of the bracket 120 may be formed of a metal material. In the case where the at least a portion of the bracket 120 is formed of a metal material, an insulating layer may be interposed between the bracket 120 and the display panel 160. The bracket 120 may include a seating recess 122 in which the integrated sensor 200 is seated. Also, the bracket 120 may include a wiring hole 124 in which wirings associated with operating the integrated sensor 200 are positioned. The wirings associated with operating the integrated sensor 200 may be positioned on at least one side of the wiring hole 124 so as to pass through the wiring hole 124, and the wirings may be provided to be connected with the processor 140 of the main printed circuit board 130. An insulating layer may be positioned under the bracket 120 such that the bracket 120 and the main printed circuit board 130 are electrically isolated from each other. According to various embodiments, at least a portion of the seating recess 122, in which the integrated sensor 200 is seated, of the bracket 120 may be formed of a metal material. In this case, the seating recess 122 may be used as a component(s) (e.g., a first electrode plate, a ground plate, or the like) of the pressure sensor in the integrated sensor 200. Alternatively, a dielectric layer of the pressure sensor may be positioned in the seating recess 122.

According to an embodiment of the present disclosure, the main printed circuit board 130 may be positioned under the bracket 120, and may be electrically isolated from a portion of the bracket 120, which is formed of a metal material. For example, the processor 140 and a memory 170 may be mounted on one surface of the main printed circuit board 130. The processor 140 may be electrically connected with the integrated sensor 200 through the wiring hole 124. Also, the processor 140 may be electrically connected with the display panel 160 through a specified root. The memory 170 may store at least one application program associated with operating the electronic device 100. According to an embodiment, the memory 170 may store an instruction set associated with operating the fingerprint sensor, an instruction set associated with operating the pressure sensor, or the like. Alternatively, the memory 170 may store an instruction set which, when a pressure corresponding to a specified first threshold value is detected, activates the fingerprint sensor and calls an API associated with operating the fingerprint sensor, an instruction set associated with a feedback output requesting pressure adjustment, an instruction set which processes fingerprint recognition when a pressure corresponding to a specified second threshold value is detected, an instruction set which processes execution of a specified function after fingerprint authentication.

According to an embodiment of the present disclosure, a portion of the outer cover 110, the display panel 160, the integrated sensor 200, the bracket 120, the main printed circuit board 130, or the like may be seated in the housing 150. For example, the housing 150 may include an opening, in which the above-described components (e.g., the outer cover 110, the display panel 160, the bracket 120, and the like) may be seated, on an upper side thereof and may include side walls, which may surround at least side surfaces of the above-described components, and a bottom. According to various embodiments, at least a portion of the housing 150 may be connected with a portion of the bracket 120 or may include a portion of the bracket 120. According to various embodiments, at least a portion of the housing 150 may be formed of a metal material. In addition, a battery may be positioned on one side of the housing.

As described above, since different kinds of sensors are positioned under the outer cover 110 and to be parallel to the display panel 160, the electronic device 100 according to an embodiment of the present disclosure may optimize a space to place sensors Also, an increase in the thickness of the electronic device 100 due to the integrated sensor 200 may be prevented by providing the seating recess 122 at the bracket 120.

Figure 2:
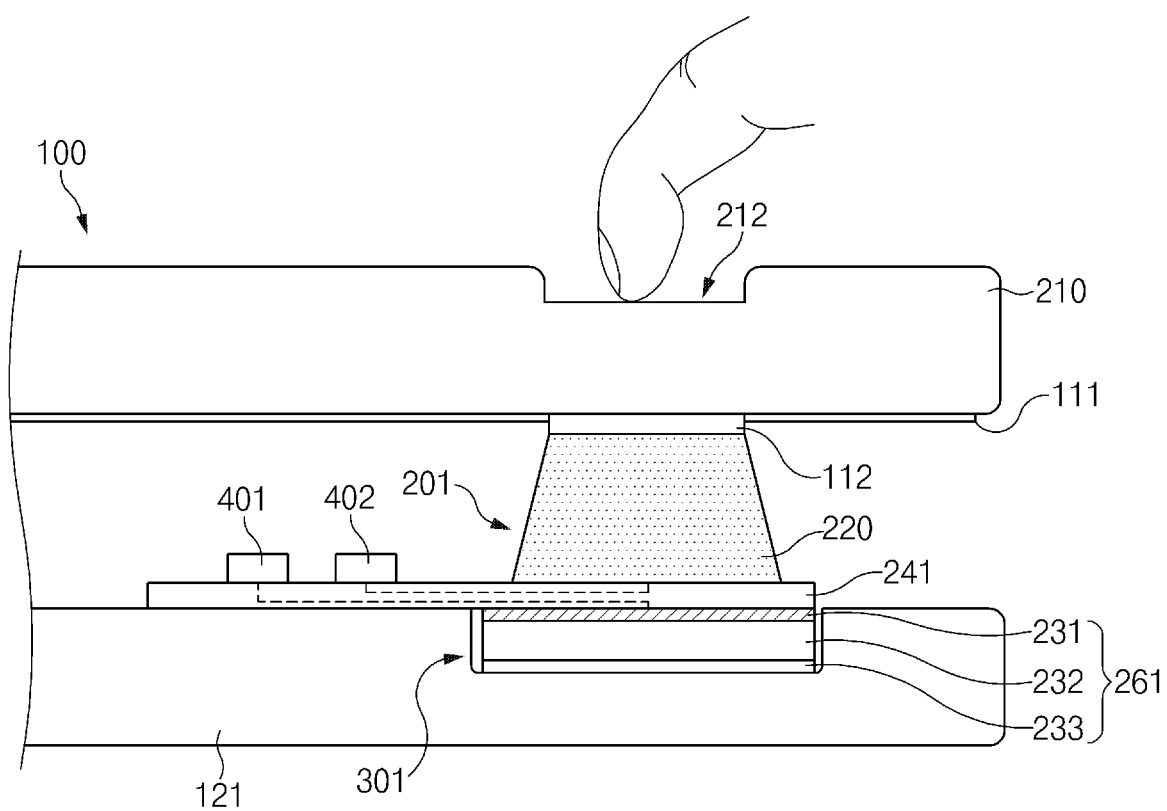
FIG. 2 is a view illustrating an example of a first shape of a partial integrated sensor structure according to an embodiment of the present disclosure.

FIG. 2 is a view illustrating an example of a first shape of a partial integrated sensor structure according to an embodiment of the present disclosure.

Referring to FIG. 2, an integrated sensor structure according to an embodiment of the present disclosure may include a first outer cover 210, a first integrated sensor 201, and a first bracket 121. The first integrated sensor 201 may include a first fingerprint sensor 220 and a first pressure sensor 261. In addition, the integrated sensor structure may further include a film layer 111 positioned under the first outer cover 210, and an adhesive layer 112 interposed between the first fingerprint sensor 220 and the first outer cover 210. The film layer 111 may include a printed layer (e.g., a logo or the like) positioned under the first outer cover 210. A region, in which the first integrated sensor 201 is positioned, of the film layer 111 may be removed or may be provided to have a relatively higher light transmittance than a surrounding region. For example, a paint or an ink applied to the region, in which the first integrated sensor 201 is positioned, of the film layer 111 may be different from that of the surrounding region, or the region, in which the first integrated sensor 201 is positioned, of the film layer 111 may be formed to be relatively thinner than the surrounding region. The adhesive layer 112 may include an optical adhesive layer (e.g., OCA) which has no influence on radiating and receiving a light associated with fingerprint recognition.

According to an embodiment of the present disclosure, the first outer cover 210 may be formed of a transparent material, and may be positioned to cover the display panel 160 and the first integrated sensor 201. A first guard recess 212 may be positioned, for example, on the first outer cover 210. For example, the first guard recess 212 may be positioned on a first surface of the first outer cover 210, which is exposed to the outside. Alternatively, unlike illustration, the first guard recess 212 may be positioned on a second surface of the first outer cover 210, which is opposite to the first surface. As described above, the first guard recess 212 may be vertically aligned with the first integrated sensor 201.

According to an embodiment of the present disclosure, the first integrated sensor 201 may include the first fingerprint sensor 220 positioned under the first outer cover 210, the first pressure sensor 261 positioned under the first fingerprint sensor 220, a first auxiliary printed circuit board 241 interposed between the first fingerprint sensor 220 and the first pressure sensor 261, and a pressure sensor driving IC 401 and a fingerprint sensor driving IC 402 positioned on the first auxiliary printed circuit board 241. For example, the pressure sensor driving IC 401 and the fingerprint sensor driving IC 402 may be integrally implemented with one IC. At least a portion of the first auxiliary printed circuit board 241 may be implemented with, for example, a flexible printed circuit board (FPCB).

According to an embodiment of the present disclosure, the first fingerprint sensor 220 and the first pressure sensor 261 may be vertically positioned, and a wiring associated with the first fingerprint sensor 220 may be connected with the fingerprint sensor driving IC 402 through the first auxiliary printed circuit board 241. The first fingerprint sensor 220 may be positioned on an upper surface of the first auxiliary printed circuit board 241, may emit a signal (at least one of a signal in a visible light wavelength range, a signal in a near infrared wavelength range, or an ultrasonic signal) in a specified wavelength range toward an upper side (a direction from a housing bottom to an outer cover), and may collect a reflected signal corresponding to the emitted signal. Alternatively, the first fingerprint sensor 220 may include two electrodes, and may obtain a fingerprint-related image by sensing a change in a capacitance formed between the two electrodes. The first pressure sensor 261 may be positioned under the first auxiliary printed circuit board 241. A wiring associated with the first pressure sensor 261 may be connected with the pressure sensor driving IC 401 through the first auxiliary printed circuit board 241. The first pressure sensor 261 may include a first electrode layer 231, a dielectric layer 232, and a second electrode layer 233, which are positioned under the first auxiliary printed circuit board 241. The first pressure sensor 261 may be positioned in a first seating recess 301 of the first bracket 121. The top of the first seating recess 301 may be sealed by the first auxiliary printed circuit board 241. The dielectric layer 232 may include silicon or an air layer. The first pressure sensor 261 may perform a role of a home key, for example.

As described above, in the integrated sensor structure according to an embodiment of the present disclosure, since the first pressure sensor 261 (e.g., the first electrode layer 231, the dielectric layer 232, and the second electrode layer 233) is positioned in the first seating recess 301 formed at the first bracket 121 and the first auxiliary printed circuit board 241 is shared and used, even though sensors are stacked, a height of a bracket surface may correspond to only a height of the first fingerprint sensor 220. Also, the electronic device 100 may improve the light radiation and receipt efficiency of the first fingerprint sensor 220 by making a thickness of the first outer cover 210, at which the first guard recess 212 is positioned, thinner than that of a periphery thereof by the first guard recess 212.

Figure 3:
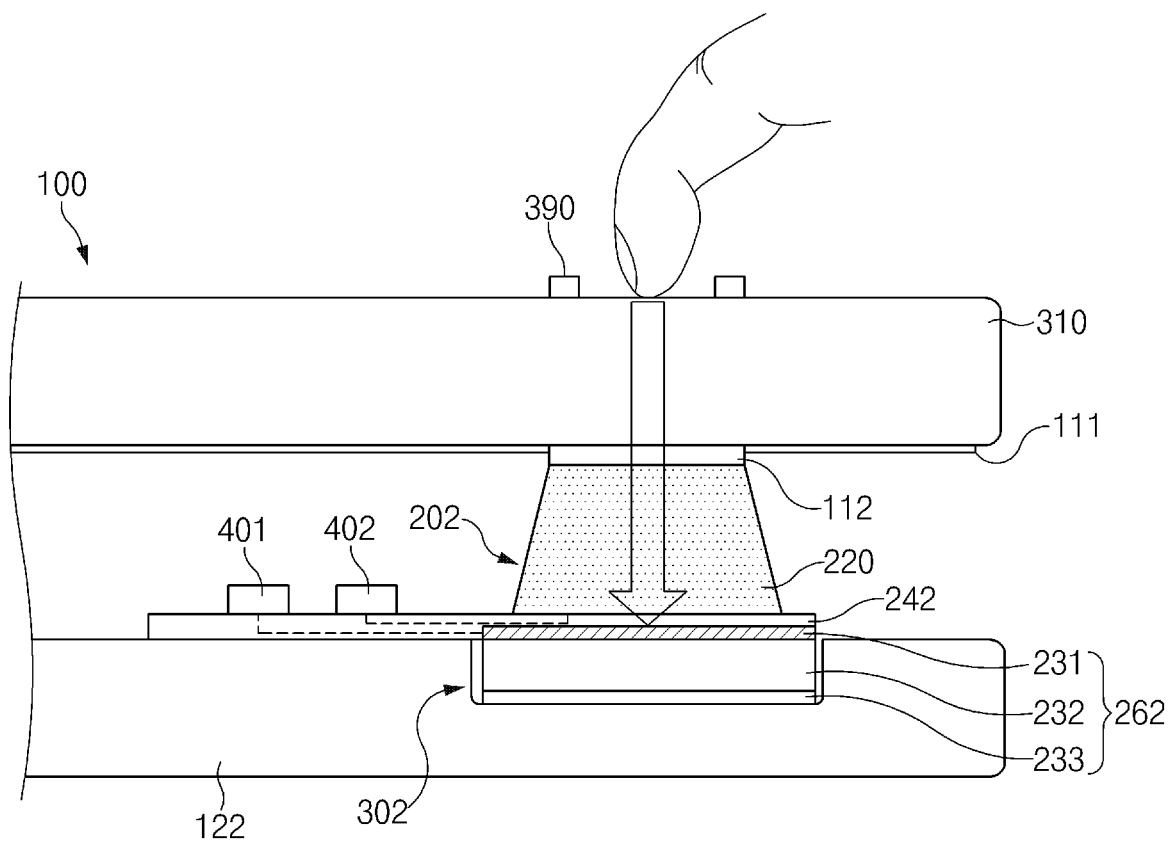
FIG. 3 is a view illustrating an example of a second shape of a partial integrated sensor structure according to an embodiment of the present disclosure.

FIG. 3 is a view illustrating an example of a second shape of a partial integrated sensor structure according to an embodiment of the present disclosure.

Referring to FIG. a second integrated sensor 202 may include the first fingerprint sensor 220 and a second pressure sensor 262. The first fingerprint sensor 220 may include a sensor which is substantially identical or similar to the fingerprint sensor described with reference to FIG. 2. At least a portion of at least one electrode layer (e.g., the first electrode layer 231) in the second pressure sensor 262 may be formed at a second auxiliary printed circuit board 242. The dielectric layer 232 and the second electrode layer 233 may be positioned in a second seating recess 302 provided at a second bracket 122. The second seating recess 302 may have a relatively low height compared with the first seating recess 301 described with reference to FIG. 2. The second electrode layer 233 of the second pressure sensor 262 may be positioned to contact a bottom surface of the second seating recess 302. The second auxiliary printed circuit board 242 may be positioned to cover the second seating recess 302 of the second bracket 122. A surrounding space of the first electrode layer 231 and the second electrode layer 233 may be sealed to seal the dielectric layer 232 between the first electrode layer 231 and the second electrode layer 233. Alternatively, the first electrode layer 231 and the second electrode layer 233 may be spaced from each other by a given interval, and a sealing structure may be formed as the second auxiliary printed circuit board 242 covers the top of the second seating recess 302. According to various embodiments, the dielectric layer 232 may include silicon.

According to an embodiment of the present disclosure, the integrated sensor structure of the second example may include a second outer cover 310 different from the first outer cover 210 in the integrated sensor structure of the first example. A separate first guard recess may not be formed at the second outer cover 310, and a front surface and a back surface of the second outer cover 310 may be provided to be flat. The second outer cover 310 may be overall formed of a material which is good to such an extent that a light transmittance has no influence on light radiation and receipt associated with fingerprint recognition of the first fingerprint sensor 220. The light transmittance of the second outer cover 310 may vary with sensitivity of the first fingerprint sensor 220, the light collection and processing capability of the first fingerprint sensor 220, or the like. According to various embodiments, a protrusion 390 may be positioned on one side (e.g., a region under which the second integrated sensor 202 is positioned) of the front surface of the second outer cover 310. The protrusion 390 may protrude compared with a peripheral region of an outer cover and may be provided in the form of a band. The protrusion 390 may be formed of a material which is identical or similar to the outer cover. For example, at least a portion of the protrusion 390 may be formed to be transparent. As the user contacts the protrusion 390 in the process of contacting a surface of the outer cover, the user may intuitively perceive a location of an integrated sensor.

Some (e.g., the adhesive layer 112, the film layer 111, and the like) of components of the integrated sensor structure of the second example may be implemented to be identical or similar to the components described with reference to FIG. 2.

Figure 4:
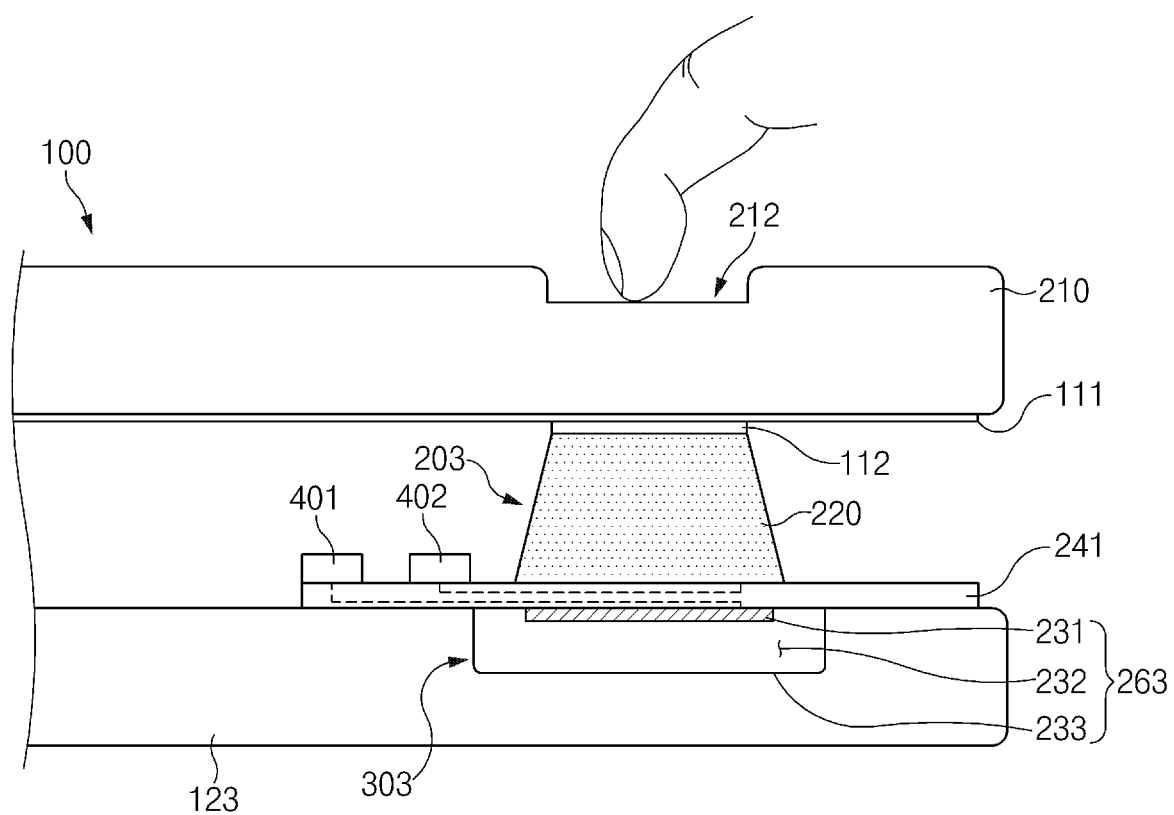
FIG. 4 is a view illustrating an example of a third shape of a partial integrated sensor structure according to an embodiment of the present disclosure.

FIG. 4 is a view illustrating an example of a third shape of a partial integrated sensor structure according to an embodiment of the present disclosure.

Referring to FIG. 4, the integrated sensor structure of the third shape may include the first outer cover 210, a third integrated sensor 203, and a third bracket 123. A configuration of the first outer cover 210 may be substantially identical or similar to the configuration of the outer cover described with reference to FIG. 2.

According to an embodiment of the present disclosure, the third integrated sensor 203 may include the first fingerprint sensor 220, a third pressure sensor 263, and the first auxiliary printed circuit board 241. The first fingerprint sensor 220 may include a fingerprint sensor which is substantially identical or similar to the fingerprint sensor described with reference to FIG. 2. The first fingerprint sensor 220 may be adhered with the back surface of the first outer cover 210 or the film layer 111 through the adhesive layer 112. The first fingerprint sensor 220 may be positioned on the first auxiliary printed circuit board 241.

According to an embodiment of the present disclosure, the third bracket 123 may include, for example, a third seating recess 303 which is recessed by a given depth. At least a portion of the third bracket 123 where the third seating recess 303 is formed may include a metal layer. The first auxiliary printed circuit board 241 may be positioned to cover the whole opening of the third seating recess 303. For example, a periphery of the first auxiliary printed circuit board 241 may be positioned to cover the opening of the third seating recess 303 and the surroundings of the opening. In addition, an adhesive layer may be interposed between the first auxiliary printed circuit board 241 and the third bracket 123 to seal the third seating recess 303. The interior (e.g., an air layer) of the third seating recess 303 may be used as a dielectric layer. As such, the third pressure sensor 263 may include the first electrode layer 231 positioned under the first auxiliary printed circuit board 241, the dielectric layer 232 corresponding to an inner space of the third seating recess 303, which is filled by air, and the second electrode layer 233 formed of a bottom surface of the third seating recess 303 or a metal layer of a lateral portion of the third seating recess 303.

According to an embodiment of the present disclosure, the fingerprint sensor driving IC 402 for driving the first fingerprint sensor 220 and the pressure sensor driving IC 401 for driving the third pressure sensor 263 may be positioned on the first auxiliary printed circuit board 241.

As described above, in the case of the integrated sensor structure of the third example, a seating recess and a bracket, at least a portion of which is formed of metal, may be used as a part of components of a pressure sensor.

Figure 5:
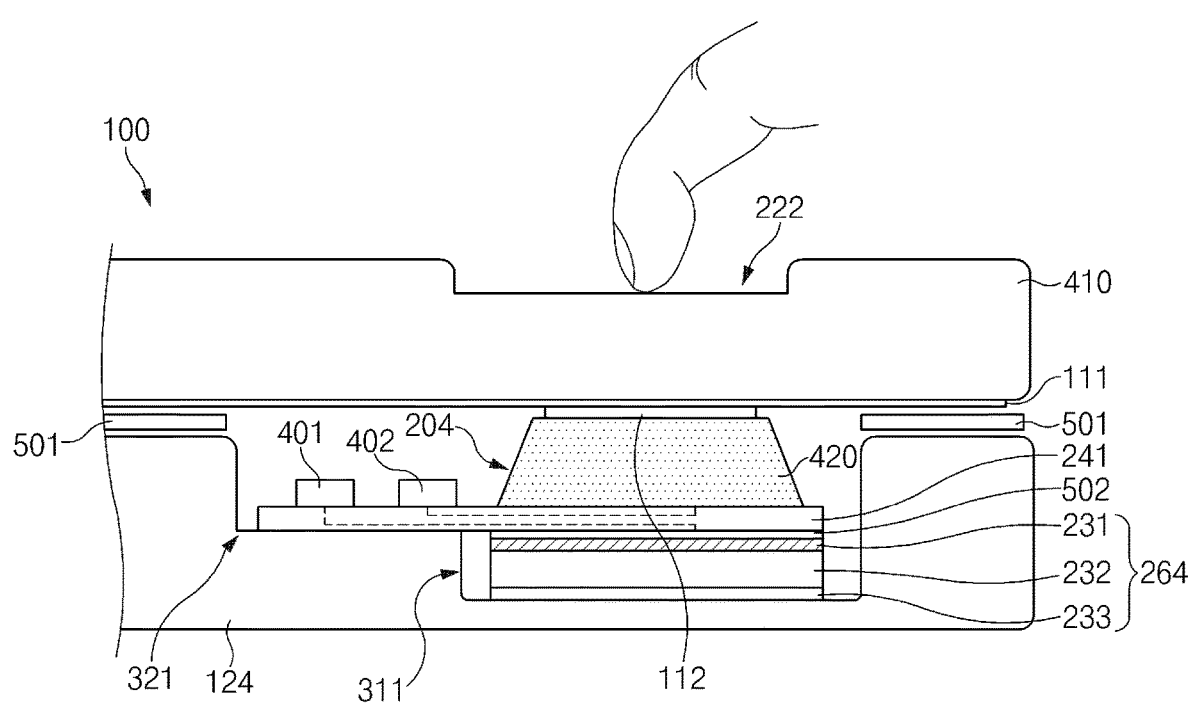
FIG. 5 is a view illustrating an example of a fourth shape of a partial integrated sensor structure according to an embodiment of the present disclosure.

FIG. 5 is a view illustrating an example of a fourth shape of a partial integrated sensor structure according to an embodiment of the present disclosure.

Referring to FIG. 5, the integrated sensor structure of the fourth example may include a third outer cover 410, a fourth integrated sensor 204, and a fourth bracket 124.

According to an embodiment of the present disclosure, for example, the third outer cover 410 may include a second guard recess 222, the region of which is relatively wider than the region of the first guard recess 212 described with reference to FIG. 2, and the depth of which is identical or similar to the depth of the first guard recess 212. Alternatively, the second guard recess 222 may include a relatively wide and deep (or shallow) recess region compared with the first guard recess 212. According to an embodiment, the size of the second guard recess 222 may be designed with regard to obtaining a fingerprint, the size of which is not smaller than a given size necessary for fingerprint recognition. As described above, the film layer 111 may be positioned under the third outer cover 410. The film layer 111 corresponding to a region where the fourth integrated sensor 204 and the third outer cover 410 face each other may be removed.

According to an embodiment of the present disclosure, the fourth bracket 124 may include, for example, a first main seating recess 311 and a first sub seating recess 321. The first main seating recess 311 may have, for example, a width corresponding to the size of the second guard recess 222. The first main seating recess 311 and the first sub seating recess 321 may have different recessed depths. For example, a recessed depth of the first main seating recess 311 may be deeper than a recessed depth of the first sub seating recess 321. According to an embodiment, the first main seating recess 311 may be formed to have a depth similar to the height of the fourth integrated sensor 204. The depth of the first sub seating recess 321 may have a depth corresponding to the height of the first auxiliary printed circuit board 241 and the driving ICs 401 and 402 (or a greater depth than the height thereof).

According to an embodiment of the present disclosure, a fourth pressure sensor 264, the first auxiliary printed circuit board 241, and a second fingerprint sensor 420 may be positioned in the first main seating recess 311 in a stacked shape. The fourth bracket 124 may include side walls forming the first main seating recess 311 and the first sub seating recess 321. A first adhesive layer 501 may be interposed between at least a part of the side walls and the third outer cover 410 (or the film layer 111). The first adhesive layer 501 may seal the first main seating recess 311 and the first sub seating recess 321 while improving the binding force between the fourth bracket 124 and the third outer cover 410.

According to an embodiment of the present disclosure, the fourth integrated sensor 204 may include the second fingerprint sensor 420 and the fourth pressure sensor 264. The second fingerprint sensor 420 may be provided to emit a light over a relatively wide range compared with the first fingerprint sensor 220 and to receive a reflected light. The adhesive layer 112 may be interposed between the second fingerprint sensor 420 and the third outer cover 410 (or the film layer 111). The adhesive layer 112 may support the second fingerprint sensor 420 so as to be fixed. The fourth pressure sensor 264 may be provided to sense a pressure which is applied over a relatively wide range compared with the above-described pressure sensors. The first electrode layer 231 of the fourth pressure sensor 264 may be physically fixed to the first auxiliary printed circuit board 241 through a third adhesive layer 502, and may be electrically connected with the first auxiliary printed circuit board 241 (e.g., by using a wiring). The second electrode layer 233 may be positioned to face the first electrode layer 231, and the dielectric layer 232 may be interposed between the first electrode layer 231 and the second electrode layer 233.

According to an embodiment of the present disclosure, a portion of the first auxiliary printed circuit board 241 may be interposed between the second fingerprint sensor 420 and the fourth pressure sensor 264, and the remaining portion thereof may be extended from the portion of the first auxiliary printed circuit board 241 so as to be positioned at the first sub seating recess 321. The fingerprint sensor driving IC 402 and the pressure sensor driving IC 401 may be positioned on the remaining portion of the first auxiliary printed circuit board 241. The third adhesive layer 502 may be interposed between the fourth pressure sensor 264 and the first auxiliary printed circuit board 241. The third adhesive layer 502 may fix the fourth pressure sensor 264 so as not to be detached from the first auxiliary printed circuit board 241. According to various embodiments, at least a portion of the fourth bracket 124 (e.g., the first main seating recess 311) which contacts the second electrode layer 233 of the fourth pressure sensor 264 may be formed of metal. As such, the at least a portion of the fourth bracket 124 may be used as a ground layer of the fourth pressure sensor 264.

Figure 6:
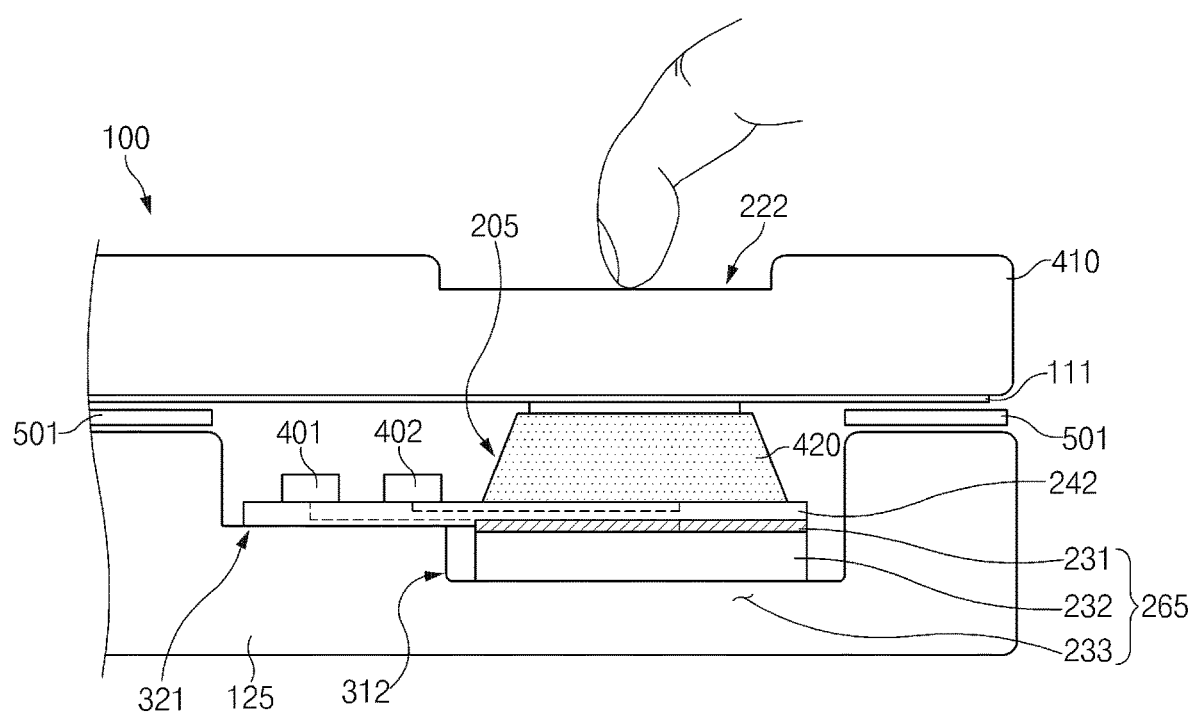
FIG. 6 is a view illustrating an example of a fifth shape of a partial integrated sensor structure according to an embodiment of the present disclosure.

FIG. 6 is a view illustrating an example of a fifth shape of a partial integrated sensor structure according to an embodiment of the present disclosure.

Referring to FIG. 6, the integrated sensor structure of the fifth shape may include the third outer cover 410, a fifth integrated sensor 205, and the fifth bracket 125. A configuration of the third outer cover 410 may be substantially identical or similar to the configuration of the outer cover described with reference to FIG. 5.

According to an embodiment of the present disclosure, the fifth integrated sensor 205 may include the second fingerprint sensor 420 and a fifth pressure sensor 265. A shape of the second fingerprint sensor 420 may be substantially identical or similar to the shape of the fingerprint sensor described with reference to FIG. 5. At least a portion of the first electrode layer 231 of the fifth pressure sensor 265 may be formed at the second auxiliary printed circuit board 242. As the fifth pressure sensor 265 is positioned in a second main seating recess 312 having a relatively wide seating region, the first electrode layer 231 formed at the second auxiliary printed circuit board 242 may be formed to be relatively wide compared with an electrode layer formed at the second auxiliary printed circuit board 242. The dielectric layer 232 may be positioned under the first electrode layer 231. One surface of the dielectric layer 232 may face the first electrode layer 231, and an opposite surface of the dielectric layer 232 may face a bottom surface of the second main seating recess 312. A first electrode layer of a pressure sensor may be formed inside the second auxiliary printed circuit board 242. A portion of the second auxiliary printed circuit board 242 may be positioned on the second main seating recess 312, and the remaining portion thereof may be at the first sub seating recess 321. The fingerprint sensor driving IC 402 and the pressure sensor driving IC 401 may be positioned on the first auxiliary printed circuit board 321 positioned at the first sub seating recess 321.

According to an embodiment of the present disclosure, a fifth bracket 125 may include the second main seating recess 312 and the first sub seating recess 321. As at least a portion of the first electrode layer 231 of the fifth pressure sensor 265 is formed in the second auxiliary printed circuit board 242 and the second electrode layer 233 uses at least a portion of the fifth bracket 125, the second main seating recess 312 may be recessed by a relatively shallow depth compared with the first main seating recess 311 described with reference to FIG. 5. At least a portion of the second main seating recess 312 may be formed of a metal layer. The second main seating recess 312 formed of the metal layer may be used as the second electrode layer 233 (e.g., a ground layer) of the fifth pressure sensor 265.

In addition, according to an embodiment of the present disclosure, adhesive layers 501 may be positioned on at least a portion of a region, which faces the third outer cover 410, of an upper surface of a side wall, which surrounds the second main seating recess 312 and the first sub seating recess 321, of the fifth bracket 125.

Figure 7:
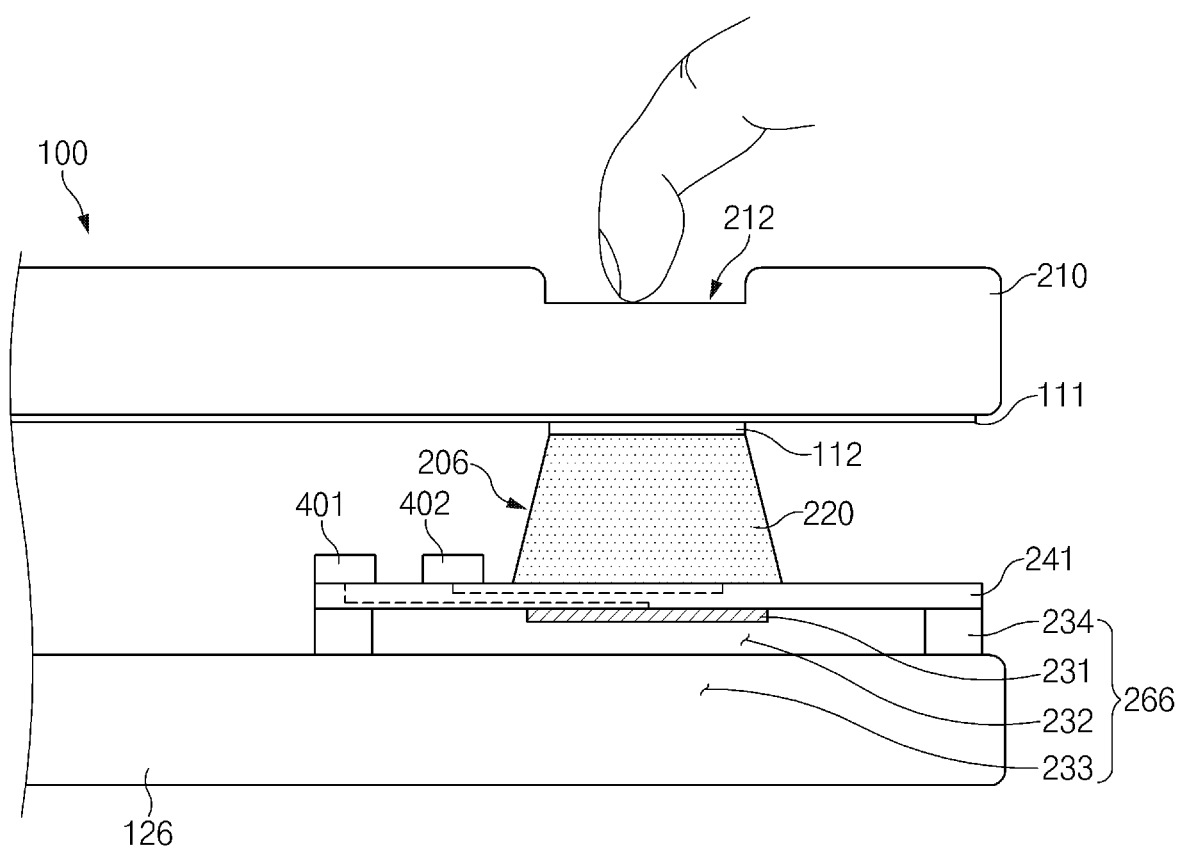
FIG. 7 is a view illustrating an example of a sixth shape of a partial integrated sensor structure according to an embodiment of the present disclosure.

FIG. 7 is a view illustrating an example of a sixth shape of a partial integrated sensor structure according to an embodiment of the present disclosure.

Referring to FIG. 7, the integrated sensor structure of the sixth example may include the first outer cover 210, a sixth integrated sensor 206, and a sixth bracket 126. A configuration of the first outer cover 210 may be substantially identical or similar to the configuration of the outer cover described with reference to FIG. 2. In addition, the film layer 111 may be positioned under the first outer cover 210, and the adhesive layer 112 may be interposed between the first fingerprint sensor 220 and the first outer cover 210 (or the film layer 111).

According to an embodiment of the present disclosure, the sixth integrated sensor 206 may include the first fingerprint sensor 220 and a sixth pressure sensor 266. The first fingerprint sensor 220 may be substantially identical or similar to the fingerprint sensor described with reference to FIG. 2 or the like. The first fingerprint sensor 220 may be positioned on the first auxiliary printed circuit board 241. The first auxiliary printed circuit board 241 may be substantially identical or similar to the auxiliary printed circuit board described with reference to FIG. 2 or the like. The sixth pressure sensor 266 may be positioned under the first auxiliary printed circuit board 241.

According to an embodiment of the present disclosure, the sixth pressure sensor 266 may include the first electrode layer 231 which is positioned under the first auxiliary printed circuit board 241, the second electrode layer 233 which is positioned to be spaced from the first electrode layer 231 by a given interval and corresponds to a portion of the sixth bracket 126, and a side wall 234 which is positioned on the surroundings of the dielectric layer (or on a periphery of a lower surface of the first auxiliary printed circuit board 241) to thus close a gap between the first electrode layer 231 and the second electrode layer 233. The side wall 234 may be provided in the form of a band surrounding the first electrode layer 231, for example. The dielectric layer 232 may include an air layer. In addition, the fingerprint sensor driving IC 402 and the pressure sensor driving IC 401 may be positioned on the first auxiliary printed circuit board 241.

According to an embodiment of the present disclosure, the sixth bracket 126 may be provided without a separate recess. At least a portion of the sixth bracket 126 may include a metal layer. For example, at least a portion of a region, which faces the first electrode layer 231, of the sixth bracket 126 may be formed of a metal layer to form the second electrode layer 233.

Figure 8A:
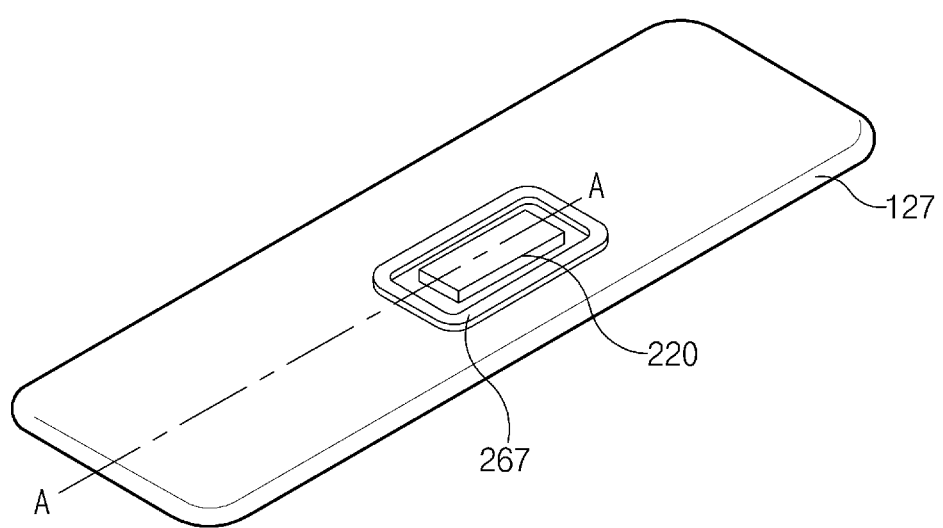
FIG. 8A is a view illustrating an example of a shape in which an outer cover is excluded from a seventh shape of an integrated sensor structure according to an embodiment of the present disclosure.
Figure 8B:
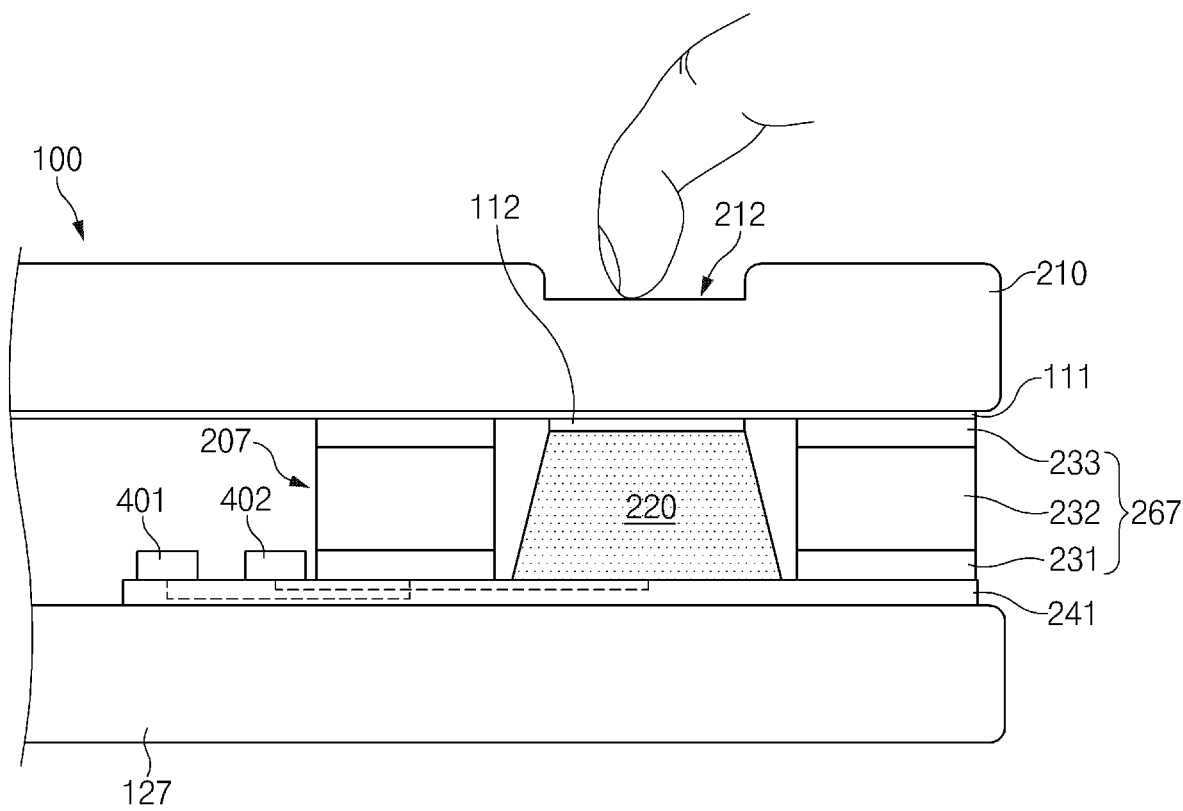
FIG. 8B is a sectional view of the seventh shape according to an embodiment of the present disclosure.

FIG. 8A is a view illustrating an example of a shape in which an outer cover is excluded from the seventh shape of the integrated sensor structure according to an embodiment of the present disclosure, and FIG. 8B is a sectional view of the seventh shape according to an embodiment of the present disclosure.

Referring to FIGS. 8A and 8B, the integrated sensor structure of the seventh shape may include the first outer cover 210, a seventh integrated sensor 207, and a seventh bracket 127. The first outer cover 210 may include an outer cover which is substantially identical or similar to the outer cover described with reference to FIG. 2. The film layer 111 may be positioned under the first outer cover 210. The first guard recess 212 may be positioned at the first outer cover 210.

According to an embodiment of the present disclosure, the seventh integrated sensor 207 may include the first fingerprint sensor 220 and a seventh pressure sensor 267. The first fingerprint sensor 220 may include a sensor which is substantially identical or similar to the fingerprint sensor described with reference to FIG. 2. The first fingerprint sensor 220 may be positioned on the first auxiliary printed circuit board 241 (e.g., on a given central region of the first auxiliary printed circuit board 241). The first fingerprint sensor 220 may be positioned under the first outer cover 210 and may be fixed based on the adhesive layer 112.

According to an embodiment of the present disclosure, as described above, the seventh pressure sensor 267 may be provided in the form of a band surrounding the first fingerprint sensor 220. A height of the seventh pressure sensor 267 thus formed may be similar to a height of the first fingerprint sensor 220. The seventh pressure sensor 267 may include, in structure, the first electrode layer 231 (a sensor layer sensing an applied pressure) positioned on the first auxiliary printed circuit board 241, the dielectric layer 232 positioned on the first electrode layer 231, and the second electrode layer 233 (e.g., a ground electrode layer) positioned on the dielectric layer 232 and under the first outer cover 210. The dielectric layer 232 may include, for example, silicon. The fingerprint sensor driving IC 402 and the pressure sensor driving IC 401 may be positioned on a portion, which corresponds to the outside of the seventh pressure sensor 267, of the first auxiliary printed circuit board 241. Also, a wiring connecting the fingerprint sensor driving IC 402 and the first fingerprint sensor 220 and a wiring connecting the pressure sensor driving IC 401 and the seventh pressure sensor 267 may be positioned inside the first auxiliary printed circuit board 241.

According to an embodiment of the present disclosure, the seventh pressure sensor 267 may be vertically aligned with the first guard recess 212. According to an embodiment, the seventh pressure sensor 267 may be vertically aligned with the first guard recess 212 such that the border of the first guard recess 212 is positioned inside the seventh pressure sensor 267.

According to an embodiment of the present disclosure, a portion of the seventh bracket 127 may be positioned under the first auxiliary printed circuit board 241. For example, the seventh bracket 127 may be formed of a nonmetal layer. A portion of the seventh bracket 127 may perform a role of supporting the seventh integrated sensor 207.

Figure 9:
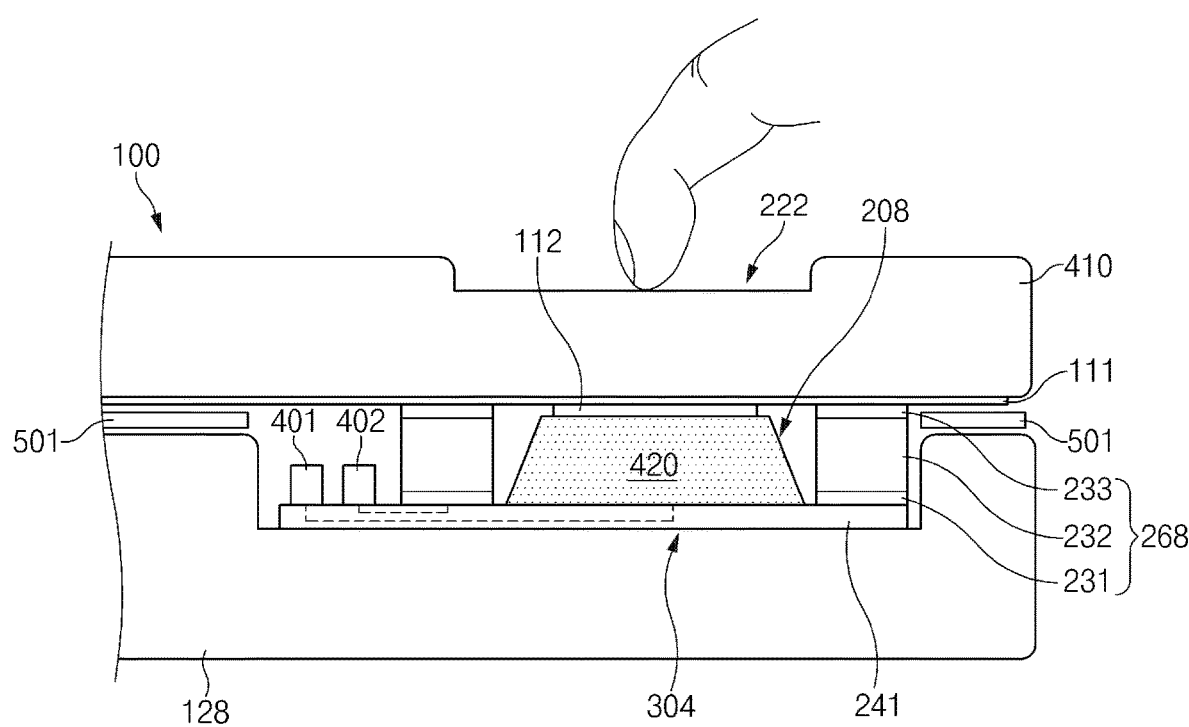
FIG. 9 is a view illustrating an eighth shape of an integrated sensor structure according to an embodiment of the present disclosure.

FIG. 9 is a view illustrating an eighth shape of an integrated sensor structure according to an embodiment of the present disclosure.

Referring to FIG. 9, the integrated sensor structure of the eighth example according to an embodiment of the present disclosure may include the third outer cover 410, an eighth integrated sensor 208, and an eighth bracket 128.

According to an embodiment of the present disclosure, the third outer cover 410 may include the second guard recess 222, which is recessed to be wider than the first guard recess 212 illustrated in FIG. 8B. The film layer 111 may be positioned under the third outer cover 410. A depth of the second guard recess 222 may be determined according to a material, permittivity, or the like of the third outer cover 410 or may be determined according to the performance of the second fingerprint sensor 420.

According to an embodiment of the present disclosure, the eighth integrated sensor 208 may include the second fingerprint sensor 420 vertically aligned with a region, in which the second guard recess 222 is positioned, of a lower surface of the third outer cover 410, and an eighth pressure sensor 268 positioned to surround the second fingerprint sensor 420. The second fingerprint sensor 420 may be provided to obtain, at once, fingerprint information of a relatively wide range compared with the first fingerprint sensor 220. The second fingerprint sensor 420 may be positioned on the first auxiliary printed circuit board 241. The eighth pressure sensor 268 may be provided in the form of a band surrounding the second fingerprint sensor 420. The eighth pressure sensor 268 may have the same height as the second fingerprint sensor 420. The eighth pressure sensor 268 may be positioned on an upper surface of the first auxiliary printed circuit board 241. At least a portion of the eighth pressure sensor 268 may be positioned, for example, to be vertically aligned inside the second guard recess 222. The eighth pressure sensor 268 may include the first electrode layer 231 positioned on the first auxiliary printed circuit board 241, the dielectric layer 232 positioned on the first electrode layer 231, and the second electrode layer 233 on the dielectric layer 232 and under the third outer cover 410. In addition, the eighth integrated sensor 208 may further include the fingerprint sensor driving IC 402 and the pressure sensor driving IC 401, and may further include wirings (e.g., wirings positioned in the first auxiliary printed circuit board 241) connecting the driving ICs with sensors. The first auxiliary printed circuit board 241 may be positioned in a fourth seating recess 304 of the eighth bracket 128.

According to an embodiment of the present disclosure, the eighth bracket 128 may support the third outer cover 410, and may include the fourth seating recess 304, in which the eighth integrated sensor 208 is positioned, on one side thereof. The fourth seating recess 304 may be recessed by a given depth, and a bottom surface of the fourth seating recess 304 may face one surface (e.g., a lower surface) of the first auxiliary printed circuit board 241 on which the eighth integrated sensor 208 is mounted. As such, the fourth seating recess 304 may include the bottom surface corresponding to the size of the first auxiliary printed circuit board 241.

In addition, the eighth bracket 128 may further include side walls forming the fourth seating recess 304, and the adhesive layers 501 which are adhered with the third outer cover 410 may be positioned on the side walls.

Figure 10A:
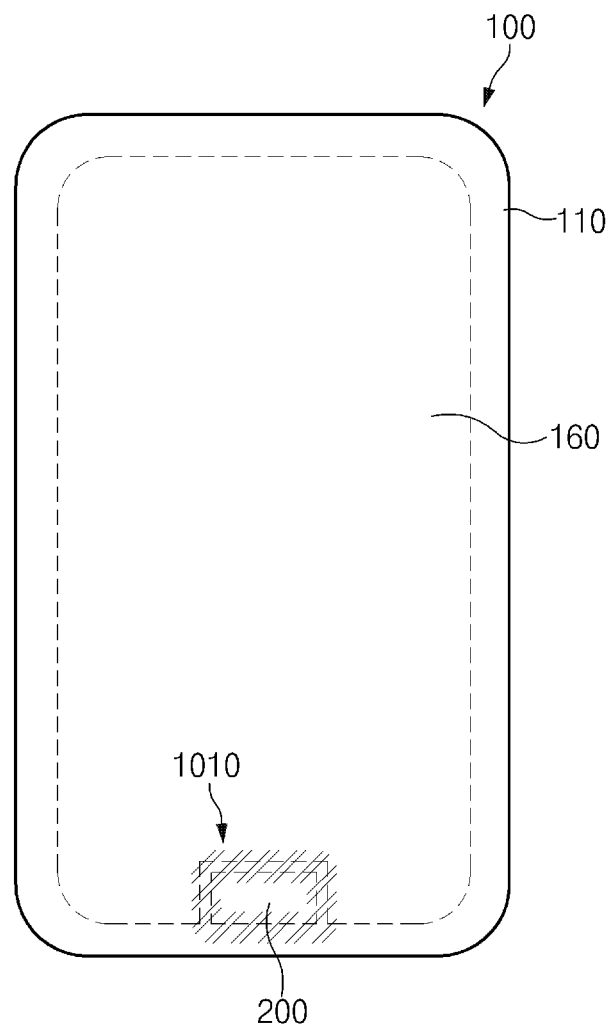
FIG. 10A is a view illustrating an example of the way to indicate an integrated sensor, according to an embodiment of the present disclosure.

FIG. 10A is a view illustrating an example of the way to indicate an integrated sensor, according to an embodiment of the present disclosure.

As illustrated in FIG. 10A, the electronic device 100 may include the outer cover 110, and may include the display panel 160 inside the outer cover 110. Also, the electronic device 100 may include the integrated sensor 200 positioned on one side of the display panel 160. A region, in which the integrated sensor 200 is positioned, of the display panel 160 may be positioned to surround a periphery of the integrated sensor 200, as illustrated in drawing. The electronic device 100 may mark a surrounding region 1010, in which the integrated sensor 200 is positioned, of the display panel 160 under control of the processor 140 (or at a specified period, in response to recognizing that the user grips the electronic device 100, or in real time) with a specified color. As such, the user may intuitively perceive a location where the integrated sensor 200 is positioned, based on the emission of light by the surrounding region 1010.

According to various embodiments, the brightness of the surrounding region 1010 of the display panel 160 may vary with a value of ambient illuminance. For example, the electronic device 100 may include an illumination sensor (or an ambient light sensor), and may set the brightness of a color of the surrounding region 1010 to be higher when ambient illuminance is relatively high. Alternatively, the electronic device 100 may set the brightness of the color of the surrounding region 1010 to be lower when the ambient illuminance is relatively low. According to various embodiments, the electronic device 100 may indicate a region in which the integrated sensor 200 is positioned, by outputting a specified object (e.g., a pattern of a specified shape) to the surrounding region 1010 of the display panel 160. As such, the user may perceive the region in which the integrated sensor 200 is positioned, as a home button.

Figure 10B:
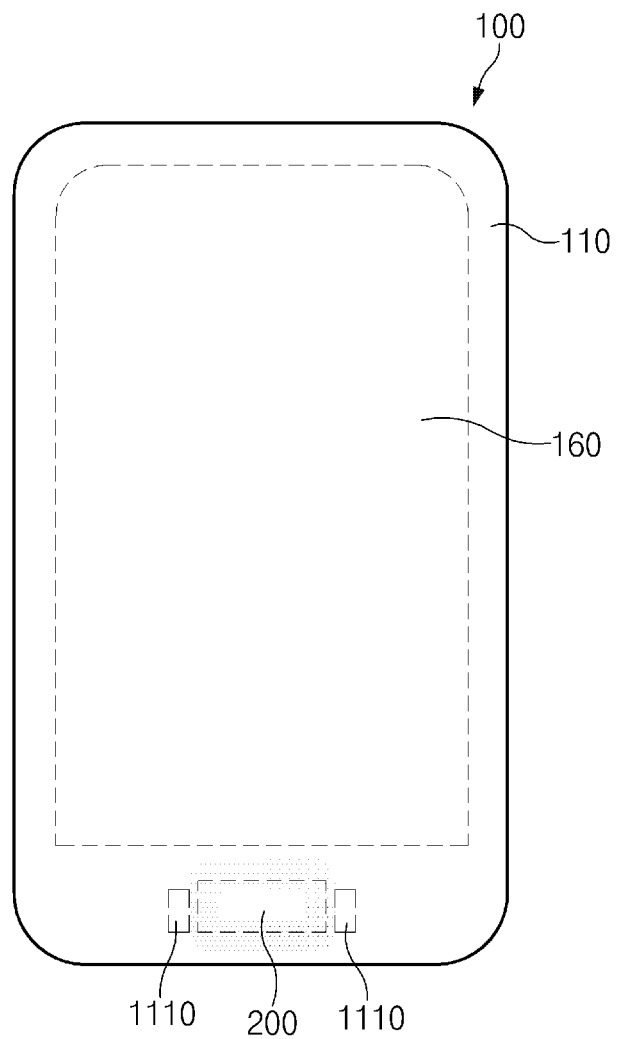
FIG. 10B is a view illustrating another example of the way to indicate an integrated sensor, according to an embodiment of the present disclosure.

FIG. 10B is a view illustrating another example of the way to indicate an integrated sensor, according to an embodiment of the present disclosure.

As illustrated in FIG. 10B, the electronic device 100 may include the outer cover 110, the display panel 160, the integrated sensor 200, and a light emitting unit 1110. The light emitting unit 1110 may be positioned in the vicinity of the integrated sensor 200. According to an embodiment, the light emitting unit 1110 may be positioned to surround the surroundings of the integrated sensor 200 in the form of a band. Alternatively, the light emitting unit 1110 may be individually positioned on the left side and the right side of the integrated sensor 200 by a given size. The light emitting unit 1110 may be represented by a specified color under control of the processor 140 of the electronic device 100.

Figure 11A:
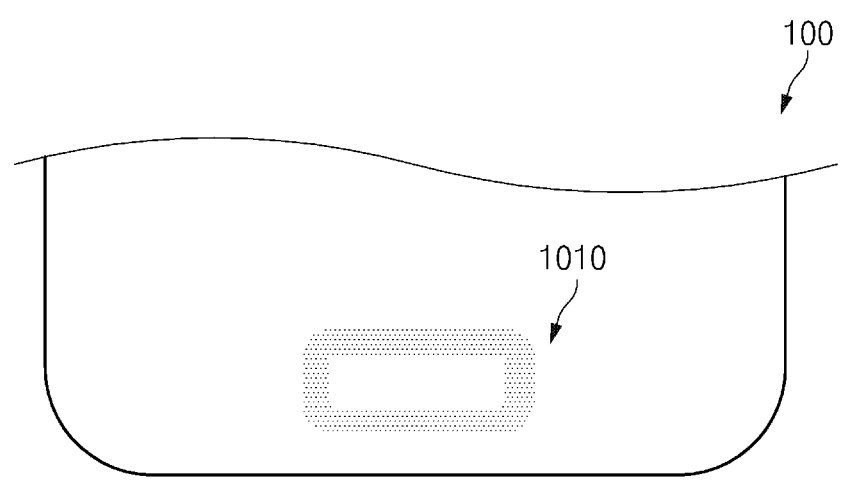
FIG. 11A is a view illustrating an example of the way to direct an integrated sensor according to an embodiment of the present disclosure.
Figure 11B:
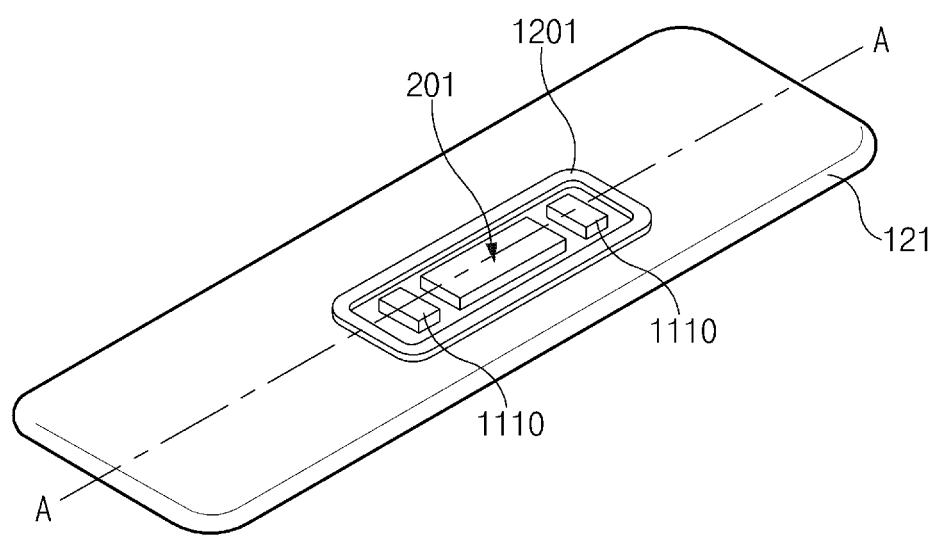
FIG. 11B is a view illustrating a shape of a partial integrated sensor structure according to an embodiment of the present disclosure.
Figure 11C:
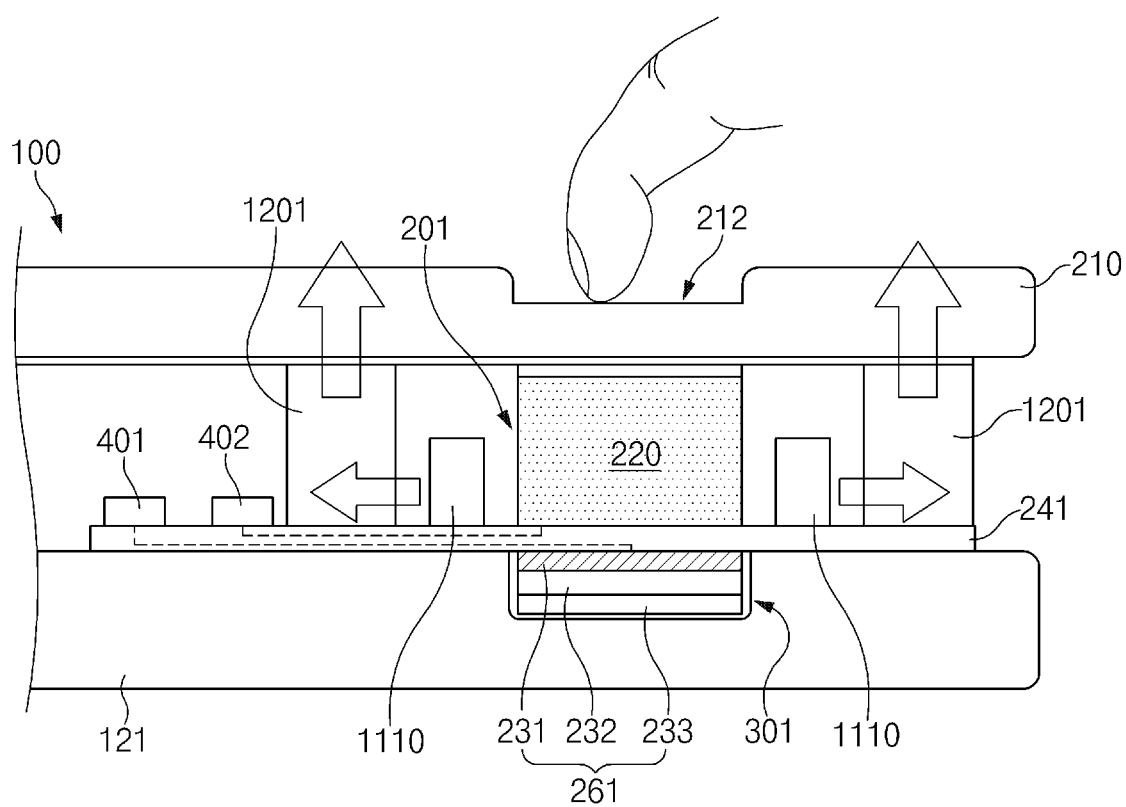
FIG. 11C is a sectional view of an integrated sensor structure of one shape associated with the emission of light by an integrated sensor according to an embodiment of the present disclosure.

FIG. 11A is a view illustrating an example of the way to direct an integrated sensor according to an embodiment of the present disclosure, and FIG. 11B is a view illustrating a shape of a partial integrated sensor structure according to an embodiment of the present disclosure. FIG. 11C is a sectional view of an integrated sensor structure of one shape associated with the emission of light by an integrated sensor according to an embodiment of the present disclosure.

As illustrated in FIG. 11A, the electronic device 100 may display the surrounding region 1010 in which an integrated sensor is positioned, in the form of a band. The electronic device 100 may control an output of a specified light with regard to the emission of light by the integrated sensor surrounding region 1010. For example, the electronic device 100 may allow the surrounding region 1010, in which the integrated sensor is positioned, to emit a light of a specified fluorescent color. In this regard, as illustrated in FIGS. 11B and 11C, the electronic device 100 may include the first outer cover 210, the first integrated sensor 201, the first bracket 121, and the first auxiliary printed circuit board 241, and may include the light emitting unit 1110 and a first waveguide 1201.

According to an embodiment of the present disclosure, as described above, the first outer cover 210 may include the first guard recess 212, and at least a portion thereof may be formed of a transparent material. The first integrated sensor 201 may include the first fingerprint sensor 220 and the first pressure sensor 261. The first fingerprint sensor 220 may emit a light to a surface facing the first outer cover 210 and then may collect a reflected light. The first fingerprint sensor 220 is illustrated as being rectangular in shape, but may be provided in the form of a rhombus as described with reference to FIG. 2 or the like. The first pressure sensor 261 may include the first electrode layer 231, the dielectric layer 232, and the second electrode layer 233, which are positioned in the first seating recess 301 provided at the first bracket 121. The first auxiliary printed circuit board 241 may be interposed between the first fingerprint sensor 220 and the first pressure sensor 261, and the fingerprint sensor driving IC 402 and the pressure sensor driving IC 401 positioned on the first auxiliary printed circuit board 241 may be respectively connected to a fingerprint sensor and a pressure sensor through wirings.

According to an embodiment of the present disclosure, the light emitting unit 1110 may be positioned on the first auxiliary printed circuit board 241. For example, the light emitting unit 1110 may be positioned at a location adjacent to the first fingerprint sensor 220. The light emitting unit 1110 is illustrated as being respectively positioned on the left and the right (or on the top and the bottom) so as to face each other with respect to the first fingerprint sensor 220. The light emitting unit 1110 may be connected to the printed circuit board 130 of the electronic device 100 through the first auxiliary printed circuit board 241, and may output a light of specified illuminance, based on a power from a battery and under control of the processor 140. A direction in which the light emitting unit 1110 outputs a light may be a lateral direction with respect to the illustrated drawing. For example, the light emitting unit 1110 may emit a light to the first waveguide 1201 of a band shape positioned to the light emitting units 1110.

According to an embodiment of the present disclosure, the first waveguide 1201 may be vertically interposed between the first auxiliary printed circuit board 241 and the first outer cover 210. Alternatively, the first waveguide 1201 may be horizontally interposed between the light emitting unit 1110 and the driving ICs 401 and 402. According to various embodiments, locations of the first waveguide 1201 and the light emitting unit 1110 may be changed. For example, the light emitting unit 1110 may be positioned further from the first integrated sensor 201 than the first waveguide 1201 (e.g., the light emitting unit 1110 may be positioned outside the first waveguide 1201), and the first waveguide 1201 may be positioned closer to the first integrated sensor 201 than the light emitting unit 1110 (e.g., the light emitting unit 1110 may be interposed between the light emitting unit 1110 and the first integrated sensor 201). The emission of light of a specified color by the first waveguide 1201 may be made based on a light which the light emitting unit 1110 emits, while the first waveguide 1201 supports the first outer cover 210.

Figure 11D:
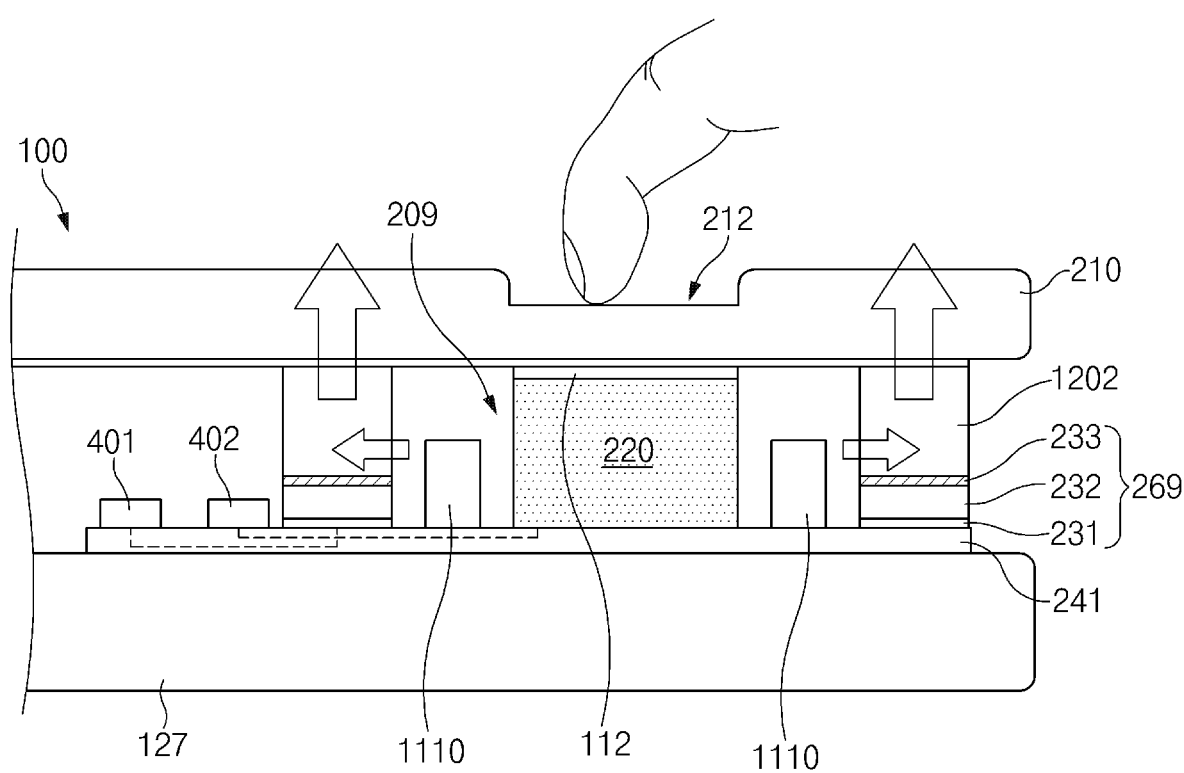
FIG. 11D is a sectional view of an integrated sensor structure of another shape associated with the emission of light by an integrated sensor according to an embodiment of the present disclosure.

FIG. 11D is a sectional view of an integrated sensor structure of another shape associated with the emission of light by an integrated sensor according to an embodiment of the present disclosure.

Referring to FIG. 11D, a partial integrated sensor structure of the present disclosure may include, for example, the first outer cover 210, a ninth integrated sensor 209, and the seventh bracket 127.

According to an embodiment of the present disclosure, the first outer cover 210 may include, for example, the first guard recess 212, and at least a portion thereof may be formed of a transparent material. The film layer 111 may be positioned under the first outer cover 210, and a region of the film layer 111, in which the ninth integrated sensor 209 is positioned, may be removed.

According to an embodiment of the present disclosure, the ninth integrated sensor 209 may include, for example, the first fingerprint sensor 220 and a ninth pressure sensor 269. The first fingerprint sensor 220 may be positioned at a location where the first fingerprint sensor 220 is vertically aligned with the first guard recess 212, and may radiate or receive a light associated with fingerprint recognition. In this regard, the first fingerprint sensor 220 may be positioned on the first auxiliary printed circuit board 241. The ninth pressure sensor 269 may be provided around the first fingerprint sensor 220 in the form of a band. The ninth pressure sensor 269 may include, for example, the first electrode layer 231 positioned on the first auxiliary printed circuit board 241, the dielectric layer 232 positioned on the first electrode layer 231, and the second electrode layer 233 on the dielectric layer 232. A second waveguide 1202 may be positioned on the second electrode layer 233. One side of the second waveguide 1202 may be in contact with the second electrode layer 233, and an opposite side thereof may be in contact with a lower surface of the first outer cover 210. The light emitting unit 1110 may be interposed between the ninth pressure sensor 269 and the first fingerprint sensor 220. The light emitting unit 1110 may generate a light under control of the processor 140 and may transfer the generated light to the second waveguide 1202. The second waveguide 1202 may be positioned on the ninth pressure sensor 269 and may emit a light in a specified shape based on the transferred light. Also, the second waveguide 1202 may transfer a pressure applied on the first outer cover 210 to the ninth pressure sensor 269. The fingerprint sensor driving IC 402 and the pressure sensor driving IC 401 may be mounted on the first auxiliary printed circuit board 241, and may be connected to a fingerprint sensor and a pressure sensor through wirings, respectively.

Figure 12A:
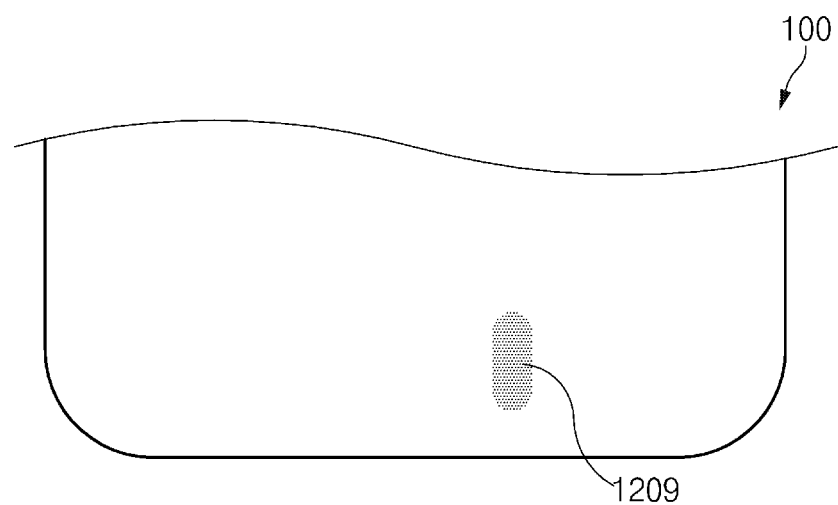
FIG. 12A is a view illustrating another shape of the way to direct an integrated sensor according to an embodiment of the present disclosure.
Figure 12B:
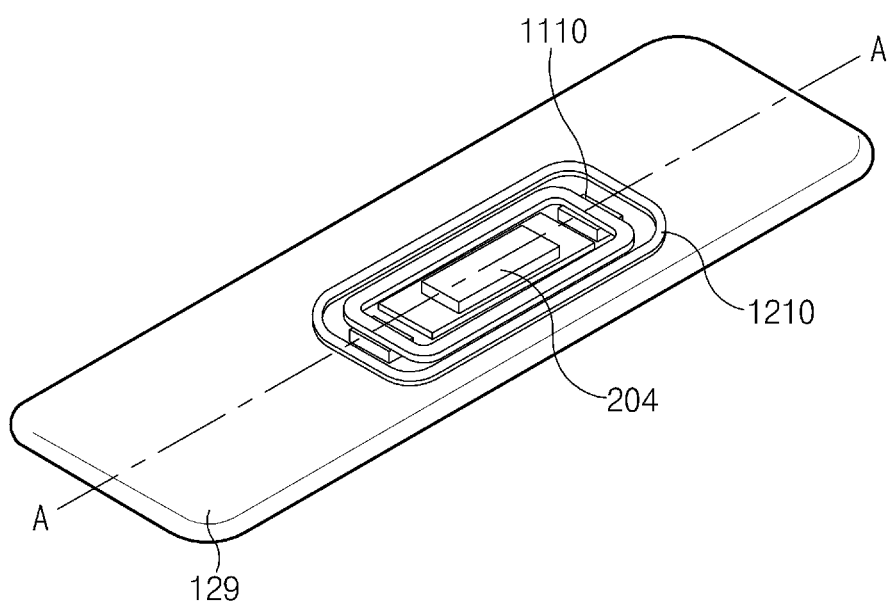
FIG. 12B is a view illustrating another shape of a partial integrated sensor structure according to an embodiment of the present disclosure.
Figure 12C:
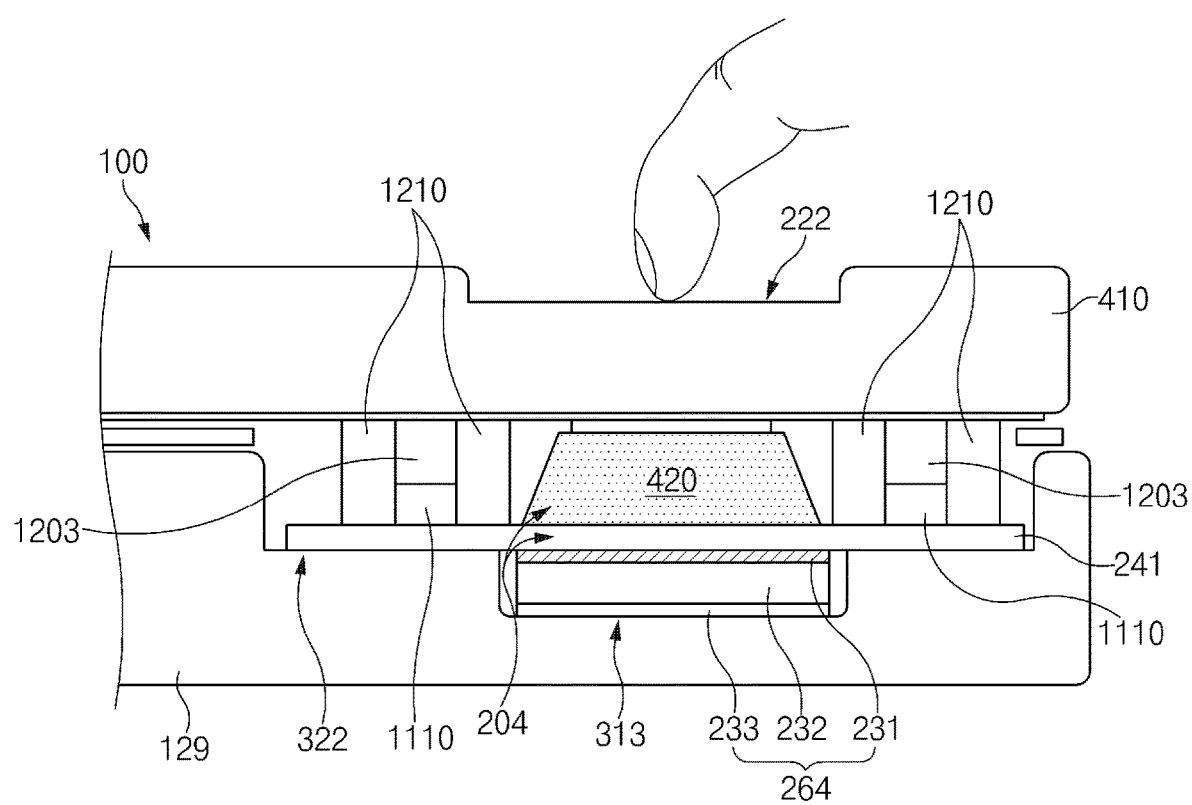
FIG. 12C is a sectional view of an integrated sensor structure of another shape according to an embodiment of the present disclosure.

FIG. 12A is a view illustrating another shape of the way to direct an integrated sensor according to an embodiment of the present disclosure, and FIG. 12B is a view illustrating another shape of a partial integrated sensor structure according to an embodiment of the present disclosure. FIG. 12C is a sectional view of an integrated sensor structure of another shape according to an embodiment of the present disclosure.

Referring to FIG. 12A, the electronic device 100 may generate a light 1209 of a specified shape on a region where an integrated sensor is positioned. As such, the electronic device 100 may display a light generation region of a given size through an outer cover as illustrated in drawing. Referring to FIGS. 12B and 12C, the electronic device 100 may include the third outer cover 410, the fourth integrated sensor 204, a ninth bracket 129, a third waveguide 1203, the light emitting unit 1110, and a light blocking part 1210. In addition, although not illustrated in drawings, driving ICs for driving the fourth integrated sensor 204, wirings connecting the driving ICs and the fourth integrated sensor 204, and wirings associated with the light emitting unit 1110 may be positioned inside and outside the first auxiliary printed circuit board 241.

According to an embodiment of the present disclosure, the third outer cover 410 may include, for example, the second guard recess 222, and at least a portion thereof may be formed of a transparent material. The third waveguide 1203 may be positioned under the second guard recess 222 so as to be aligned with the border of the second guard recess 222. The film layer 111 may be positioned under the third outer cover 410. Adhesive layers may be interposed between the film layer 111 and one surface of the ninth bracket 129, which faces the film layer 111.

According to an embodiment of the present disclosure, for example, the fourth integrated sensor 204 may include the second fingerprint sensor 420 which may emit and collect a light over a relatively wide region compared with the first fingerprint sensor 220, and the fourth pressure sensor 264 positioned under the second fingerprint sensor 420. For example, the fourth pressure sensor 264 may include, in a third main seating recess 313 provided at the ninth bracket 129, the first electrode layer 231 positioned under the first auxiliary printed circuit board 241, the dielectric layer 232 positioned under the first electrode layer 231, and the second electrode layer 233 positioned under the dielectric layer 232. The first auxiliary printed circuit board 241 may be positioned to cover the third main seating recess 313. The second fingerprint sensor 420 may be positioned on a central portion of the first auxiliary printed circuit board 241, and the light emitting unit 1110 and the light blocking part 1210 surrounding the light emitting unit 1110 may be positioned on a peripheral portion of the first auxiliary printed circuit board 241.

According to an embodiment of the present disclosure, as illustrated in drawing, the ninth bracket 129 may include the third main seating recess 313 which is recessed by a given depth (e.g., a height of the fourth pressure sensor 264) so as to be vertically aligned with the second guard recess 222 in location, and a second sub seating recess 322 which is recessed around the third main seating recess 313 by a smaller depth than the third main seating recess 313. The first auxiliary printed circuit board 241 may be positioned in the second sub seating recess 322.

According to an embodiment of the present disclosure, at least a portion of the light emitting unit 1110 may be positioned on the first auxiliary printed circuit board 241. For example, the light emitting unit 1110 may be positioned at a location corresponding to at least one of upper, lower, left, and right sides of the second fingerprint sensor 420. Alternatively, the light emitting unit 1110 may be positioned in the form of a band surrounding the second fingerprint sensor 420. The third waveguide 1203 may be positioned on the light emitting unit 1110. The third waveguide 1203 may be placed on the light emitting unit 1110 and may be positioned in the form of a band surrounding the second fingerprint sensor 420. When a light is generated from the light emitting unit 1110 positioned in at least a partial region, the whole band of the third waveguide 1203 may emit a light in a specified shape based on the corresponding light.

According to an embodiment of the present disclosure, the light blocking part 1210 may be positioned in such a way to surround opposite sides of the light emitting unit 1110 and the third waveguide 1203, and may be provided in such a way that an upper side of the third waveguide 1203 is opened. As such, a light emitted from the third waveguide 1203 (or a light guided by the third waveguide 1203) may be output upwardly through the light blocking part 1210. A band displayed by the third waveguide 1203 based on the light blocking part 1210 may be viewed more clearly. For example, an upper surface of the light blocking part 1210 may be in contact with the third outer cover 410 or the film layer 111, and a lower surface thereof may be in contact with the first auxiliary printed circuit board 241. In the case where the light emitting units 1110 are positioned on the left side and the right side of the second fingerprint sensor 420 and only any one of the light emitting units 1110 emits a light, as illustrated in FIG. 12A, the emission of light may be made at only a given portion.

Figure 13:
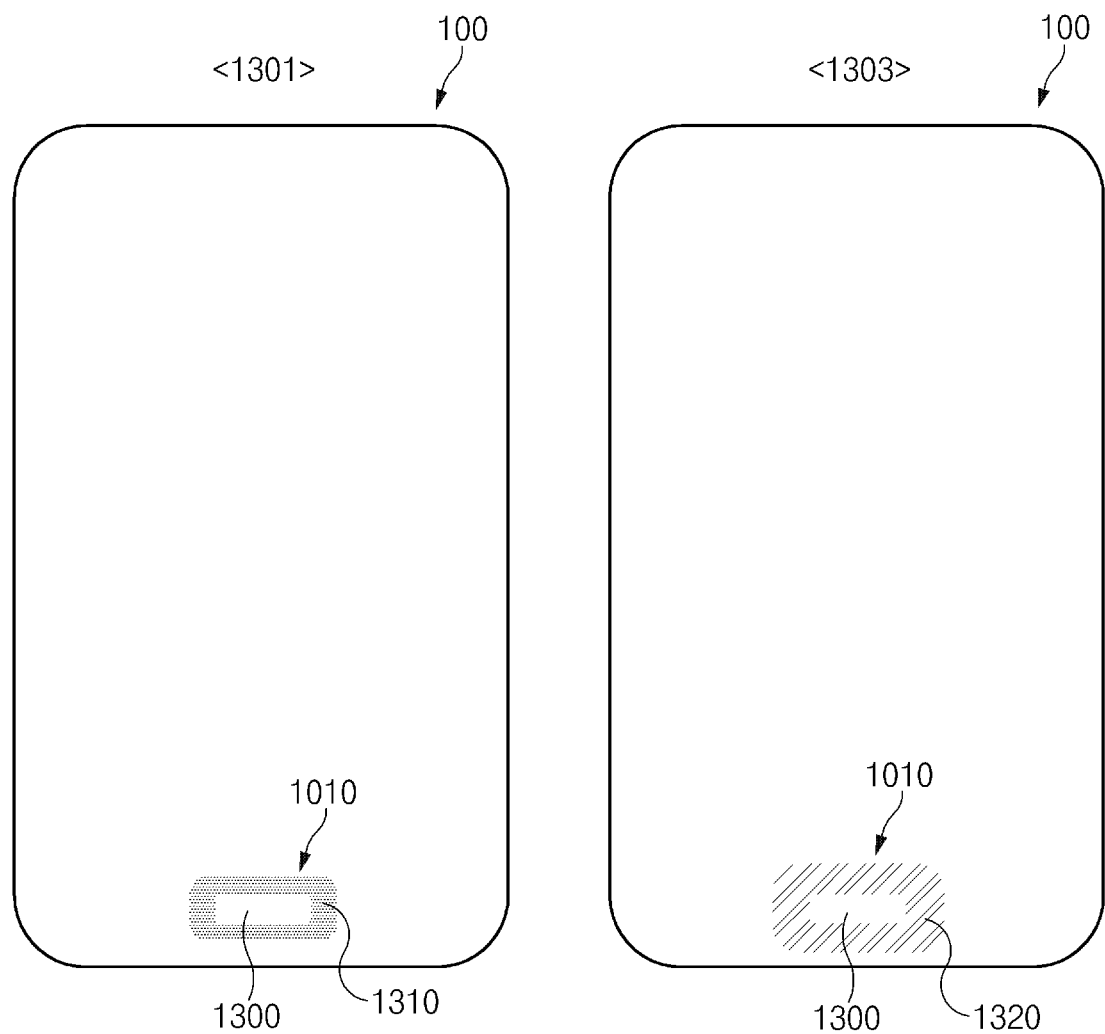
FIG. 13 is a view illustrating a first example of operating an electronic device including an integrated sensor according to an embodiment of the present disclosure.

FIG. 13 is a view illustrating a first example of operating an electronic device including an integrated sensor according to an embodiment of the present disclosure.

Referring to FIG. 13, for example, the electronic device 100 of the present disclosure may control a light of a surrounding region where an integrated sensor is positioned, as described above. As such, the electronic device 100 may diversify the ways to control a light of the surrounding region based on various input environments or function execution environments. For example, a specified color corresponding to the magnitude of a pressure which the integrated sensor senses may be output under control of the electronic device 100.

According to an embodiment, as illustrated in state 1301, in the case where a value of a pressure sensed by the integrated sensor is greater than a specified magnitude, the electronic device 100 may display the surrounding region 1010 in which the integrated sensor is positioned, by using a first color 1310. The electronic device 100 may use at least one of the above-described ways such that a specified light is output from the surrounding region 1010.

According to an embodiment, as illustrated in state 1303, in the case where a value of a pressure sensed by the integrated sensor is within a specified range or is smaller than the specified magnitude, the electronic device 100 may display the surrounding region 1010 in which the integrated sensor is positioned, by using a second color 1320.

According to various embodiments, a region 1300 in which the integrated sensor is positioned may be formed to be lower or higher than the surroundings so as to tactilely perceive the region 1300 in which the integrated sensor is positioned. In the case of using a relief or an intaglio, a boundary of the surrounding region and the integrated sensor-positioned region 1300 may be provided in the form of a step (in such a way that a height changes relatively sharply) and may be provided to be perceived intuitively and relatively easily through a finger surface. Alternatively, the boundary of the surrounding region and the integrated sensor-positioned region 1300 may be provided in the form of a hill (in such a way that a height changes relatively slowly) and may be provided to be perceived relatively smoothly.

Figure 14:
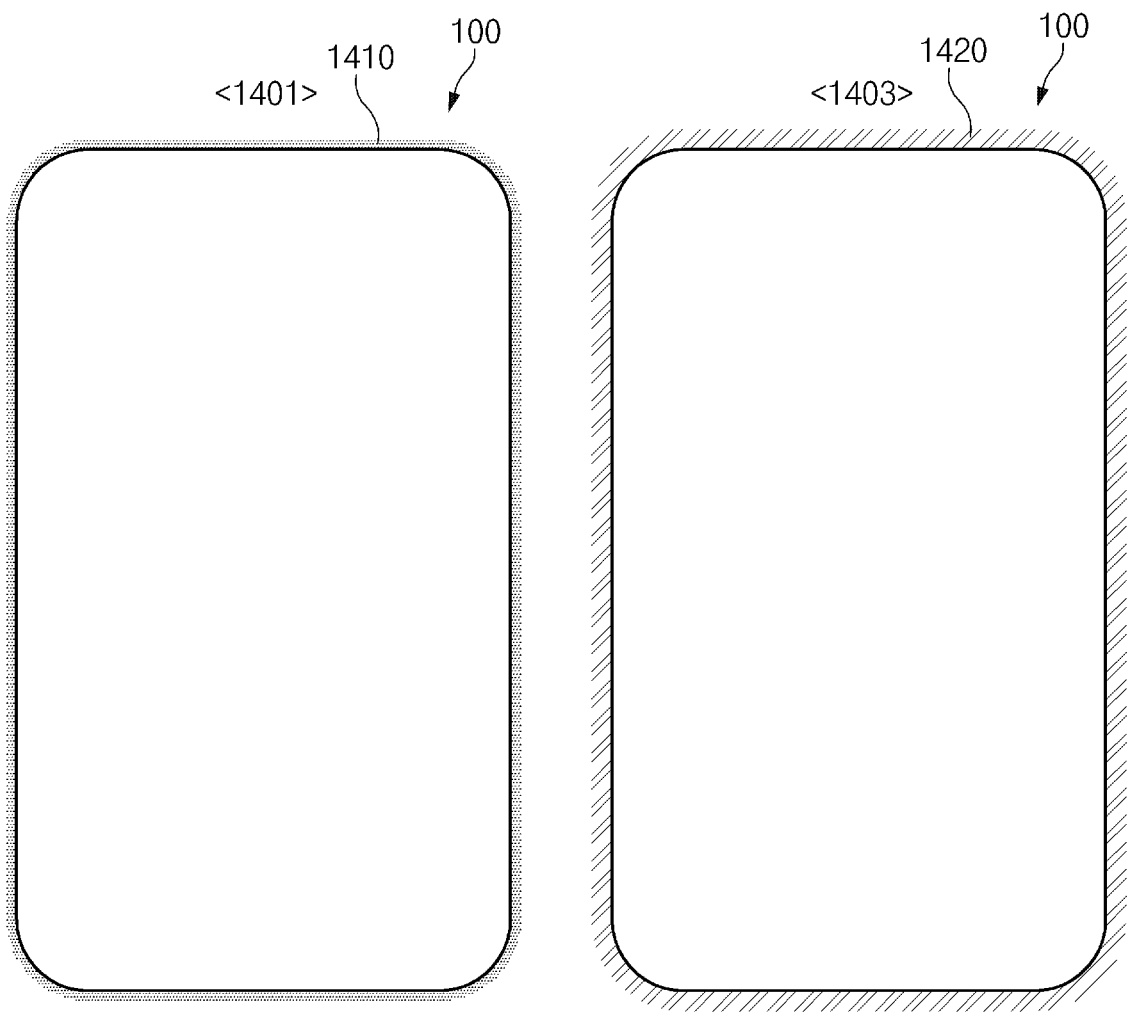
FIG. 14 is a view illustrating a second example of operating an electronic device including an integrated sensor according to an embodiment of the present disclosure.

FIG. 14 is a view illustrating a second example of operating an electronic device including an integrated sensor according to an embodiment of the present disclosure.

Referring to FIG. 14, in the case where a value of a pressure sensed by an integrated sensor is greater than a specified magnitude, for example, the electronic device 100 of the present disclosure may indicate a periphery of the electronic device 100 by using a specified first color 1410 as illustrated in state 1401. According to an embodiment, as illustrated in state 1403, in the case where a value of a pressure sensed by the integrated sensor is within a specified range or is smaller than the specified magnitude, the electronic device 100 may indicate a periphery of the electronic device 100 by using a specified second color 1420. The first color 1410 and the second color 1420 may be displayed by allowing pixels positioned at the periphery of the display panel 160 to display a specified color.

Figure 15:
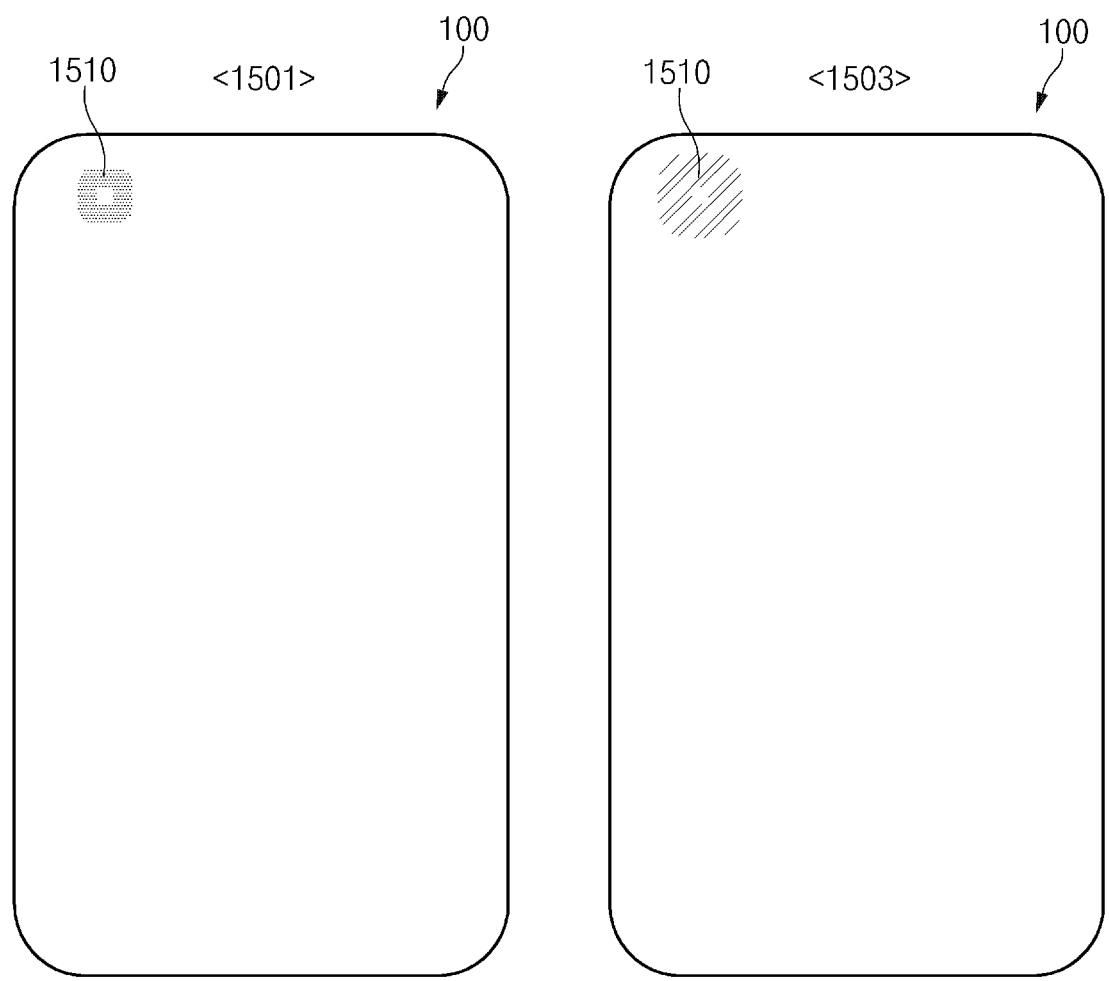
FIG. 15 is a view illustrating a third example of operating an electronic device including an integrated sensor according to an embodiment of the present disclosure.

FIG. 15 is a view illustrating a third example of operating an electronic device including an integrated sensor according to an embodiment of the present disclosure.

Referring to FIG. 15, in the case where a value of a pressure sensed by an integrated sensor is greater than a specified magnitude, for example, the electronic device 100 of the present disclosure may display a lamp of the electronic device 100 by using a specified first color 1510 as illustrated in state 1501. According to an embodiment, as illustrated in state 1503, in the case where a value of a pressure sensed by the integrated sensor is within a specified range or is smaller than the specified magnitude, the electronic device 100 may display the lamp of the electronic device 100 by using a specified second color 1520. The lamp may be positioned, for example, on the upper right of the electronic device 100, and may be a lamp which outputs a specified light periodically for the purpose of verifying a location of the electronic device 100 or a charging state of the electronic device.

Figure 16:
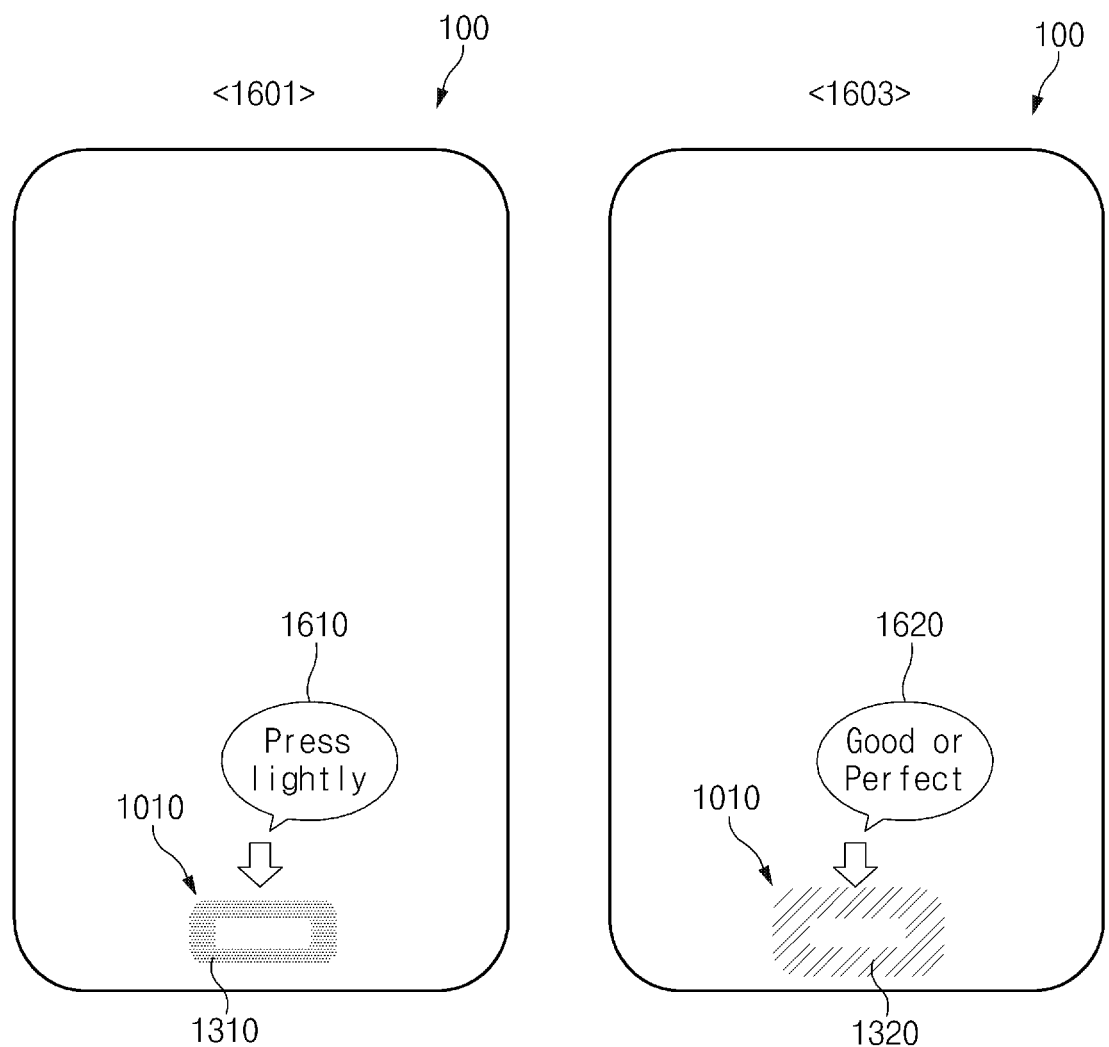
FIG. 16 is a view illustrating a fourth example of operating an electronic device including an integrated sensor according to an embodiment of the present disclosure.

FIG. 16 is a view illustrating a fourth example of operating an electronic device including an integrated sensor according to an embodiment of the present disclosure.

Referring to FIG. 16, as illustrated in state 1601, in the case where a value of a pressure sensed by the integrated sensor is greater than a specified magnitude, the electronic device 100 may indicate the surrounding region 1010 in which the integrated sensor is positioned, by using the first color 1310 and may simultaneously output a first object 1610 (e.g., a text, an image, or the like) corresponding to the first color 1310. The first object 1610 may include contents (e.g., a text or an image to guide a decrease in pressure), for example, guiding to decrease a pressure compared with a previous or current pressure.

According to an embodiment, as illustrated in state 1603, in the case where a value of a pressure sensed by the integrated sensor is within a specified range or is smaller than the specified magnitude, the electronic device 100 may indicate the surrounding region 1010 in which the integrated sensor is positioned, by using the second color 1320 and may simultaneously output a second object 1620 (e.g., a text, an image, or the like) corresponding to the second color 1320. The second object 1620 may include, for example, contents indicating that a pressure is proper. The first object 1610 and the second object 1620 may be displayed on one side of a display panel of the electronic device 100, or may be displayed in the form of directing the surrounding region 1010 as illustrated in drawing.

Figure 17:
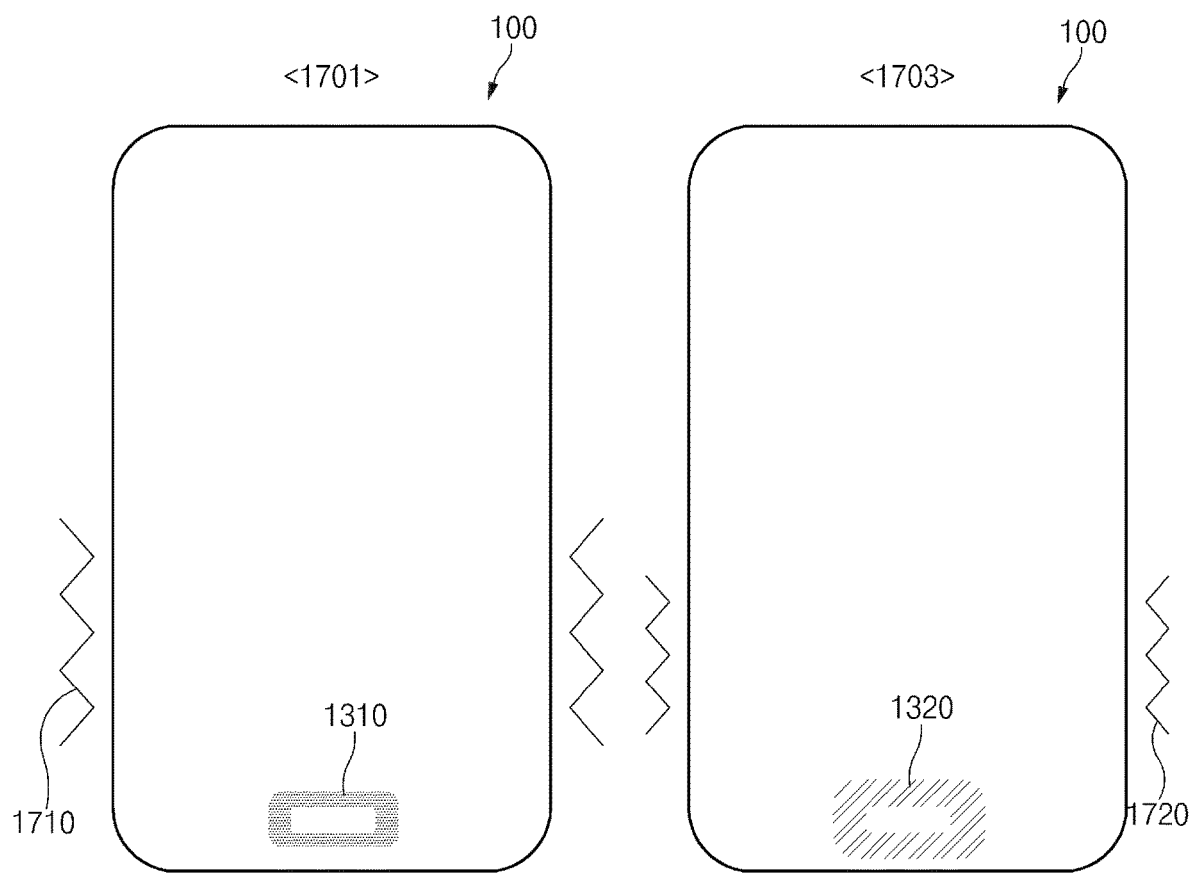
FIG. 17 is a view illustrating a fifth example of operating an electronic device including an integrated sensor according to an embodiment of the present disclosure.

FIG. 17 is a view illustrating a fifth example of operating an electronic device including an integrated sensor according to an embodiment of the present disclosure.

Referring to FIG. 17, as illustrated in state 1701, in the case where a value of a pressure sensed by the integrated sensor is greater than a specified magnitude, the electronic device 100 may indicate the surrounding region 1010 in which the integrated sensor is positioned, by using the first color 1310 and may simultaneously output a first haptic 1710 (e.g., vibration of a first pattern) corresponding to the first color 1310. In this regard, the electronic device 100 may include a haptic module (or a vibrator).

According to an embodiment, as illustrated in state 1703, in the case where a value of a pressure sensed by the integrated sensor is within a specified range or is smaller than the specified magnitude, the electronic device 100 may indicate the surrounding region 1010 in which the integrated sensor is positioned, by using the second color 1320 and may simultaneously output a second haptic 1720 (e.g., vibration of a second pattern different in shape from the first pattern, or a pattern, the vibration magnitude of which is smaller than that of the first haptic) corresponding to the second color 1320. Alternatively, the electronic device 100 may omit a haptic output.

Figure 18:
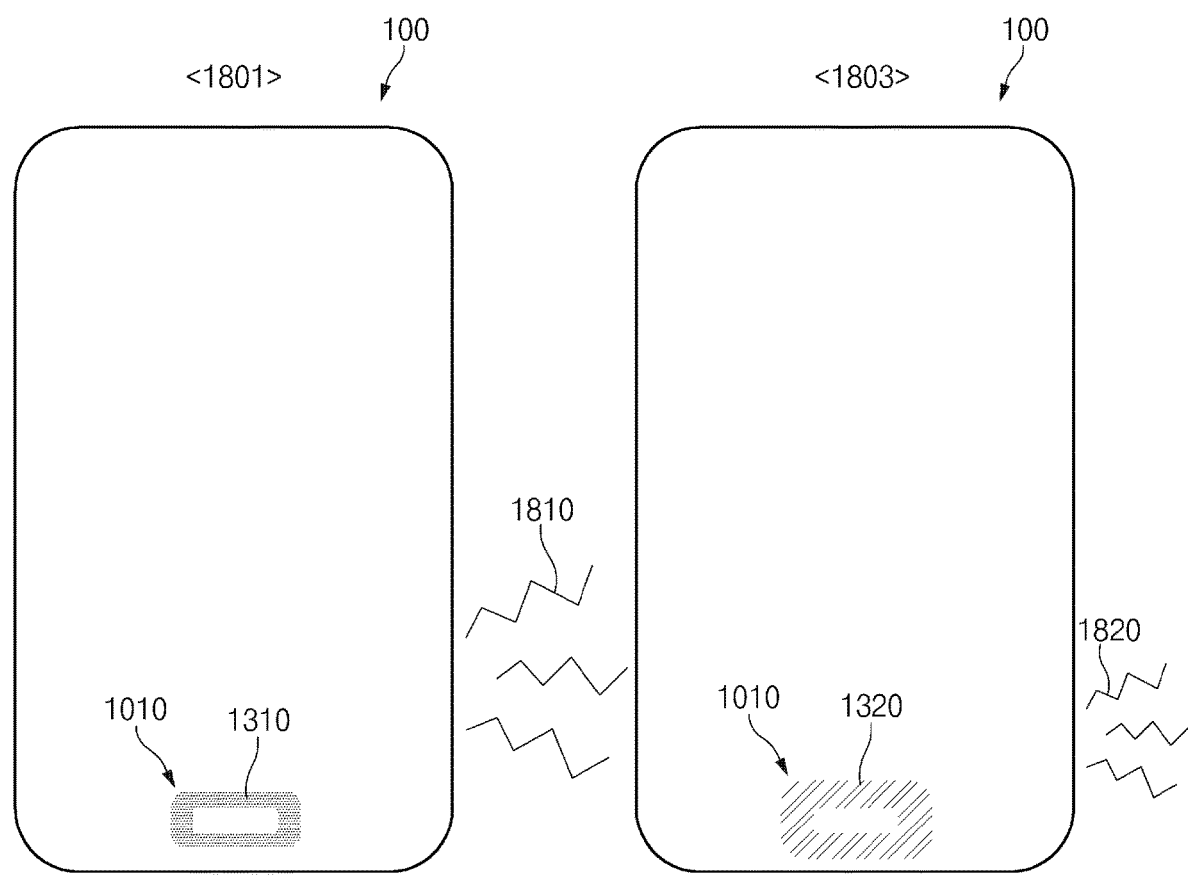
FIG. 18 is a view illustrating a sixth example of operating an electronic device including an integrated sensor according to an embodiment of the present disclosure.

FIG. 18 is a view illustrating a sixth example of operating an electronic device including an integrated sensor according to an embodiment of the present disclosure.

Referring to FIG. 18, as illustrated in state 1801, in the case where a value of a pressure sensed by the integrated sensor is greater than a specified magnitude, the electronic device 100 may indicate the surrounding region 1010 in which the integrated sensor is positioned, by using the first color 1310 and may simultaneously output first audio information 1810 (e.g., audio or specified alarm of contents guiding a decrease in a pressure) corresponding to the first color 1310. In this regard, the electronic device 100 may include an audio device.

According to an embodiment, as illustrated in state 1803, in the case where a value of a pressure sensed by the integrated sensor is within a specified range or is smaller than the specified magnitude, the electronic device 100 may indicate the surrounding region 1010 in which the integrated sensor is positioned, by using the second color 1320 and may simultaneously output second audio information 1820 (e.g., audio guiding that a pressure is proper) corresponding to the second color 1320.

Figure 19:
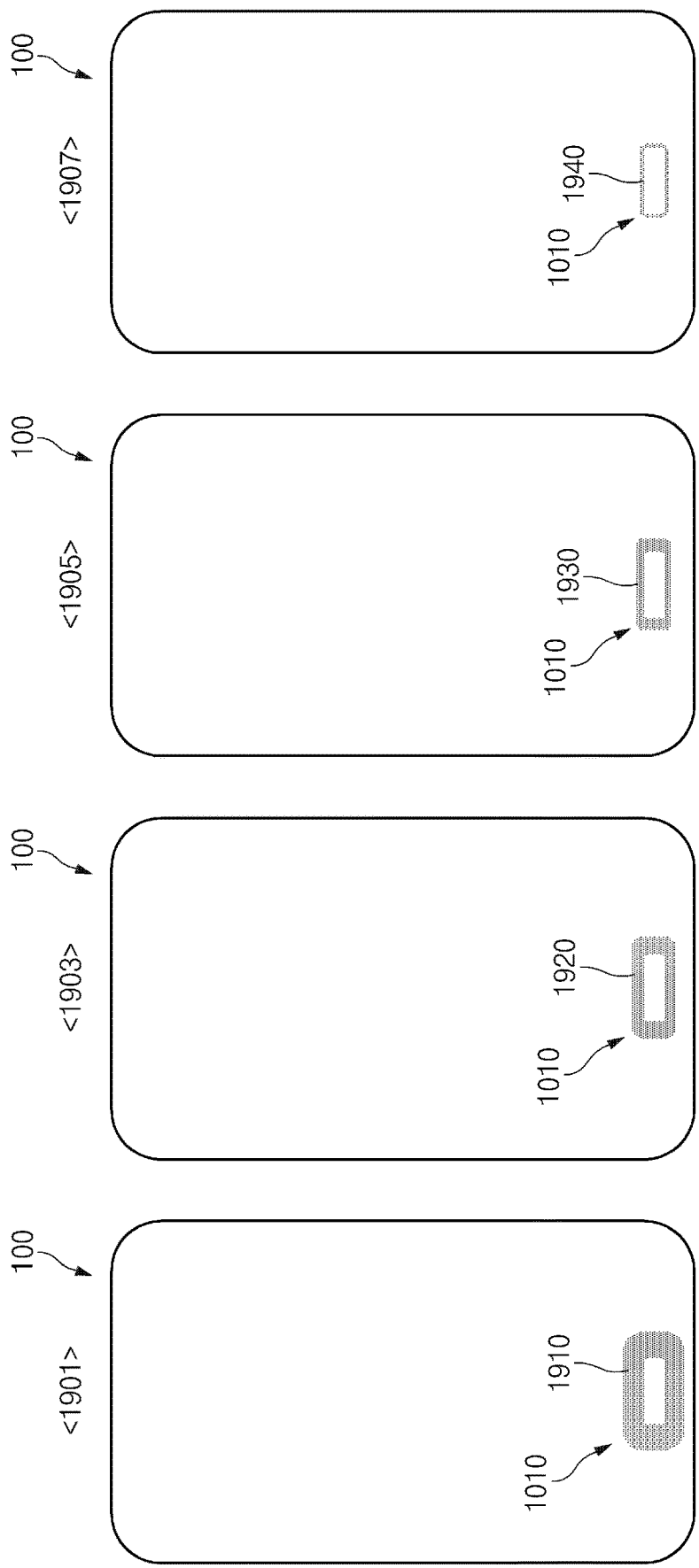
FIG. 19 is a view illustrating a seventh example of operating an electronic device including an integrated sensor according to an embodiment of the present disclosure.

FIG. 19 is a view illustrating a seventh example of operating an electronic device including an integrated sensor according to an embodiment of the present disclosure.

Referring to FIG. 19, as illustrated in state 1901, in the case where a value of a pressure sensed by the integrated sensor is greater than a specified magnitude, the electronic device 100 may display an object 1910 of a first size in the surrounding region 1010 in which the integrated sensor is positioned. The object 1910 of the first size may include a band shape having a specified color. As illustrated in state 1903, in the case where the value of the pressure sensed by the integrated sensor belongs to a range of a specified pressure value, the electronic device 100 may display an object 1920 of a second size in the surrounding region 1010 in which the integrated sensor is positioned. The second size may be, for example, smaller than the first size, and a shape of an object may be displayed to be relatively dim. As illustrated in state 1905, in the case where the value of the pressure sensed by the integrated sensor corresponds to a specified first touch input (e.g., a tap event), the electronic device 100 may display an object 1930 of a third size in the surrounding region 1010 in which the integrated sensor is positioned. The third size may include, for example, a size smaller than the second size. As illustrated in state 1907, in the case where the value of the pressure sensed by the integrated sensor corresponds to a specified second touch input (e.g., a long press event), the electronic device 100 may display an object 1940 of a fourth size in the surrounding region 1010 in which the integrated sensor is positioned. The fourth size may include, for example, a size smaller than the third size. Also, the object 1940 of the fourth size may be displayed to be dim compared with the object 1930 of the third size.

Meanwhile, the description is given as objects of different sizes are displayed, but the present disclosure is not limited thereto. For example, the electronic device 100 may output an object which has the same size and has a color varying with a type of an input which the integrated sensor collects. Alternatively, the electronic device 100 may output a specified color in a peripheral region of the electronic device 100 (e.g., a peripheral region of a display panel), as described with reference to FIG. 14, depending on a shape of an input which the integrated sensor collects. For example, the electronic device 100 may display a periphery of a display panel by using a color varying with an input type. Alternatively, the electronic device 100 may differently output a color of a lamp depending on a type of an input which the integrated sensor collects.

Figure 20:
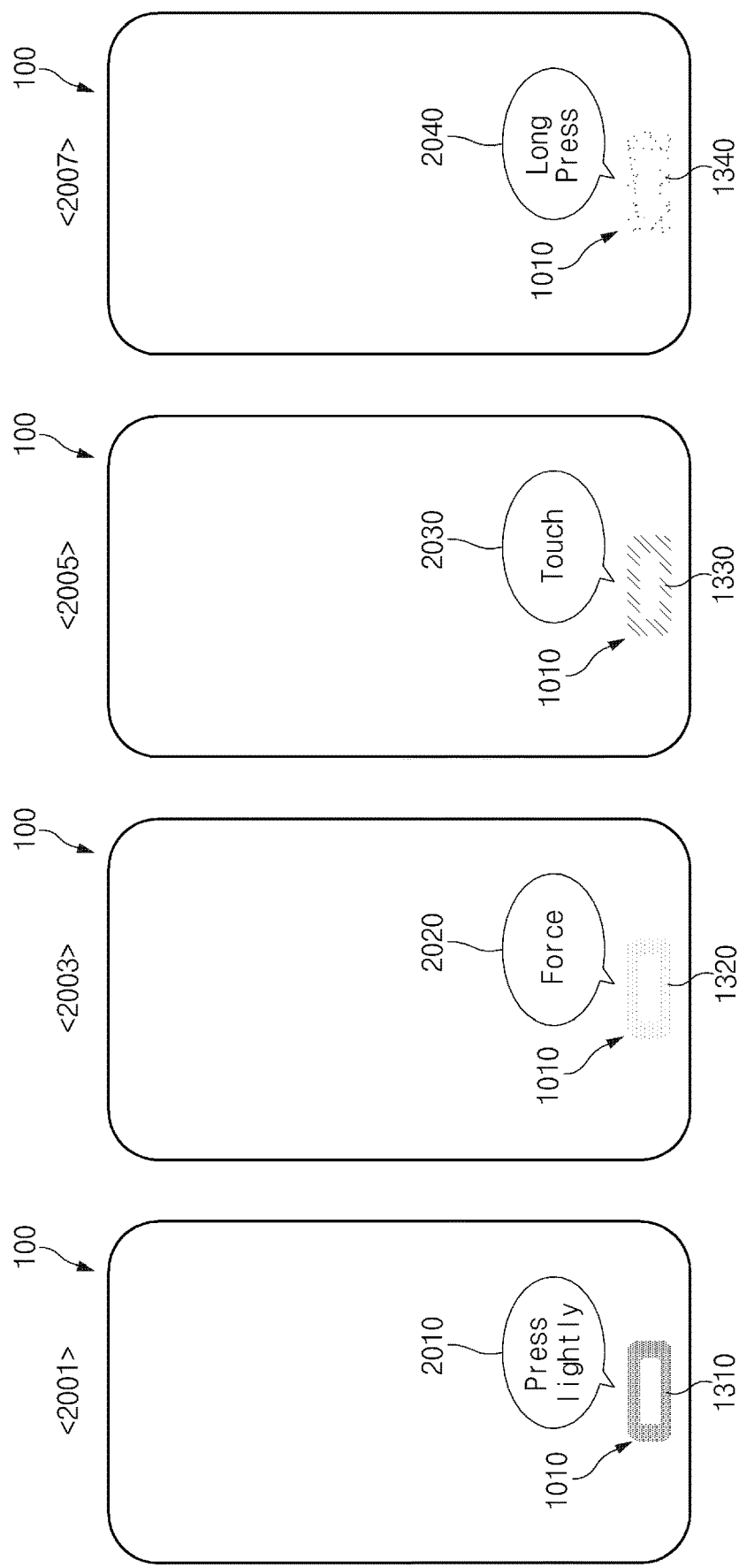
FIG. 20 is a view illustrating an eighth example of operating an electronic device including an integrated sensor according to an embodiment of the present disclosure.

FIG. 20 is a view illustrating an eighth example of operating an electronic device including an integrated sensor according to an embodiment of the present disclosure.

Referring to FIG. 20, according to an embodiment of the present disclosure, the electronic device 100 may output, to a display panel, an object which is changed according to a type of an input which an integrated sensor collects. For example, in the case where a pressure of a specified magnitude or greater is detected, as illustrated in state 2001, the electronic device 100 may display the surrounding region 1010 in which the integrated sensor is positioned, by using the first color 1310 and may simultaneously output a first object 2010 indicating that a pressure of a specified magnitude or greater is detected. Alternatively, in the case where a pressure of a specified magnitude is detected, as illustrated in state 2003, the electronic device 100 may indicate the surrounding region 1010 in which the integrated sensor is positioned, by using the second color 1320 and may simultaneously output a second object 2020 indicating that a force touch corresponding to the specified magnitude is detected.

Alternatively, according to an embodiment of the present disclosure, as illustrated in state 2005, in the case where a specified first touch input is detected, the electronic device 100 may indicate the surrounding region 1010 in which the integrated sensor is positioned, by using the third color 1320 and may simultaneously output a third object 2030 corresponding to "touch". Alternatively, as illustrated in state 2007, in the case where a specified second touch input is detected, the electronic device 100 may indicate the surrounding region 1010 in which the integrated sensor is positioned, by using a fourth color 1340 and may simultaneously output a fourth object 2040 corresponding to "long press". According to various embodiments, the electronic device 100 may output different kinds of color bands in a surrounding region in which an integrated sensor is positioned, together with outputting the above-described object.

According to various embodiments, the electronic device 100 may output a haptic which is changed according to a type of an input which the integrated sensor collects. For example, the electronic device 100 may output a haptic of a first pattern when a pressure of a specified magnitude or greater is detected. Alternatively, the electronic device 100 may output a haptic of a second pattern when a pressure of the specified magnitude is detected. Alternatively, the electronic device 100 may output a haptic of a third pattern when a specified first touch input is detected. Alternatively, the electronic device 100 may output a haptic of a fourth pattern when a specified second touch input is detected. At least one of a magnitude of a vibration and an interval of the vibration may be differently set with regard to the first pattern to the fourth pattern. According to various embodiments, the electronic device 100 may output different kinds of color bands in the surrounding region in which the integrated sensor is positioned, together with outputting the above-described haptic.

According to various embodiments, the electronic device 100 may output audio which is changed according to a type of an input which the integrated sensor collects. For example, the electronic device 100 may output first audio information when a pressure of a specified magnitude or greater is detected and may output second audio information when the pressure of the specified magnitude is detected. Alternatively, the electronic device 100 may output third audio information (e.g., a guide sound or a specified sound corresponding to occurrence of a tap event) when a specified first touch input is detected. Alternatively, the electronic device 100 may output fourth audio information (e.g., a guide sound or a specified sound corresponding to occurrence of long press) when a specified second touch input is detected. According to various embodiments, the electronic device 100 may output different kinds of color bands in the surrounding region in which the integrated sensor is positioned, together with outputting the above-described audio information.

An electronic device according to an embodiment of various embodiments described above may include a housing that includes a first surface facing in a first direction (e.g., a direction in which the display panel 160 is positioned at the housing 150 with respect to FIG. 1) and a second surface facing in a second direction opposite to the first direction, wherein the housing includes a transparent cover (e.g., the outer cover) forming substantially the whole of the first surface and including a first region and a second region adjacent to the first region, a touchscreen display (e.g., a display panel) that is interposed between the first region of the transparent cover and the second surface of the housing and is exposed through the first region of the transparent cover, an opaque layer (e.g., a film layer) that is interposed between the second region of the transparent cover and the second surface of the housing and is exposed through the second region of the transparent cover, a fingerprint sensor that is interposed between the opaque layer and the second surface of the housing, and a pressure sensor that is interposed between the fingerprint sensor and the second surface of the housing and senses a pressure of an external object against the opaque layer. The pressure sensor may include a first electrode (or a first electrode layer) that extends substantially in parallel with the opaque layer, a second electrode (e.g., a second electrode layer) that is spaced from the first electrode layer in the second direction and extends substantially in parallel with the first electrode, and a dielectric layer that is interposed between the first electrode and the second electrode.

According to various embodiments, the opaque layer may include a printed layer and/or a coating layer.

According to various embodiments, the dielectric layer may include at least one of an air, a silicon, a membrane, a rubber, an ink, an OCA, or a sponge.

According to various embodiments, the electronic device may further include a support member (e.g., a bracket) that is interposed between the transparent cover and the second surface of the housing and includes at least a portion of a conductive layer, and the at least a portion of the conductive layer may form the second electrode of the pressure sensor.

According to various embodiments, the electronic device may further include a rigid or flexible printed circuit board (e.g., an auxiliary printed circuit board) that is interposed between the fingerprint sensor and the pressure sensor.

According to various embodiments, the electronic device may further include a first integrated circuit (e.g., a fingerprint sensor driving IC) that is electrically connected with the fingerprint sensor and receives a signal from the fingerprint sensor, and a second integrated circuit (e.g., a pressure sensor driving IC) that is electrically connected with the pressure sensor and receives a signal from the pressure sensor. The first integrated circuit and/or the second integrated circuit may be positioned on at least a portion of the printed circuit board.

An electronic device according to one embodiment of various electronic devices described above may include a housing that includes a first surface facing in a first direction and a second surface facing in a second direction opposite to the first direction, a user interface that is interposed between the first surface and the second surface of the housing, a fingerprint sensor that is interposed between the first surface and the second surface of the housing, a pressure sensor that is interposed between the first surface and the second surface of the housing, at least one processor that is electrically connected with the user interface, the fingerprint sensor, and the pressure sensor, and at least one memory that is electrically connected with the at least one processor and stores reference fingerprint information. The at least one memory may store instructions, which cause the at least one processor to sense a pressure of a finger of a user against the first surface of the housing by using the pressure sensor, to obtain fingerprint information of the finger using the fingerprint sensor, based at least partially on determination that the sensed pressure is not smaller than a first threshold, to perform authentication by using the fingerprint information of the finger obtained while the sensed pressure is smaller than a second threshold smaller than the first threshold, based at least partially on determination that the sensed pressure is smaller than the second threshold.

According to various embodiments, the instructions may cause the processor to provide an output configured to guide a user to decrease the pressure of the finger to less than the second threshold, by using the user interface.

According to various embodiments, the user interface may include at least one of a display, a vibration element, a light emitting diode, and/or a speaker.

An electronic device according to one embodiment of various electronic devices described above may include a housing that has a bottom surface and is opened upwardly, a main printed circuit board that is seated inside the housing, a bracket that is placed on the main printed circuit board, a display panel that is positioned in a first region of an upper surface of the bracket, an integrated sensor that is positioned in a second region of the upper surface of the bracket, an outer cover that is positioned to cover the display panel and the integrated sensor. The integrated sensor may include a fingerprint sensor that performs fingerprint recognition on an object contacting a surface of the outer cover, a pressure sensor that senses a pressure of an object contacting the surface of the outer cover, an auxiliary printed circuit board in which the fingerprint sensor and the pressure sensor are seated at different locations, and a driving IC that is positioned on the auxiliary printed circuit board and drives the fingerprint sensor and the pressure sensor.

According to various embodiments, in the outer cover, a thickness of a location corresponding to a region where the integrated sensor is positioned may be thinner than a peripheral region According to various embodiments, the outer cover may include at least one protrusion that is formed on a surface of a location where the integrated sensor is positioned.

According to various embodiments, the fingerprint sensor may be interposed between a lower surface of the outer cover and an upper surface of the auxiliary printed circuit board, and the pressure sensor may be interposed between a lower surface of the auxiliary printed circuit board and the upper surface of the bracket.

According to various embodiments, the fingerprint sensor may be interposed between a lower surface of the outer cover and an upper surface of the auxiliary printed circuit board, and the pressure sensor may be positioned on the auxiliary printed circuit board in the form of a band surrounding the fingerprint sensor.

According to various embodiments, the bracket may include a seating recess in which at least a portion of the pressure sensor is seated.

According to various embodiments, the bracket may include a main seating recess in which at least a portion of the pressure sensor is seated, and a sub seating recess in which at least a portion of the auxiliary printed circuit board is seated.

According to various embodiments, at least a portion of the bracket may include a metal layer forming a ground layer of the pressure sensor.

According to various embodiments, the auxiliary printed circuit board includes an electrode layer forming a sensor layer of the pressure sensor.

According to various embodiments, the electronic device may further include at least one of a light emitting unit that is positioned on the auxiliary printed circuit board, a waveguide that guides a light emitted from the light emitting unit, or a light blocking part that surrounds a surrounding region of the waveguide.

The waveguide may be positioned on the light emitting unit or may be positioned on the pressure sensor.

An electronic device according to one embodiment of various electronic devices described above may include a housing that has a bottom surface and is opened upwardly, a main printed circuit board that is seated inside the housing, a bracket that is placed on the main printed circuit board, a display panel that is positioned in a first region of an upper surface of the bracket, an integrated sensor that is positioned in a second region of the upper surface of the bracket, an outer cover that is positioned to cover the display panel and the integrated sensor, and a processor which is positioned on the main printed circuit board and is electrically connected with the display panel and the integrated sensor. The integrated sensor may include a fingerprint sensor that performs fingerprint recognition on an object contacting a surface of the outer cover, a pressure sensor that senses a pressure of an object contacting the surface of the outer cover, an auxiliary printed circuit board in which the fingerprint sensor and the pressure sensor are seated at different locations, and a driving IC that is positioned on the auxiliary printed circuit board and drives the fingerprint sensor and the pressure sensor. The processor may output pieces of information specified according to a pressure magnitude or a touch type collected through the integrated sensor, by using at least one of an surrounding region in which the integrated sensor is positioned, a periphery of the display panel, or a lamp included in the electronic device.

According to various embodiments, the processor may output information guiding occurrence of an excessive pressure (e.g., occurrence of a pressure of a specified magnitude or greater) when a pressure value of a first threshold value or greater is received.

According to various embodiments, the processor may output information guiding occurrence of a pressure touch (e.g., a touch determined as a user intends to perform an input through a pressure) when a pressure value in a specified first range is received.

According to various embodiments, the processor may output information guiding occurrence of a normal touch (e.g., a touch determined as a user intends to simply contact an outer cover without consideration of a pressure or without applying a pressure of a specified magnitude or greater) when a pressure value in a specified second range is received.

According to various embodiments, the processor may output information guiding occurrence of a long press touch when a specified pressure type (e.g., a type where a change of a pressure is within a specified range and a contact time is not smaller than a specified magnitude) is received.

According to various embodiments, the processor may output the information based on at least one of a light emitting unit positioned adjacent to the integrated sensor, a region, which surrounds the integrated sensor, of the display panel, a peripheral region of the display panel, a lamp positioned on one side of a lower surface of the outer cover so as to be capable of being recognized through the outer cover, a haptic, or an audio device.

Figure 21:
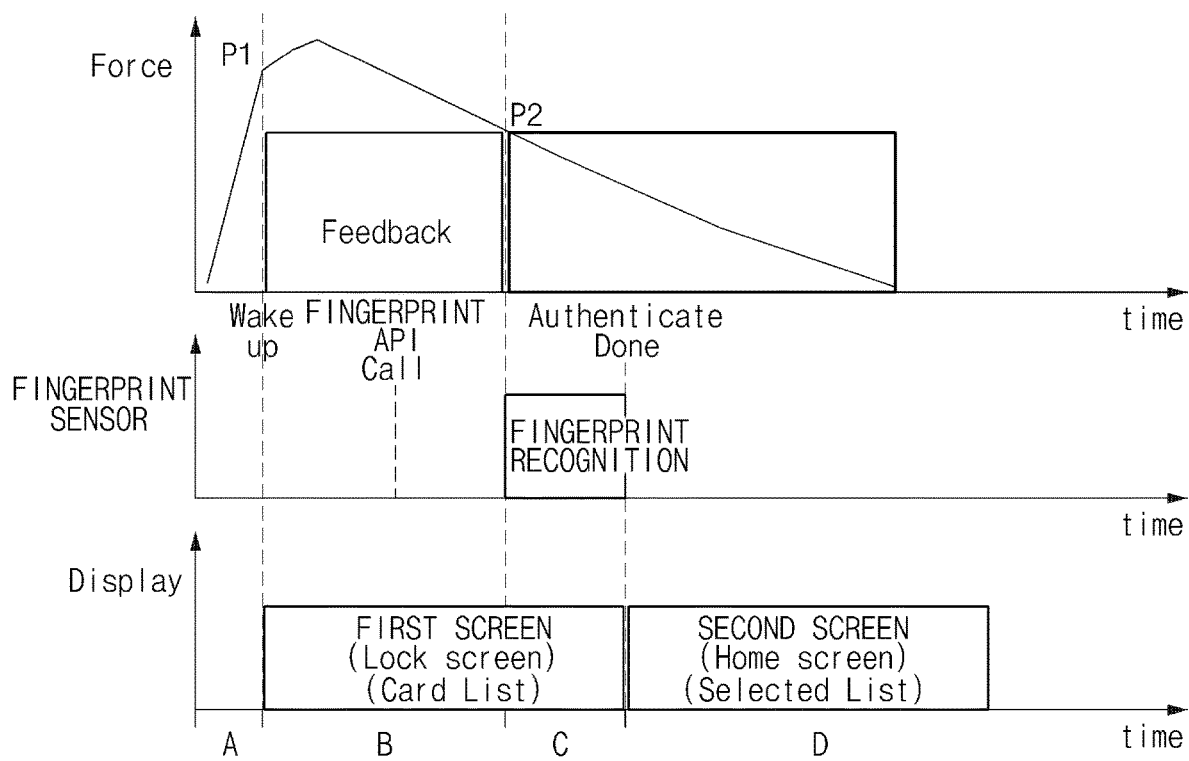
FIG. 21 is a graph for describing an operation of an integrated sensor according to an embodiment of the present disclosure.

FIG. 21 is a graph for describing an operation of an integrated sensor according to an embodiment of the present disclosure.

Referring to FIG. 21, according to an embodiment of the present disclosure, the electronic device 100 may supply a low power to a pressure sensor at a given period or with regard to an always on (AO) function. In the case where a pressure is applied in a state where a power is supplied, the pressure sensor may collect a sensing value depending on a pressure which is generated as illustrated in section "A". For example, in the case where a user applies a pressure to a region, in which an integrated sensor is positioned, by using his/her finger, the pressure sensor may sense a pressure value which gradually increases.

According to an embodiment of the present disclosure, in the case where the pressure value exceeds a first reference value P1, the electronic device 100 may output, to a display (or a display panel), a feedback guiding a decrease in a pressure with regard to the detection of a fingerprint input as illustrated in section "B". For example, when the processor 140 of the electronic device 100 receives detection of a pressure sensing value exceeding the specified first reference value P1 from the pressure sensor, the processor 140 may output a feedback to the display. In this operation, the processor 140 may output a specified first screen. The first screen may include, for example, a lock screen unlocked based on fingerprint authentication. Alternatively, the first screen may include a card list output screen associated with a payment using the electronic device 100.

According to an embodiment of the present disclosure, after the feedback is output, in the case where the pressure value gradually decreases (e.g., the user decreases a pressure applied by his/her finger after verifying the feedback) and reaches a specified second reference value P2, as illustrated in section "C", the fingerprint sensor may perform fingerprint recognition. In this regard, the processor 140 may activate a fingerprint sensor when receiving a signal associated with the detection of the pressure value corresponding to the specified second reference value P2 from the pressure sensor. According to various embodiments, a driving IC to drive the pressure sensor may activate the fingerprint sensor when a pressure value corresponding to the second reference value P2 is detected. In the case where the fingerprint recognition is successfully performed, the processor 140 may output a specified second screen to the display as illustrated in section "D". The second screen may include, for example, a home screen or a card selection screen which is set to be output according to a release of the lock screen. According to various embodiments, when a pressure value corresponding to the specified first reference value P1 is detected, the pressure sensor (or the processor 140) may activate the fingerprint sensor, and may call a fingerprint application programming interface (API) associated with sensing a fingerprint during section "B". The second reference value P2 may be changed according to settings. For example, the specified second reference value P2 may be set based on user information registered at an electronic device, according to user settings, or according to an age or sex such as an adult, a child a male, a female, or the like. For example, the second reference value which is set in the case of an adult male whose fingerprint is more evident may be smaller in a force magnitude value than the second reference value which is set in the case of a young girl, whose fingerprint is less evident.

Figure 22:
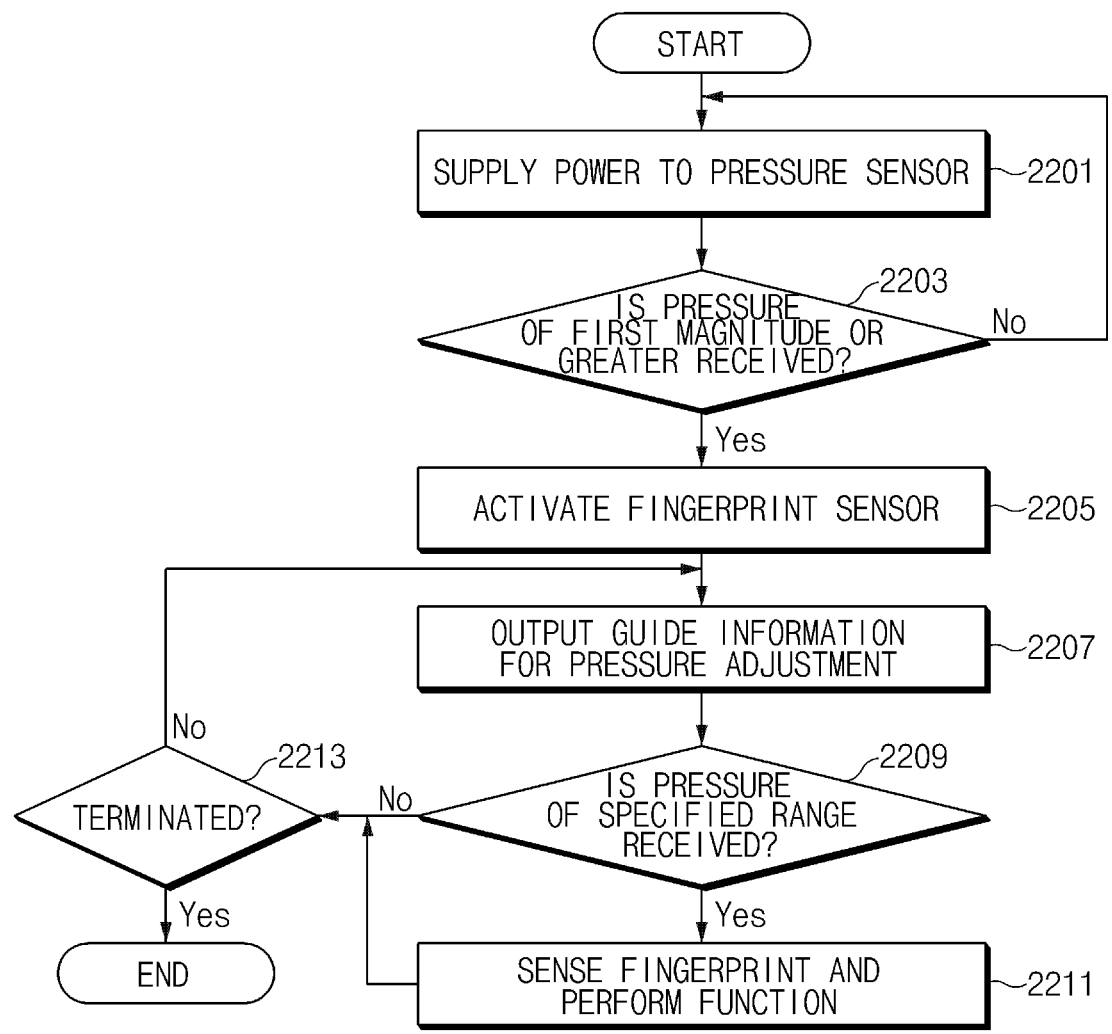
FIG. 22 is a view illustrating an example of a method for operating an electronic device according to an embodiment of the present disclosure.

FIG. 22 is a view illustrating an example of a method for operating an electronic device according to an embodiment of the present disclosure.

Referring to FIG. 22, with regard to an electronic device operating method of the present disclosure, in operation 2201, the processor 140 of the electronic device 100 may power a pressure sensor in an integrated sensor. For example, the processor 140 may supply a power to the pressure sensor at a given period or may supply the power to the pressure sensor in real time. In the case where the processor 140 enters a sleep state, a sensor hub included in the electronic device 100 may process the power supply of the pressure sensor to a low-power mode.

In operation 2203, according to an embodiment of the present disclosure, the processor 140 may determine whether a pressure of a first magnitude or greater is received. In the case where a pressure of the first magnitude or smaller is received, the process may return to operation 2201 to again perform the following operations. In the case where a pressure of the first magnitude or greater is received, in operation 2205, the processor 140 may activate a fingerprint sensor. Alternatively, the fingerprint sensor may be activated by a driving IC associated with a pressure sensor without intervention of the processor 140. With regard to the activation of the fingerprint sensor, the processor 140 may supply the power of a specified magnitude to the fingerprint sensor and may call an API associated with operating the fingerprint sensor.

In operation 2207, the processor 140 may output pressure adjustment guide information. In the case where a finger or the like closely contacts an outer cover or the like by an excessive pressure, a ridge and a valley of a fingerprint may be deformed. As a result, a fingerprint recognition error may occur when a finger is brought into close contact with an outer cover due to an excessive pressure. As such, the processor 140 may output pressure adjustment guide information (e.g., at least one of a text, a voice, an image, or vibration, as instruction information of contents guiding a pressure applied by a finger to reach a specified magnitude range) so as to have an optimum pressure state with regard to fingerprint recognition.

In operation 2209, the processor 140 may determine whether a pressure of a specified range is received. In the case where the pressure of the specified range is received, in operation 2211, the processor 140 may perform a fingerprint sensing operation and a specified function. For example, when the pressure applied by the finger reaches the specified range (e.g., as a pressure range capable of minimizing occurrence of a fingerprint sensing error, the specified range may be obtained statistically and experimentally), the processor 140 may request the fingerprint sensor to emit and collect a light for fingerprint sensing. Alternatively, in the case where the pressure of the specified range is detected, the pressure sensor may directly request fingerprint recognition from the fingerprint sensor. In the case where the pressure of the specified range is not received, in operation 2213, whether an event associated with a termination of the electronic device 100 occurs may be determined. If the event associated with the device termination end does not occur, the process may return to operation 2207 to again perform the following operations.

According to various embodiments above described, an operating method of an electronic device which includes a pressure sensor sensing a pressure based on a physical quantity applied from an external object, and an image sensor (e.g., a fingerprint sensor) performing surface recognition on the external object while the external object applies the physical quantity may include supplying a power to the pressure sensor (or driving the pressure sensor in an always on mode), and activating the image sensor to perform the surface recognition (e.g., fingerprint recognition), when a pressure value of a specified first magnitude is detected.

Alternatively, according to an embodiment of the present disclosure, the operating method of the electronic device may include activating a fingerprint sensor when a pressure of a specified first magnitude is detected, and performing fingerprint recognition when the pressure of the first magnitude is changed to a pressure of a specified second magnitude. In this operation, the pressure of the second magnitude may be smaller in value than the pressure of the first magnitude. The method may include outputting feedback information requesting pressure adjustment (e.g., a decrease in pressure) in the activating of the fingerprint sensor.

Figure 23:
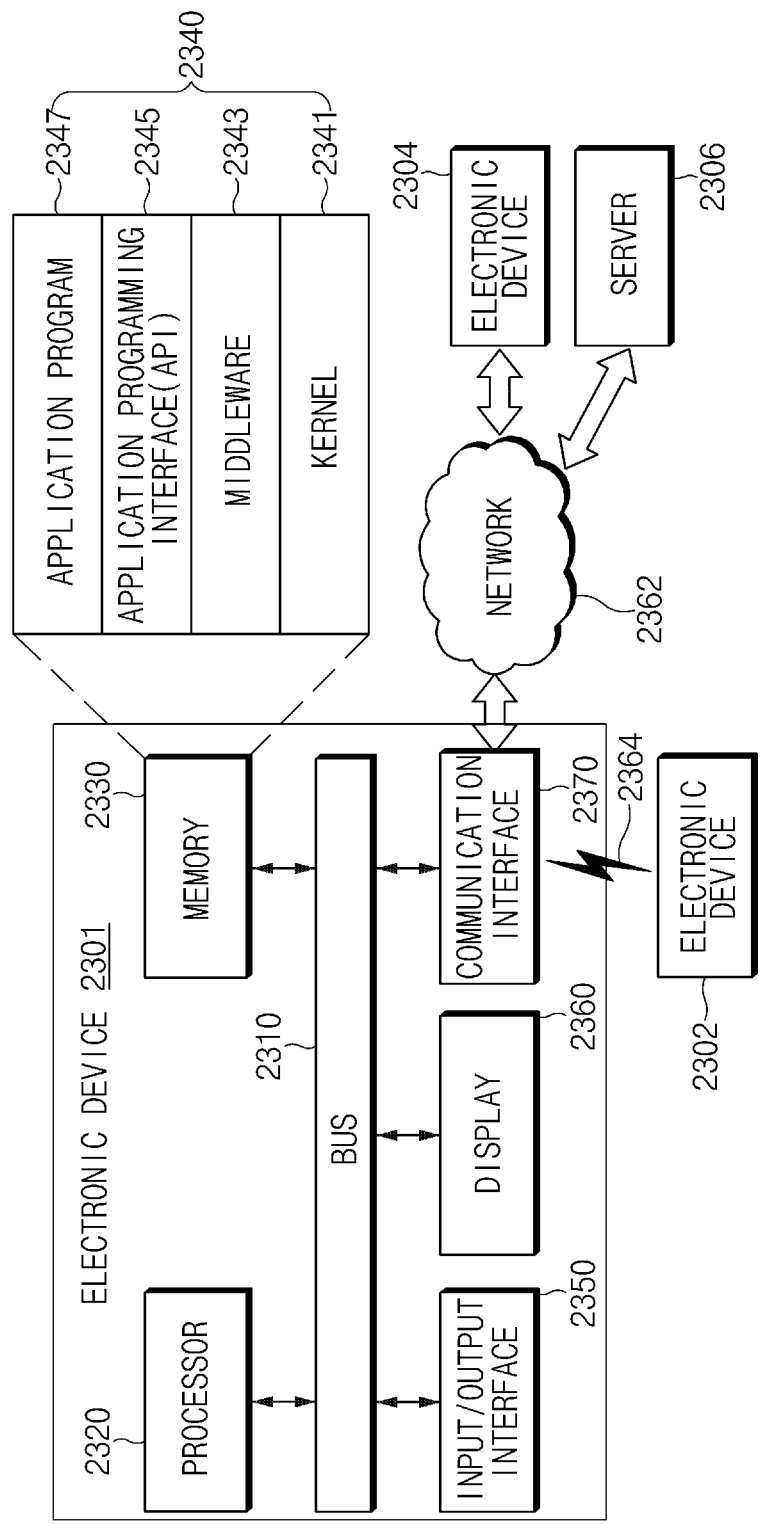
FIG. 23 illustrates an example of an electronic device operating environment, according to an embodiment of the present disclosure.

FIG. 23 illustrates an example of an electronic device operating environment, according to an embodiment of the present disclosure.

Referring to FIG. 23, according to various embodiments, an electronic device 2301 in a network environment 2300 is described. The electronic device 2301 (e.g., the electronic device 100) may include a bus 2310, a processor 2320, a memory 2330, an input/output interface 2350, a display 2360, and a communication interface 2370. According to an embodiment, the electronic device 2301 may not include at least one of the above-described components or may further include other component(s). The bus 2310 may interconnect the above-described components 2320 to 2370 and may include a circuit for conveying communications (e.g., a control message or data) among the above-described components. The processor 2320 (e.g., the processor of the electronic device 100) may include one or more of a central processing unit (CPU), an application processor (AP), or a communication processor (CP). For example, the processor 2320 may perform an arithmetic operation or data processing associated with control and/or communication of at least other components of the electronic device 2301.

The memory 2330 may include a volatile and/or nonvolatile memory. For example, the memory 2330 may store commands or data associated with at least one other component(s) of the electronic device 2301. According to an embodiment, the memory 2330 may store software and/or a program 2340. The program 2340 may include, for example, a kernel 2341, a middleware 2343, an application programming interface (API) 2345, and/or an application program (or "an application") 2347. At least a part of the kernel 2341, the middleware 2343, or the API 2345 may be referred to as an "operating system (OS)". For example, the kernel 2341 may control or manage system resources (e.g., the bus 2310, the processor 2320, the memory 2330, and the like) that are used to execute operations or functions of other programs (e.g., the middleware 2343, the API 2345, and the application program 2347). Furthermore, the kernel 2341 may provide an interface that allows the middleware 2343, the API 2345, or the application program 2347 to access discrete components of the electronic device 2301 so as to control or manage system resources.

The middleware 2343 may perform, for example, a mediation role such that the API 2345 or the application program 2347 communicates with the kernel 2341 to exchange data. Furthermore, the middleware 2343 may process task requests received from the application program 2347 according to a priority. For example, the middleware 2343 may assign the priority, which makes it possible to use a system resource (e.g., the bus 2310, the processor 2320, the memory 2330, or the like) of the electronic device 2301, and may process the one or more task requests. The API 2345 may be an interface through which the application program 2347 controls a function provided by the kernel 2341 or the middleware 2343, and may include, for example, at least one interface or function (e.g., an instruction) for a file control, a window control, image processing, a character control, or the like. The input/output interface 2350 may transmit a command or data input from a user or another external device, to other component(s) of the electronic device 2301 or may output a command or data, received from other component(s) of the electronic device 2301, to a user or another external device.

The display 2360 may include, for example, a liquid crystal display (LCD), a light-emitting diode (LED) display, an organic LED (OLED) display, a microelectromechanical systems (MEMS) display, or an electronic paper display. The display 2360 may display, for example, various contents (e.g., a text, an image, a video, an icon, a symbol, and/or the like) to a user. The display 2360 may include a touch screen and may receive, for example, a touch, gesture, proximity, or hovering input using an electronic pen or a part of a user's body.

For example, the communication interface 2370 may establish communication between the electronic device 2301 and an external device (e.g., the first external electronic device 2302, the second external electronic device 2304, or the server 2306). For example, the communication interface 2370 may be connected to the network 2362 over wireless communication or wired communication to communicate with the external device (e.g., the second external electronic device 2304 or the server 2306).

The wireless communication may include cellular communication which uses at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), radio frequency (RF), body area network, or the like. According to an embodiment, the wireless communication may include a global navigation satellite system (GNSS). The GNSS may include a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), power-line communication, a plain old telephone service (POTS), or the like. The network 2362 may include at least one of telecommunications networks, for example, a computer network (e.g., LAN or WAN), an Internet, or a telephone network. Alternatively, the electronic device 2301 may communicate with the first electronic device 2302 based on short range communication 2364.

Each of the first and second external electronic devices 2302 and 2304 may be a device of which the type is different from or the same as that of the electronic device 2301. According to various embodiments, all or a portion of operations that the electronic device 2301 will perform may be executed by another or plural electronic devices (e.g., the electronic device 2302 or 2304 or the server 2306). According to an embodiment, in the case where the electronic device 2301 executes any function or service automatically or in response to a request, the electronic device 2301 may not perform the function or the service internally, but, alternatively additionally, it may request at least a portion of a function associated with the electronic device 2301 from another device (e.g., the electronic device 2302 or 2304 or the server 2306). The other electronic device (e.g., the electronic device 2302 or 2304 or the server 2306) may execute the requested function or additional function and may transmit the execution result to the electronic device 2301. The electronic device 2301 may provide the requested function or service using the received result or may additionally process the received result to provide the requested function or service. To this end, for example, cloud computing, distributed computing, or client-server computing may be used.

Figure 24:
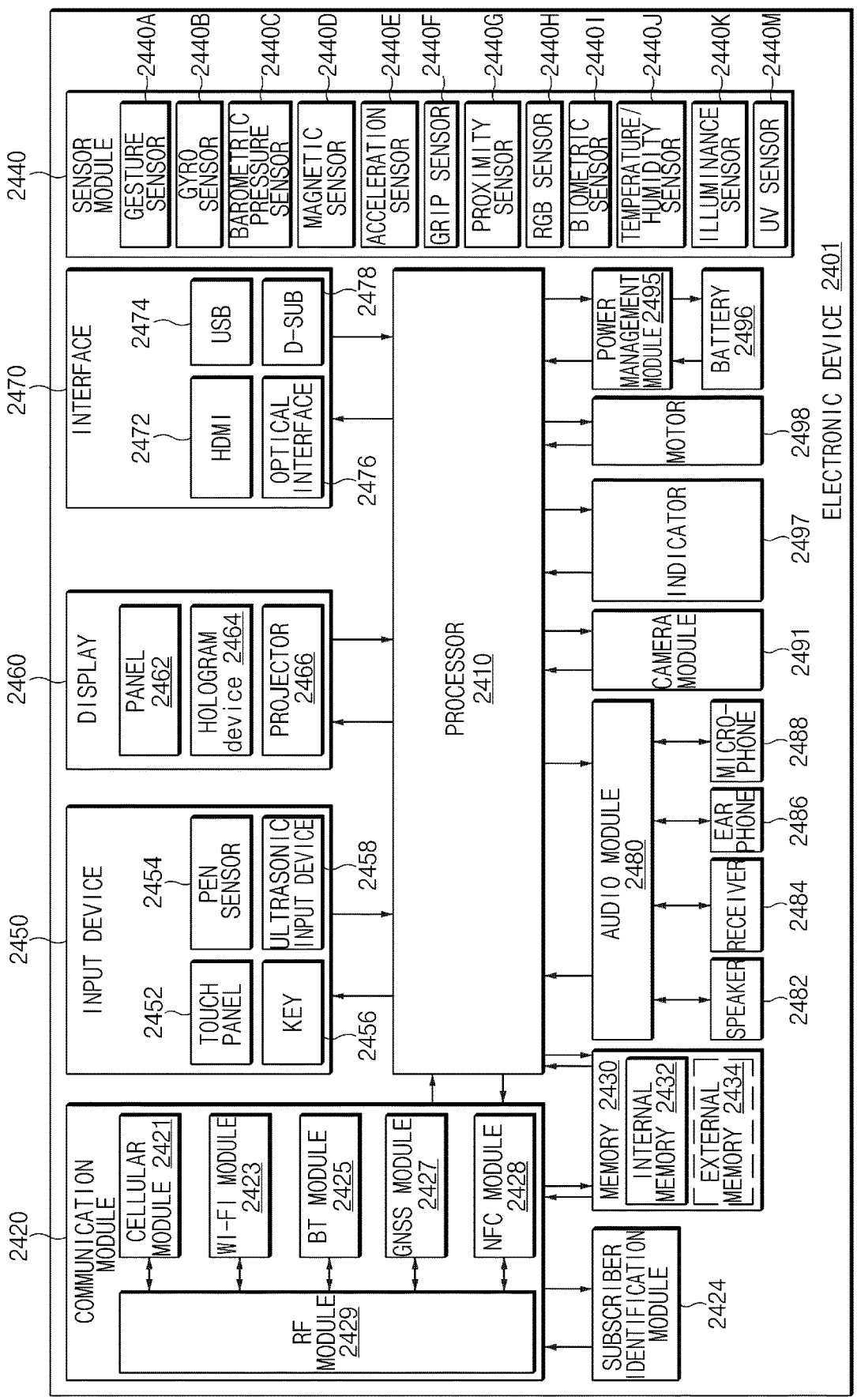
FIG. 24 illustrates a block diagram of an electronic device, according to various embodiments.

FIG. 24 illustrates a block diagram of an electronic device, according to various embodiments.

An electronic device 2401 may include, for example, all or a part of the electronic device 2301 illustrated in FIG. 23. The electronic device 2401 may include one or more processors (e.g., an application processor (AP)) 2410, a communication module 2420, a subscriber identification module 2429, a memory 2430, a sensor module 2440, an input device 2450, a display 2460, an interface 2470, an audio module 2480, a camera module 2491, a power management module 2495, a battery 2496, an indicator 2497, and a motor 2498. The processor 2410 may drive, for example, an operating system (OS) or an application to control a plurality of hardware or software components connected to the processor 2410 and may process and compute a variety of data. For example, the processor 2410 may be implemented with a System on Chip (SoC). According to an embodiment, the processor 2410 may further include a graphic processing unit (GPU) and/or an image signal processor. The processor 2410 may include at least a part (e.g., a cellular module 2421) of components illustrated in FIG. 24. The processor 2410 may load a command or data, which is received from at least one of other components (e.g., a nonvolatile memory), into a volatile memory and process the loaded command or data. The processor 2410 may store result data in the nonvolatile memory.

The communication module 2420 may be configured to be the same as or similar to the communication interface 2370 of FIG. 23. The communication module 2420 may include the cellular module 2421, a WiFi module 2422, a Bluetooth (BT) module 2423, a GNSS module 2424 (e.g., a GPS module, a Glonass module, a Beidou module, or a Galileo module), a near field communication (NFC) module 2425, a MST module 2426 and a radio frequency (RF) module 2427. The cellular module 2421 may provide, for example, voice communication, video communication, a character service, an Internet service, or the like over a communication network. According to an embodiment, the cellular module 2421 may perform discrimination and authentication of the electronic device 2401 within a communication network by using the subscriber identification module (e.g., a SIM card) 2429.

According to an embodiment, the cellular module 2421 may perform at least a portion of functions that the processor 2410 provides. According to an embodiment, the cellular module 2421 may include a communication processor (CP). According to an embodiment, at least a part (e.g., two or more) of the cellular module 2421, the WiFi module 2422, the BT module 2423, the GNSS module 2424, the NFC module 2425, or the MST module 2426 may be included within one Integrated Circuit (IC) or an IC package. For example, the RF module 2427 may transmit and receive a communication signal (e.g., an RF signal). For example, the RF module 2427 may include a transceiver, a power amplifier module (PAM), a frequency filter, a low noise amplifier (LNA), an antenna, or the like. According to another embodiment, at least one of the cellular module 2421, the WiFi module 2422, the BT module 2423, the GNSS module 2424, the NFC module 2425, or the MST module 2426 may transmit and receive an RF signal through a separate RF module. The subscriber identification module 2429 may include, for example, a card or embedded SIM that includes a subscriber identification module and may include unique identify information (e.g., integrated circuit card identifier (ICCID)) or subscriber information (e.g., integrated mobile subscriber identity (IMSI)).

The memory 2430 (e.g., the memory 2330) may include an internal memory 2432 or an external memory 2434. For example, the internal memory 2432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD). The external memory 2434 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 2434 may be operatively and/or physically connected to the electronic device 2401 through various interfaces.

The sensor module 2440 may measure, for example, a physical quantity or may detect an operation state of the electronic device 2401. The sensor module 2440 may convert the measured or detected information to an electric signal. For example, the sensor module 2440 may include at least one of a gesture sensor 2440A, a gyro sensor 2440B, a barometric pressure sensor 2440C, a magnetic sensor 2440D, an acceleration sensor 2440E, a grip sensor 2440F, the proximity sensor 2440G, a color sensor 2440H (e.g., red, green, blue (RGB) sensor), a biometric sensor 2440I, a temperature/humidity sensor 2440J, an illuminance sensor 2440K, or an UV sensor 2440M. Although not illustrated, additionally or alternatively, the sensor module 2440 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2440 may further include a control circuit for controlling at least one or more sensors included therein. According to an embodiment, the electronic device 2401 may further include a processor that is a part of the processor 2410 or independent of the processor 2410 and is configured to control the sensor module 2440. The processor may control the sensor module 2440 while the processor 2410 remains at a sleep state.

The input device 2450 may include, for example, a touch panel 2452, a (digital) pen sensor 2454, a key 2456, or an ultrasonic input unit 2458. For example, the touch panel 2452 may use at least one of capacitive, resistive, infrared and ultrasonic detecting methods. Also, the touch panel 2452 may further include a control circuit. The touch panel 2452 may further include a tactile layer to provide a tactile reaction to a user. The (digital) pen sensor 2454 may be, for example, a part of a touch panel or may include an additional sheet for recognition. The key 2456 may include, for example, a physical button, an optical key, a keypad, or the like. The ultrasonic input device 2458 may detect (or sense) an ultrasonic signal, which is generated from an input device, through a microphone (e.g., a microphone 2488) and may check data corresponding to the detected ultrasonic signal.

The display 2460 (e.g., the display 2360) may include a panel 2462, a hologram device 2464, a projector 2466, and/or a control circuit for controlling the panel 2462, the hologram device 2464, or the projector 2466. The panel 2462 may be implemented, for example, to be flexible, transparent or wearable. The panel 2462 and the touch panel 2452 may be integrated into one or more modules. According to an embodiment, the panel 2462 may include a pressure sensor (or force sensor, interchangeably used hereinafter) that measures the intensity of touch pressure by a user. The pressure sensor may be implemented integrally with the touch panel 2452, or may be implemented as at least one sensor separately from the touch panel 2452. The hologram device 2464 may display a stereoscopic image in a space using a light interference phenomenon. The projector 2466 may project light onto a screen so as to display an image. For example, the screen may be arranged in the inside or the outside of the electronic device 2401. The interface 2470 may include, for example, a high-definition multimedia interface (HDMI) 2472, a universal serial bus (USB) 2474, an optical interface 2476, or a D-subminiature (D-sub) 2478. The interface 2470 may be included, for example, in the communication interface 2370 illustrated in FIG. 23. Additionally or alternatively, the interface 2470 may include, for example, a mobile high definition link (MHL) interface, a SD card/multi-media card (MMC) interface, or an infrared data association (IrDA) standard interface.

The audio module 2480 may convert a sound and an electric signal in dual directions. At least a component of the audio module 2480 may be included, for example, in the input/output interface 2350 illustrated in FIG. 23. The audio module 2480 may process, for example, sound information that is input or output through a speaker 2482, a receiver 2484, an earphone 2486, or the microphone 2488. For example, the camera module 2491 may shoot a still image or a video. According to an embodiment, the camera module 2491 may include at least one or more image sensors (e.g., a front sensor or a rear sensor), a lens, an image signal processor (ISP), or a flash (e.g., an LED, a xenon lamp, or the like). The power management module 2495 may manage, for example, power of the electronic device 2401. According to an embodiment, a power management integrated circuit (PMIC), a charger IC, or a battery or fuel gauge may be included in the power management module 2495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2496 and a voltage, current or temperature thereof while the battery is charged. The battery 2496 may include, for example, a rechargeable battery and/or a solar battery.

The indicator 2497 may display a specific state of the electronic device 2401 or a part thereof (e.g., the processor 2410), such as a booting state, a message state, a charging state, and the like. The motor 2498 may convert an electrical signal into a mechanical vibration and may generate the following effects: vibration, haptic, and the like. A processing device (e.g., a GPU) for supporting a mobile TV may be included in the electronic device 2401. The processing device for supporting the mobile TV may process media data according to the standards of digital multimedia broadcasting (DMB), digital video broadcasting (DVB), MediaFlo™, or the like.

Figure 25:
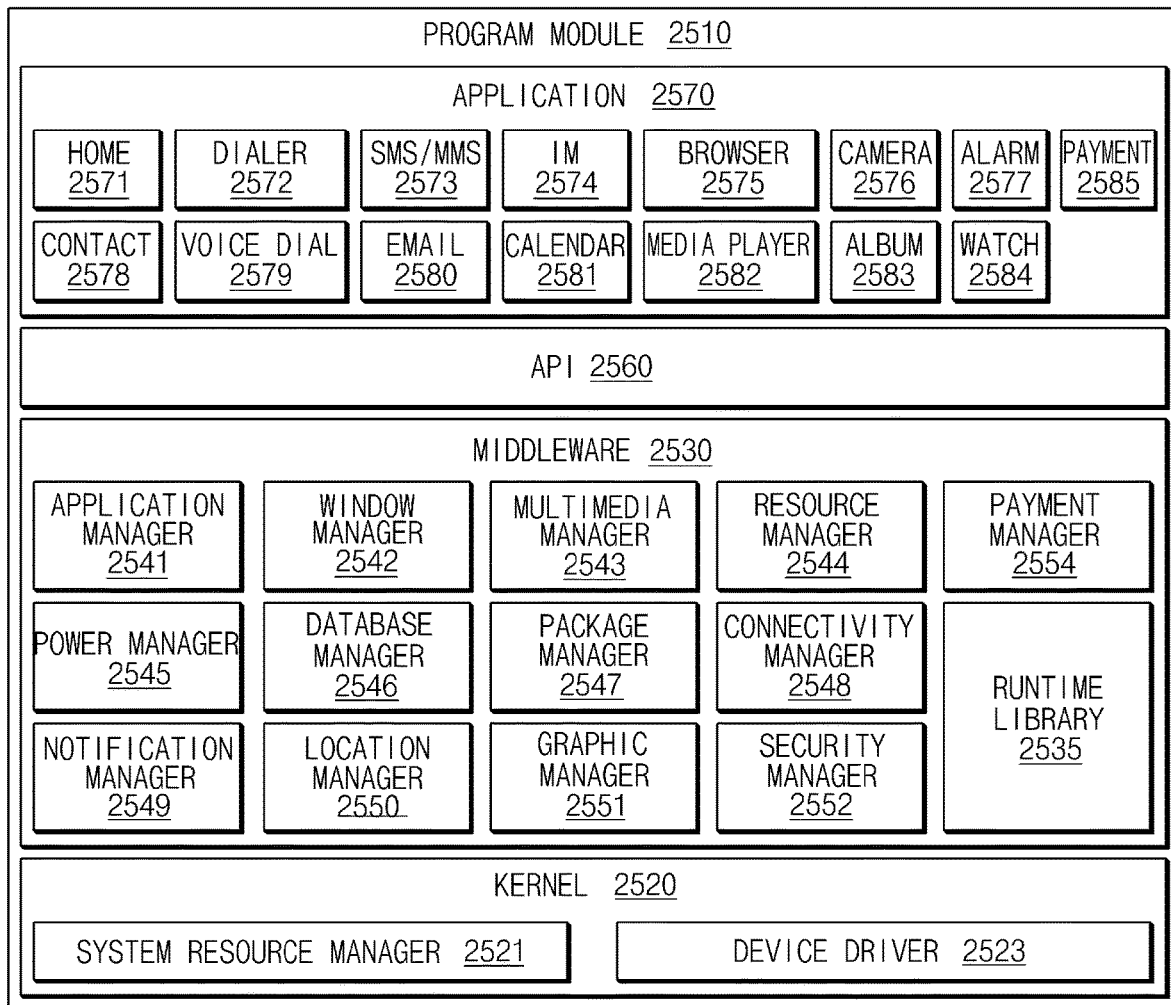
FIG. 25 illustrates a block diagram of a program module, according to various embodiments.

FIG. 25 illustrates a block diagram of a program module, according to various embodiments.

According to an embodiment, a program module 2510 (e.g., the program 2340) may include an operating system (OS) to control resources associated with an electronic device (e.g., the electronic device 2301), and/or diverse applications (e.g., the application program 2347) driven on the OS. The OS may be, for example, Android™, iOS™, Windows™, Symbian™ Tizen™, or Bada™. Referring to FIG. 25, the program module 2510 may include a kernel 2520 (e.g., the kernel 2341), a middleware 2530 (e.g., the middleware 2343), an application programming interface (API) 2560 (e.g., the API 2345), and/or an application 2570 (e.g., the application program 2347). At least a portion of the program module 2510 may be preloaded on an electronic device or may be downloadable from an external electronic device (e.g., the electronic device 2302 or 2304, the server 2306, or the like).

The kernel 2520 may include, for example, a system resource manager 2521 or a device driver 2523. The system resource manager 2521 may perform control, allocation, or retrieval of system resources.

According to an embodiment, the system resource manager 2521 may include a process managing unit, a memory managing unit, or a file system managing unit. The device driver 2523 may include, for example, a display driver, a camera driver, a Bluetooth driver, a shared memory driver, a USB driver, a keypad driver, a Wi-Fi driver, an audio driver, or an inter-process communication (IPC) driver. The middleware 2530 may provide, for example, a function that the application 2570 needs in common, or may provide diverse functions to the application 2570 through the API 2560 to allow the application 2570 to efficiently use limited system resources of the electronic device.

According to an embodiment, the middleware 2530 may include at least one of a runtime library 2535, an application manager 2541, a window manager 2542, a multimedia manager 2543, a resource manager 2544, a power manager 2545, a database manager 2546, a package manager 2547, a connectivity manager 2548, a notification manager 2549, a location manager 2550, a graphic manager 2551, a security manager 2552, or a payment manager 2554.

The runtime library 2535 may include, for example, a library module that is used by a compiler to add a new function through a programming language while the application 2570 is being executed. The runtime library 2535 may perform input/output management, memory management, or arithmetic functions. The application manager 2541 may manage, for example, a life cycle of at least one application of the application 2570.

The window manager 2542 may manage a graphic user interface (GUI) resource that is used in a screen. The multimedia manager 2543 may identify a format necessary for playing media files, and may perform encoding or decoding of media files by using a codec suitable for the format. The resource manager 2544 may manage source code of the application 2570 or a memory space. The power manager 2545 may to manage a battery or power, and may provide power information for an operation of an electronic device. According to an embodiment, the power manager 2545 may be interlocked with a basic input/output system (BIOS). For example, the database manager 2546 may generate, search for, or modify database that is to be used in the application 2570. The package manager 2547 may install or update an application that is distributed in the form of package file.

The connectivity manager 2548 may manage, for example, wireless connection. For example, the notification manager 2549 may notify an event such as arrival message, appointment, or proximity notification to a user. The location manager 2550 may manage, for example, location information about an electronic device. The graphic manager 2551 may manage, for example, a graphic effect that is provided to a user, or manage a user interface relevant thereto. The security manager 2552 may provide system security or user authentication.

The middleware 2530 may include a telephony manager for managing a voice or video call function of the electronic device and a middleware module that combines diverse functions of the above-described components. According to an embodiment, the middleware 2530 may provide a module specialized to each OS kind to provide differentiated functions. The middleware 2530 may dynamically remove a part of the preexisting components or may add new components thereto. The API 2560 may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 2570 may include, for example, one or more applications capable of providing functions for a home 2571, a dialer 2572, an SMS/MMS 2573, an instant message (IM) 2574, a browser 2575, a camera 2576, an alarm 2577, a contact 2578, a voice dial 2579, an e-mail 2580, a calendar 2581, a media player 2582, an album 2583, a watch 2584, and a payment 2585 or for offering health care (e.g., measuring an exercise quantity, blood sugar, or the like) or environment information (e.g., information of barometric pressure, humidity, temperature, or the like).

According to an embodiment, the application 2570 may include an application to support information exchange between an electronic device and an external electronic device. The information exchanging application may include, for example, a notification relay application for transmitting specific information to an external electronic device, or a device management application for managing the external electronic device. For example, the notification relay application may transmit notification information, which arise from other application of an electronic device, to an external electronic device or may provide the notification information received from an external electronic device to a user.

The device management application may install, delete, or update, for example, a function (e.g., turn-on/turn-off of an external electronic device itself (or a part) or adjustment of brightness (or resolution) of a display) of the external electronic or an application running in the external electronic device. According to an embodiment, the application 2570 may include an application (e.g., a health care application of a mobile medical device) that is assigned in accordance with an attribute of an external electronic device. According to various embodiments, at least a portion of the program module 2510 may be implemented (e.g., executed) by software, firmware, hardware, or a combination of two or more thereof and may include modules, programs, routines, sets of instructions, processes, or the like for performing one or more functions.

Figure 26:
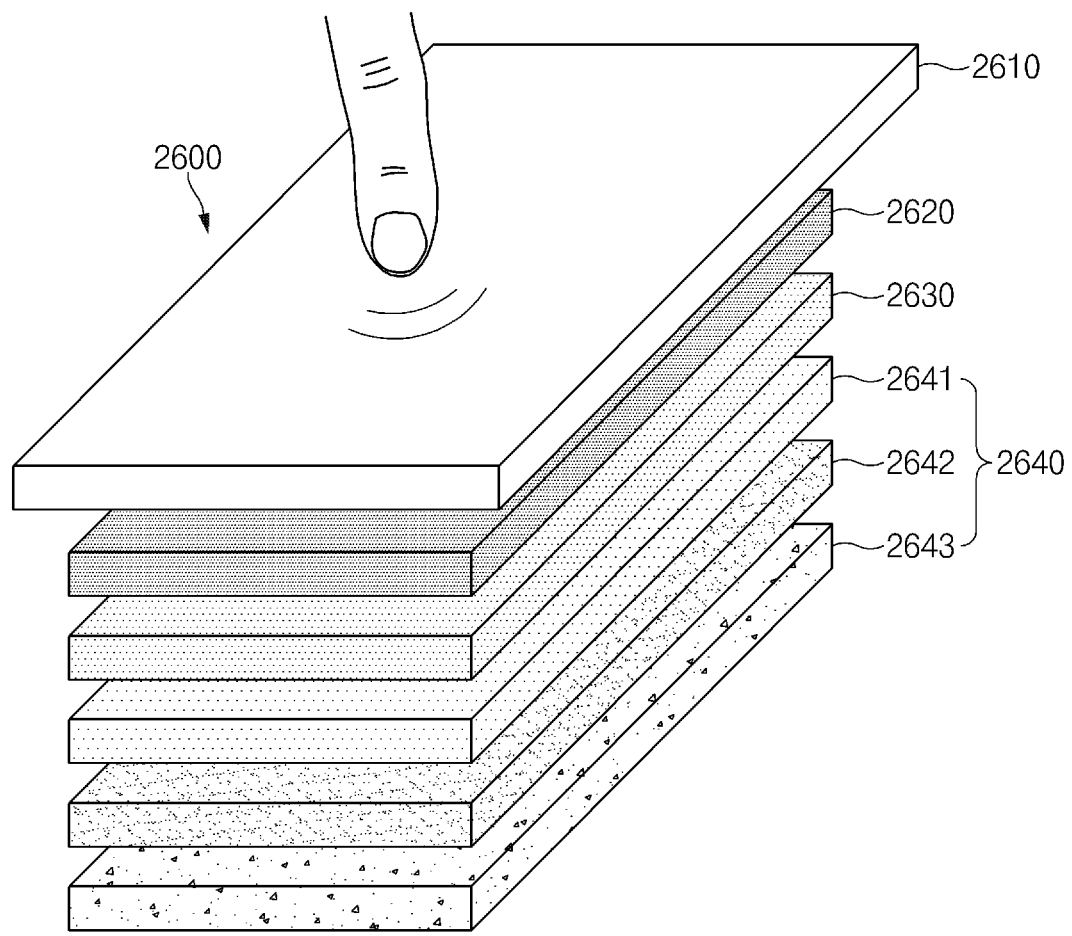
FIG. 26 is a view illustrating an example of a stacked structure of an electronic device according to an embodiment of the present disclosure.
Figure 27:
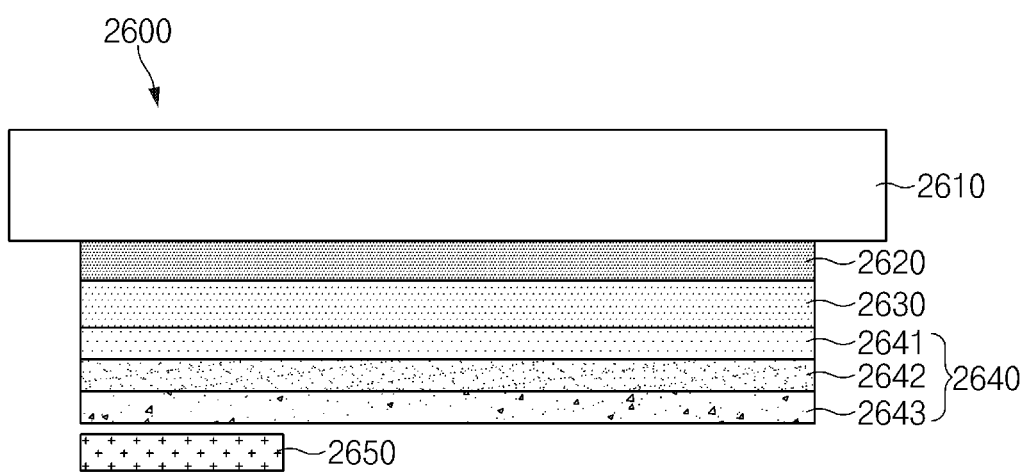
FIG. 27 is a view illustrating another example of a stacked structure of an electronic device according to an embodiment of the present disclosure.

FIG. 26 is a view illustrating an example of a stacked structure of an electronic device according to an embodiment of the present disclosure, and FIG. 27 is a view illustrating another example of a stacked structure of an electronic device according to an embodiment of the present disclosure.

An electronic device 2600 illustrated in FIGS. 26 and 27 may include a window 2610, a touch sensor 2620, a display panel 2630, and a pressure sensor 2640 in common, and a haptic actuator 2650 may be further included as illustrated in FIG. 27. For example, the stacked structure may also be applied to various electronic devices exemplified above.

In the stacked structure of a display according to an embodiment, the window 2610 may be positioned in an inner space between a front surface (a first surface) of the positioned electronic device and a back surface (a second surface) of a housing. The window 2610 may be exposed through the front surface (the first surface) of the electronic device and may transmit a light generated by the display panel 2630. A user may perform a "touch" (including a contact using an electronic pen) on the window 2610 by contacting the window 2610 by using a portion of his/her body (e.g., his/her finger). The window 2610 may be form of, for example, tempered glass, reinforced plastic, a flexible polymer material, or the like and may protect a display or an electronic device equipped with the display from external impact. According to various embodiments, the window 2610 may be also referred to as a "glass window" or "cover window".

For example, the touch sensor 2620 may be positioned in the inner space between the front surface (the first surface) of the electronic device, on which the window 2610 is positioned, and the back surface (the second surface: not illustrated) of the housing of the electronic device. In the touch sensor 2620, a specified physical quantity (e.g., a voltage, the amount of light, a resistance, the amount of charges, a capacitance, or the like) may vary with a touch from the user. For example, the touch sensor 2620 may include a capacitive touch panel, an infrared touch panel, a resistive touch panel, a pressure touch panel, a piezo touch panel, or the like. According to various embodiments, the touch sensor 2620 may be referred to as various names, such as a touch panel and the like, based on the implementation form.

According to various embodiments, the display panel 2630 may output content (e.g., a text, an image, a video, an icon, a widget, a symbol, or the like). For example, the display panel 2630 may include a liquid crystal display (LCD) panel, a light-emitting diode (LED) display panel, an organic LED (OLED) display panel, a microelectromechanical systems (MEMS) display panel, or an electronic paper display panel.

According to various embodiments, the display panel 2630 may be integrally implemented with the touch sensor (or the touch panel) 2630. In this case, the display panel 2630 may be also referred to as a "touch screen panel (TSP)" or "touch screen display panel".

The pressure sensor 2640 may be positioned, for example, in the inner space between the front surface (the first surface) of the electronic device, on which the window 2610 is positioned, and the back surface (the second surface: not illustrated) of the housing of the electronic device. The pressure sensor 2640 may sense a pressure (or a force) of the outside (e.g., the finger of the user) against the window 2610. According to an embodiment, the pressure sensor 2640 may include a first electrode 2641, a second electrode 2643, and/or a dielectric layer 2642. For example, the pressure sensor 2640 may sense the pressure of the touch based on a capacitance between the first electrode 2641 and the second electrode 2643, which varies with the touch.

According to an embodiment, the first electrode 2641 and/or the second electrode 2643 may be implemented to be transparent or opaque. For example, in the case where the first electrode 2641 and/or the second electrode 2643 is implemented to be opaque, the first electrode 2641 and/or the second electrode 2643 may include copper (Cu), silver (Ag), magnesium (Mg), titanium (Ti), or opaque graphene. Also, in the case where the first electrode 2641 and/or the second electrode 2643 is implemented to be transparent, the first electrode 2641 and/or the second electrode 2643 may be formed of indium thin oxide (ITO), indium zinc oxide (IZO), Ag nanowire, metal mesh, transparent conducting polymer, or transparent graphene.

For example, one of the first electrode 2641 and/or the second electrode 2643 may be implemented with one metal plate performing a ground (GND) role, and the other thereof may be formed to have a repeated polygon pattern by using the above-described member (a so-called "self-capacitance manner"). For another example, one (e.g., a transmitter (Tx) terminal) of the first electrode 2641 and the second electrode 2643 may be implemented with a pattern extending in a first direction, and the other (e.g., a receiver (Rx) terminal) thereof may be implemented with a pattern extending in a second direction intersecting the first direction at a specified angle (e.g., a right angle) (a so-called "mutual-capacitance manner").

The dielectric layer 2642 may include a dielectric material, for example, silicon foam, silicon membrane, optical clean adhesive (OCA), sponge, rubber, or polymer (e.g., polycabonate (PC), polyethylene terephthalate (PET), or the like).

When a touch input (including a touch, a hovering, or a "force touch") is received from the user, the haptic actuator 2560 may provide the user with a haptic feedback (e.g., a vibration). To this end, the haptic actuator 2560 may include a piezoelectric member and/or a vibration plate.

The stacked structure of the electronic device above described with reference to FIG. 26 or 27 is an example and may be variously changed or modified. For example, the touch sensor 2620 may be formed directly on a back surface of the window 2610 (a so-called "window integrated touch panel"), may be inserted between the window 2610 and the display panel 2630 after being separately manufactured (a so-called "add-on touch panel"), may be formed directly on the display panel 2630 (a so-called "on-cell touch panel"), or may be included within the display panel 2630 (a so-called "in-cell touch panel"). According to various embodiments, the first electrode 2641 of the pressure sensor 2640 may be attached to the display panel 2630 after being formed on a circuit board (e.g., FPCB) or may be formed directly on a back surface of the display panel 2630.

Figure 28:
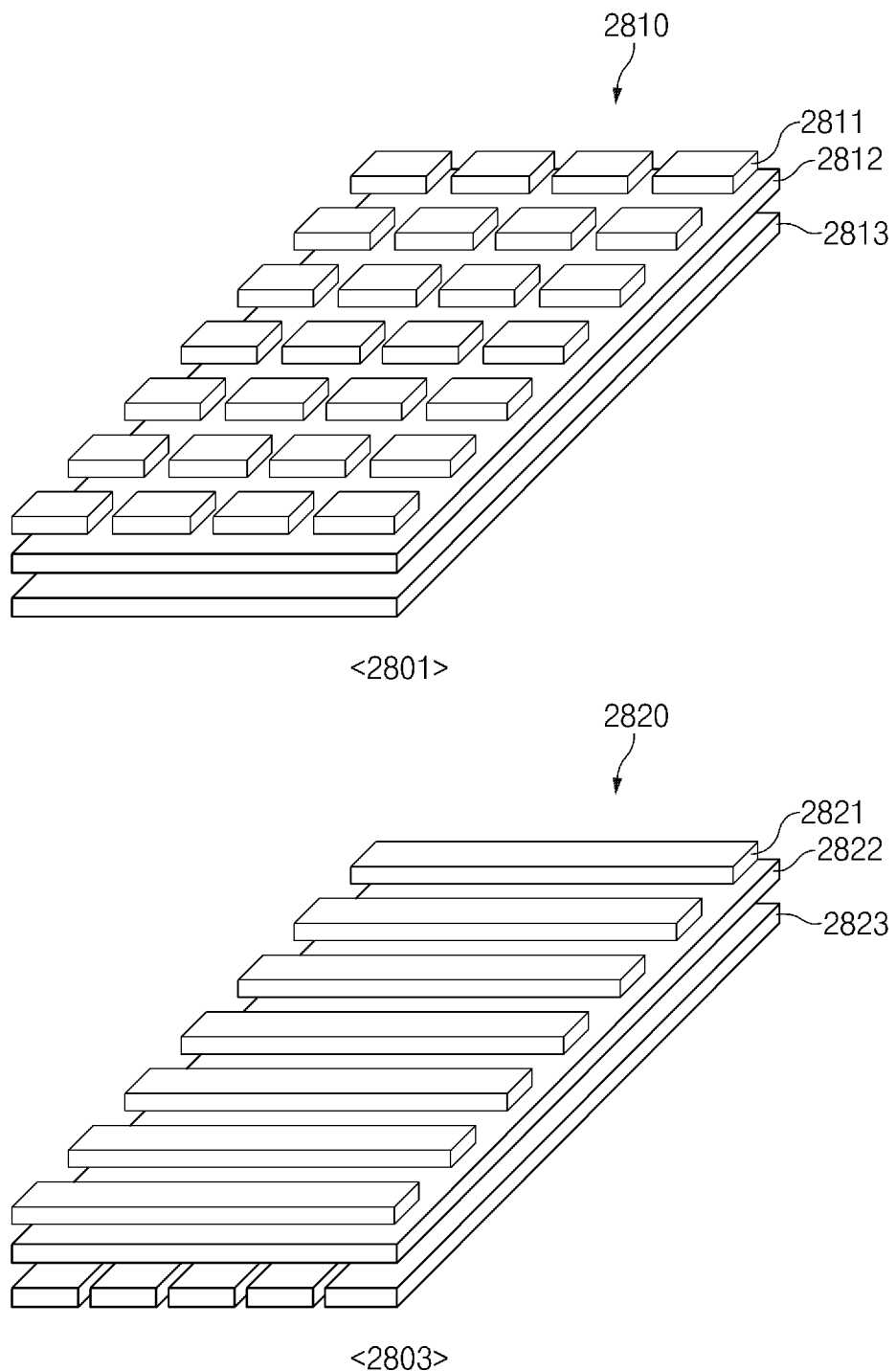
FIG. 28 is a view illustrating various shapes of a pressure sensor according to an embodiment of the present disclosure.

FIG. 28 is a view illustrating various shapes of a pressure sensor according to an embodiment of the present disclosure.

Referring to FIG. 28, a pressure sensor according to an embodiment of the present disclosure may be implemented with any one of a first type pressure sensor 2810 of a self-capacitance scheme as illustrated in drawing 2801 or a second type pressure sensor 2820 of a mutual-capacitance scheme as illustrated in drawing 2803.

The first type pressure sensor 2810 may include, for example, a first electrode 2811 positioned in a matrix form, a dielectric layer 2812, and a second electrode 2813 performing a ground role. The first electrode 2811 may have a density similar to pixels of a display panel or a density (a plurality of pixels correspond to one sub electrode) smaller than pixels of the display panel. The second electrode 2813 may have the area corresponding to the whole first electrode 2811 positioned in the matrix form and may have one electrode plate shape or a shape in which electrodes are connected to each other.

The second type pressure sensor 2820 may include, for example, a first electrode 2821 including a plurality of horizontal lines, a dielectric layer 2822, and a second electrode 2823 including a plurality of vertical lines. The number of horizontal lines of the first electrode 2821 and the number of vertical lines of the second electrode 2823 may vary with the size or kind of the electronic device or designer's intention. The first electrode 2821 and the second electrode 2823 may be formed of the same material or may be formed of materials, the conductivities of which are similar or identical.

Figure 29:
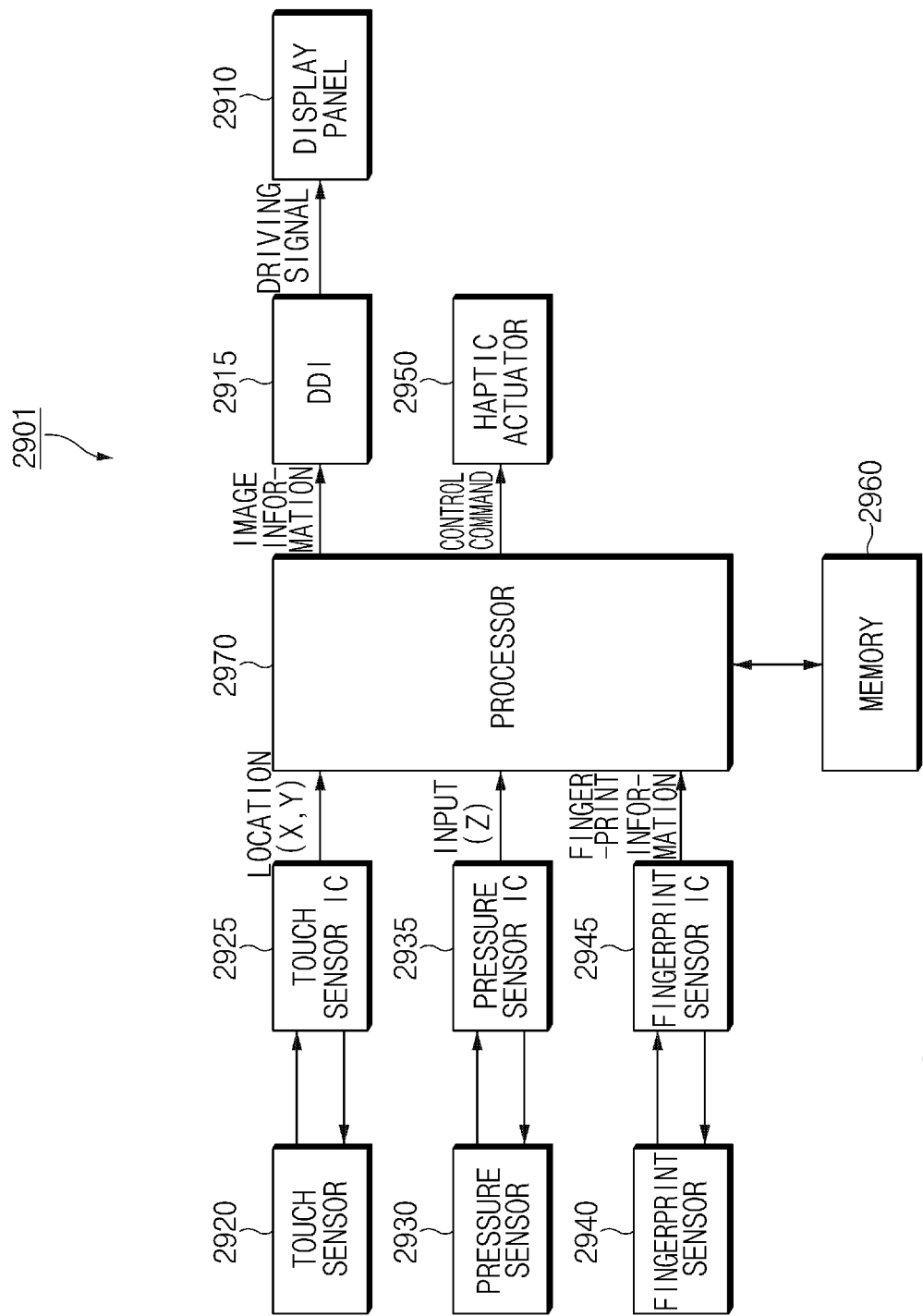
FIG. 29 is a view illustrating a block diagram of an electronic device according to an embodiment.

FIG. 29 is a view illustrating a block diagram of an electronic device according to an embodiment.

Referring to FIG. 29, an electronic device 2901 according to an embodiment may include a display panel 2910, a display driving integrated circuit (DDI) 2915, a touch sensor 2920, a touch sensor IC 2925, a pressure sensor 2930, a pressure sensor IC 2935, a fingerprint sensor 2940, a fingerprint sensor IC 2945, a haptic actuator 2950, a memory 2960, and a processor 2970. The above-described electronic device 2901 may be applied to various electronic devices exemplified above.

According to various embodiments, the display panel 2910 may receive an image driving signal supplied from the display driving integrated circuit (DDI) 2915. The display panel 2910 may display various content (e.g., a text, an image, a video, an icon, a symbol, and the like) based on the image driving signal. In the specification, the display panel 2910 may be combined with the touch sensor 2920, the pressure sensor 2930, and/or the fingerprint sensor 2940 so as to overlap each other. For example, in the case where the display panel 2910 and the touch sensor 2920 are combined, the combination may be referred to as a "touchscreen display".

According to various embodiments, the display driving integrated circuit (DDI) 2915 may transmit an image driving signal corresponding to image information received from the processor 2970 (e.g., a host), to the display panel 2910 at a preset frame rate. Although not illustrated in drawing, according to various embodiments, the display driving integrated circuit 2915 may include a graphic RAM, an interface module, an image processing unit, a multiplexer, a display timing controller (T-con), a source driver, a gate driver, and/or an oscillator.

According to an embodiment, in the touch sensor 2920, a specified physical quantity (e.g., a voltage, the amount of light, a resistance, the amount of charges, a capacitance, or the like) may vary with a touch from the user. According to an embodiment, the touch sensor 2920 may be positioned to overlap the display panel 2910.

According to various embodiments, the touch sensor IC 2925 may sense a change in the physical quantity in the touch sensor 2920 and may calculate a location (X,Y), at which a touch is made, based on the change in the physical quantity (e.g., a voltage, a resistance, a capacitance, or the like). The calculated location (coordinates) may be provided to the processor 2970.

For example, when a portion (e.g., a finger) of the user body, a stylus (an example of an electronic pen), or the like contacts a glass (not illustrated) of a display, a coupling voltage between the transmitter (Tx) terminal and/or the receiver (Rx) terminal included in the touch sensor 2920 may change. For example, the variation in the coupling voltage may be sensed by the touch sensor IC 2925, and the touch sensor IC 2925 may provide coordinates of a location, at which the touch is made, to the processor 2970. The processor 2970 may obtain data associated with the location coordinates as an event associated with a user input.

According to various embodiments, the touch sensor IC 2925 may be referred to as a "touch IC", a "touch screen IC", a "touch controller", a "touch screen controller IC", or the like. According to various embodiments, in an electronic device in which the touch sensor IC 2925 is not included, the processor 2970 may perform a role of the touch sensor IC 2925. According to various embodiments, the touch sensor IC 2925 and the processor 2970 may be implemented with one configuration (e.g., one-chip).

According to various embodiments, an external pressure (or force) may be sensed in the pressure sensor 2930. For example, the pressure sensor 2930 may sense the pressure which is applied by the finger of the user against a touch screen. According to an embodiment, in the pressure sensor 2930, a physical quantity (e.g., a capacitance) between the transmitter (Tx) terminal (e.g., the first electrode 2641 of FIG. 26) and the receiver (Rx) terminal (e.g., the second electrode 2643 of FIG. 26) may vary with the touch.

According to various embodiments, the pressure sensor IC 2935 may sense the change in the physical quantity (e.g., a capacitance or the like) in the pressure sensor 2930 and may calculate a pressure "Z" applied by the touch of the user, based on the change in the physical quantity. The pressure value may be provided to the processor 2970 together with the location (X,Y) at which the touch is made.

According to various embodiments, the pressure sensor IC 2935 may be referred to as a "force touch controller", a "force sensor IC", a "pressure panel IC", or the like. Also, according to various embodiments, the pressure sensor IC 2935 may be implemented with one configuration (e.g., one-chip) together with the touch sensor IC 2925.

The fingerprint sensor 2940 may have, for example, the area (e.g., substantially the same area) corresponding to the display panel 2910 or the area corresponding to at least a portion of the display panel 2910 and may detect a fingerprint of a user's finger. For example, a fingerprint image of the finger may be captured in the fingerprint sensor 2940. The fingerprint sensor 2940 may be classified as an optical type, an ultrasonic type, or a capacitive type depending on a physical quantity used to capture the fingerprint image. For another example, an area scheme in which a fingerprint is recognized for each surface may be applied to the fingerprint sensor 2940.

According to various embodiments, the fingerprint sensor IC 2945 may drive the fingerprint sensor 2940, and may scan at least a partial region of the fingerprint sensor 2940. The fingerprint sensor IC 2945 may capture a fingerprint image through the scanning. For example, the fingerprint sensor IC 2945 may extract a unique feature of a fingerprint from the fingerprint image and may provide the extracted feature as fingerprint information to the processor 2970. For example, the extracted feature, that is, a fingerprint minutiae may include various minutia of a fingerprint, such as a ridge ending, a crossover, a bifurcation, a pore, and the like.

According to various embodiments, the haptic actuator 2950 may provide the user with a haptic feedback (e.g., a vibration) in response to a control command of the processor 2970. For example, when a touch input (e.g., including a touch, a hovering, and a "force touch") is received from the user, the haptic actuator 2950 may provide the user with the haptic feedback.

According to various embodiments, the memory 2960 may store an instruction or data associated with an operation of a component included in the electronic device 2901. For example, the memory 2960 may store instructions which, when executed, cause the processor 2970 to perform various operations described in the present disclosure.

According to an embodiment, data (e.g., a fingerprint template) associated with at least one enrolled fingerprint (or reference fingerprint) enrolled in advance by a rightful user may be stored in the memory 2960.

For example, the processor 2970 may be electrically connected with the components 2910 to 2960 included in the electronic device 2901 and may process an operation or data associated with a control and/or communication of the components included in the electronic device 2901.

According to an embodiment, the processor 2970 may sense a pressure, which is applied to a touchscreen display by the finger of the user, by using the pressure sensor 2930. The processor 2970 may activate the fingerprint sensor 2940 when the sensed pressure is not smaller than a specified value. In other words, when a touch is made by the pressure of the specified value or greater (i.e., a force touch is performed), the processor 2970 may trigger the activation of the fingerprint sensor 2940.

According to various embodiments, the processor 2970 may sense the applied pressure in an OFF state where the display panel 2910 is turned off, in addition to an ON state where the display panel 2910 is turned on, and may activate the fingerprint sensor 2940 based on the pressure.

For example, in the case where a pressure of a specified value or greater is sensed in a state where the display panel 2910 is turned off, the processor 2970 may activate the fingerprint sensor 2940. For example, the display panel 2910 may be maintained in an OFF state while the electronic device 2901 operates in an idle mode or a sleep mode.

For another example, in the case where a pressure of a specified value or greater is sensed in a state where the display panel 2910 is turned on, the processor 2970 may activate the fingerprint sensor 2940. For example, the display panel 2910 may be outputting a lock screen, a home screen, or an application executing screen in the ON state.

According to an embodiment, the processor 2970 may detect a fingerprint of the finger by using the activated fingerprint sensor 2940. For example, the processor 2970 may scan a range which is specified with respect to a location where a touch pressure is applied, by using the fingerprint sensor 2940. Afterwards, the processor 2970 may detect a fingerprint within the specified range.

According to an embodiment, the processor 2970 may compare the detected fingerprint and an enrolled fingerprint (e.g., a fingerprint template) stored in the memory 2960. The processor 2970 may compare a fingerprint detected through the fingerprint sensor 2940 and the enrolled fingerprint stored in the memory 2960; in the case where the detected fingerprint and the enrolled fingerprint are matched, the processor 2970 may determine that a fingerprint of the user is authenticated. According to various embodiments, for reliability-high comparison, the processor 2970 may further include image pre-processing.

According to an embodiment, the processor 2970 may perform a first function when the enrolled fingerprint and a fingerprint detected through the fingerprint sensor 2940 are matched. In contrast, in the case where the detected fingerprint and the enrolled fingerprint are not matched, the processor 2970 may perform a second function different from the first function.

For example, in the case where a fingerprint is detected in a state where the display panel 2910 is turned off and the detected fingerprint and the enrolled fingerprint are matched, the processor 2970 may switch a state of the display panel 2910 to an ON state (an example of the first function). In this case, the processor 2970 may output, for example, an unlocked home screen, a screen of an application being currently executed, or a screen including preset information to the display panel 2910.

For another example, in the case where a fingerprint is detected in a state where the display panel 2910 is turned off and the detected fingerprint and the enrolled fingerprint are not matched, the processor 2970 may maintain the OFF state of the display panel 2910 (an example of the second function).

For another example, in the case where the detected fingerprint and the enrolled fingerprint are not matched, the processor 2970 may temporarily output an alarm guide message indicating that the detected fingerprint and the enrolled fingerprint are not matched, and may maintain the OFF state.

For another example, in the case where a fingerprint is detected in a state where a specified lock screen is output through the display panel 2910 (in a state where the display panel 2910 is in the ON state) and the detected fingerprint and the enrolled fingerprint are matched, the processor 2970 may output the unlocked screen to the display (an example of the first function). The unlocked screen may include, for example, a home screen or a screen of an application being currently executed.

For another example, in the case where a fingerprint is detected in a state where a lock screen is output through the display panel 2910 (in a state where the display panel 2910 is in the ON state) and the detected fingerprint and the enrolled fingerprint are not matched, the processor 2970 may maintain the lock screen (an example of the second function). For another example, in the case where the detected fingerprint and the enrolled fingerprint are not matched, the processor 2970 may temporarily output an alarm guide message indicating that the detected fingerprint and the enrolled fingerprint are not matched, and may maintain the lock screen.

For another example, a screen in which at least one object associated with an application is included may be output through the display panel 2910 (the display panel 2910 being in the ON state). The application may at least include a payment application, a finance application, or an image viewer application.

For example, a touch of a specified pressure value or greater may be made on a touchscreen display. In this case, a location where the touch of the specified pressure value or greater is made may correspond to a location where an object associated with the above-described application is output (or displayed). In other words, the user may select the object associated with the application by using a touch of the specified pressure value or greater. In the case where the touch of the specified pressure value or greater is made, the processor 2970 may activate the fingerprint sensor 2940 and may detect a fingerprint through the activated fingerprint sensor 2940.

In the case where the detected fingerprint and the enrolled fingerprint are matched, the processor 2970 may release a security policy set by the selected application (an example of the first function). According to various embodiments, the processor 2970 may output an execution screen of the application, the security policy of which is released, to the display panel 2910.

For another example, in the case where the detected fingerprint and the enrolled fingerprint are not matched, the processor 2970 may maintain the security policy set by the selected application (an example of the second function). For example, in the case where the security policy is maintained, the execution screen of the application, the security policy of which is maintained, may be output through the display panel 2910, or the application may not be executed.

According to another embodiment, the processor 2970 may sense a pressure of the user's finger associated with a touchscreen display by using the pressure sensor 2930. When the pressure is detected, the processor 2970 may activate the fingerprint sensor 2940 and may detect a fingerprint of the user by using the fingerprint sensor. Then, the processor 2970 may determine whether a detected fingerprint and the enrolled fingerprint stored in the memory 2960, and may perform a specified function (the first function) without additional authentication when the detected fingerprint and the enrolled fingerprint are matched. For example, in the case where a pressure is applied to an object (e.g., an icon or the like) of an application output through a touchscreen display by the user's finger, the processor 2970 may execute a function of the application without additional authentication.

According to various embodiments, while the touchscreen display (the display panel 2910 of the touchscreen display) is OFF or the touchscreen display is ON, the processor 2970 may sense a pressure of the finger associated with the touchscreen display by using the pressure sensor 2930.

According to various embodiments, while the electronic device 2901 is in a lock state, the processor 2970 may sense a pressure of the finger associated with the touchscreen display regardless of whether the display panel 2910 is turned on/off. During the lock state, the processor 2970 may detect a fingerprint of the finger when the pressure of the finger is detected and the pressure is not smaller than a specified value. The processor 2970 may release the lock state when the detected fingerprint and the enrolled fingerprint are matched.

The above description of the processor 2970 is, but is not limited to, one example. For example, any other operations of a processor disclosed in the specification may be understood as the operation of the processor 2970. Also, in the specification, at least a part of operations described as an operation of an "electronic device" may be understood as the operation of the processor 2970.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
   a housing having a bottom surface and being opened upwardly;
   a main printed circuit board seated inside the housing;
   a bracket placed on the main printed circuit board;
   a display panel positioned in a first region of an upper surface of the bracket;
   an integrated sensor positioned in a second region of the upper surface of the bracket; and
   an outer cover positioned to cover the display panel and the integrated sensor,
   wherein the integrated sensor includes:
   a fingerprint sensor configured to perform fingerprint recognition on an object contacting a surface of the outer cover;
   a pressure sensor configured to sense a pressure of an object contacting the surface of the outer cover;
   an auxiliary printed circuit board in which the fingerprint sensor and the pressure sensor are seated, wherein the fingerprint sensor is attached to a first surface of the auxiliary printed circuit board, and the pressure sensor is attached to a second surface of the auxiliary printed circuit board opposite the first surface; and
   a driving IC positioned on the auxiliary printed circuit board and configured to drive the fingerprint sensor and the pressure sensor.

2. The electronic device of claim 1, wherein, in the outer cover, a thickness of a location corresponding to a region where the integrated sensor is positioned is thinner than a peripheral region, and
   wherein the outer cover includes at least one protrusion formed on a surface corresponding to a region in which the integrated sensor is positioned.

3. The electronic device of claim 1, wherein the fingerprint sensor is interposed between a lower surface of the outer cover and an upper surface of the auxiliary printed circuit board, and
   wherein the pressure sensor is interposed between a lower surface of the auxiliary printed circuit board and the upper surface of the bracket.

4. The electronic device of claim 1, wherein the fingerprint sensor is interposed between a lower surface of the outer cover and an upper surface of the auxiliary printed circuit board, and
   wherein the pressure sensor is positioned on the auxiliary printed circuit board in the form of a band surrounding the fingerprint sensor.

5. The electronic device of claim 1, wherein at least a portion of the bracket includes at least one of:

a seating recess in which at least a portion of the pressure sensor is seated; a main seating recess in which at least a portion of the pressure sensor is seated;
a sub seating recess in which at least a portion of the auxiliary printed circuit board is seated; or
a metal layer forming a ground layer of the pressure sensor.

6. The electronic device of claim 1, wherein the auxiliary printed circuit board includes an electrode layer forming a sensor layer of the pressure sensor.

7. The electronic device of claim 1, further comprising:
a light emitting unit positioned on the auxiliary printed circuit board;
a waveguide configured to guide a light emitted from the light emitting unit, and positioned on the light emitting unit or positioned on the pressure sensor; and
a light blocking part surrounding a surrounding region of the waveguide.

8. The electronic device of claim 1, wherein the auxiliary printed circuit board is disposed on the bracket such that the second surface of the auxiliary printed circuit board contacts a top surface of the bracket,
wherein the bracket defines a seating recess in which the pressure sensor is disposed, and
wherein the auxiliary printed circuit board extends over at least a portion of the seating recess of the bracket as to partially enclose the pressure sensor within the seating recess.

9. The electronic device of claim 1, further comprising an adhesive layer for adhering the fingerprint sensor and the outer cover.

* * * * *